US007196286B2

(12) United States Patent
Kishi et al.

(10) Patent No.: US 7,196,286 B2
(45) Date of Patent: Mar. 27, 2007

(54) HEATING APPARATUS, AUXILIARY POWER SUPPLY APPARATUS, AUXILIARY POWER SUPPLY SYSTEM, FIXATION APPARATUS, AND MOVING PICTURE FORMATION APPARATUS

(75) Inventors: Kazuhito Kishi, Kanagawa (JP); Susumu Matsusaka, Kanagawa (JP); Takashi Fujita, Tokyo (JP); Eriko Konno, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/487,939

(22) PCT Filed: Jan. 6, 2003

(86) PCT No.: PCT/JP03/00016

§ 371 (c)(1),
(2), (4) Date: Mar. 4, 2004

(87) PCT Pub. No.: WO2004/008808

PCT Pub. Date: Jan. 22, 2004

(65) Prior Publication Data

US 2004/0245235 A1 Dec. 9, 2004

(30) Foreign Application Priority Data

Jul. 12, 2002 (JP) ............................ 2002-204137
Nov. 7, 2002 (JP) ............................ 2002-323863

(51) Int. Cl.
*G03G 15/20* (2006.01)
*H02J 1/10* (2006.01)
*H02J 3/28* (2006.01)
*H02M 1/10* (2006.01)

(52) U.S. Cl. ...................... 219/216; 219/483; 219/486; 399/69; 307/29; 307/48

(58) Field of Classification Search ..................... None
See application file for complete search history.

(56) References Cited

U.S. PATENT DOCUMENTS 3,816,066 A * 6/1974 Thettu et al. ............... 219/216

(Continued)

FOREIGN PATENT DOCUMENTS

JP 150967-1988 10/1988

(Continued)

OTHER PUBLICATIONS

U.S. Appl. No. 11/221,838, filed Sep. 9, 2005, Kishi et al.

(Continued)

*Primary Examiner*—Joseph Pelham
(74) *Attorney, Agent, or Firm*—Oblon, Spivak, McClelland, Maier & Neustadt, P.C.

(57) ABSTRACT

A heating device of the invention comprises a heater, a main power supply, and an auxiliary power supply. The heater includes a main heating element which generates heat with power supplied from the main power supply, and an auxiliary heating element which has a resistance different from a resistance of the main heating element and generates heat with power supplied from the auxiliary power supply. The auxiliary power supply is provided to supply to the auxiliary heating element a current that is different from a current supplied from the main power supply to the main heating element.

31 Claims, 42 Drawing Sheets

U.S. PATENT DOCUMENTS

| | | | | |
|---|---|---|---|---|
| 4,486,759 | A * | 12/1984 | Toyomura | 307/66 |
| 5,700,994 | A * | 12/1997 | Gheer et al. | 219/497 |
| 6,424,156 | B1 * | 7/2002 | Okamura | 324/426 |
| 6,674,980 | B2 * | 1/2004 | Nakaya | 399/69 |
| 6,911,625 | B2 * | 6/2005 | Shimonaka | 219/216 |

FOREIGN PATENT DOCUMENTS

| | | |
|---|---|---|
| JP | 3-143226 | 6/1991 |
| JP | 5-232839 | 9/1993 |
| JP | 7-183064 | 7/1995 |
| JP | 7-199702 | 8/1995 |
| JP | 8-220930 | 8/1996 |
| JP | 9-34306 | 2/1997 |
| JP | 9-37487 | 2/1997 |
| JP | 10-10913 | 1/1998 |
| JP | 10-189058 | 7/1998 |
| JP | 10-282821 | 10/1998 |
| JP | 2000-315567 | 11/2000 |
| JP | 2001-35636 | 2/2001 |
| JP | 2001-201138 | 7/2001 |
| JP | 2001-300739 | 10/2001 |
| JP | 2002-184554 | 6/2002 |

OTHER PUBLICATIONS

U.S. Appl. No. 11/300,319, filed Dec. 15, 2005, Kishi et al.
U.S. Appl. No. 11/405,448, filed Apr. 18, 2005, Kishi et al.

* cited by examiner

HEATING APPARATUS, AUXILIARY POWER SUPPLY APPARATUS, AUXILIARY POWER SUPPLY SYSTEM, FIXATION APPARATUS, AND MOVING PICTURE FORMATION APPARATUS

TECHNICAL FIELD

The present invention generally relates to a heating device which heats a material or a device, an auxiliary power supplying device, an auxiliary power supplying system, a fixing device, and an image forming apparatus, such as a copier, a printer or a facsimile, which uses an electrophotographic method. More particularly the present invention relates to improvements in the efficiency of power saving of these devices.

BACKGROUND ART

The image forming apparatus, such as a copier or a printer, forms an image on a recording medium, such as a plain recording sheet or an OHP (overhead projector) film. In view of speedy image formation, image quality, cost, etc., the electrophotographic method is adopted for the image forming apparatus. In the electrophotographic method, a toner image is formed on a photoconductor and the toner image is fixed to a recording medium by applying heat and pressure. The currently adopted fixing method is mostly the heating roller method in view of safety. In the heating roller method, a heating roller which is heated by a halogen heater or the like, and a pressure roller which is disposed in opposite arrangement to the heating roller are connected together under pressure to form a nip portion, and the recording medium to which the toner image is transferred is passed through the nip portion so that the toner image is fixed to the recording medium by heat and pressure.

In recent years, the environmental problem becomes important and, also in the image forming apparatus, such as a copier and a printer, the energy saving becomes important. What cannot be disregarded in considering the energy saving of the image forming apparatus is power saving of a fixing device which fixes the toner to the recording medium.

As a reduction of the power dissipation of the fixing device in a standby state of the image forming apparatus, the heating roller is maintained at a temperature that is a little lower than a fixing temperature in the standby state, and when the image forming apparatus is in use the temperature of the heating roller is immediately raised to a usable temperature for the time of use, so as to avoid waiting of the user for the temperature rise of the fixing roller.

In this case, when the fixing device is not used, a certain amount of power is supplied and excessive energy is consumed. It is said that the consumption energy at the time of the standby state is equivalent to about 70 or 80 percent of the entire consumption energy of the image forming apparatus.

It is desired to reduce the consumption energy at the time of the standby state so that power saving is attained as much as possible. The Law concerning rational use of energy is revised and strengthened in Japan, and energy-saving programs, such as the energy star and the ZESM (Zero Energy Star Mode), are enacted also in the U.S. Making the electric power supply into zero when the device is not used has been demanded.

However, the heating roller mainly uses metal rollers made of iron or aluminum, and its heat capacity is large. For this reason, if the energy consumption is made into zero at the time of standby state, a long heating time, for example, in a range from several minutes to ten and several minutes, is required to heat the heating roller to the usable temperature around about 180 degrees C., and the convenience to the user will deteriorate.

For this reason, the composition which raises the heating roller temperature promptly is needed when realizing a copier of energy saving type. For example, in the ZESM, it is required that the time for re-warming up of the heating roller is 10 seconds or less.

In order to shorten the temperature-rise time of the heating roller, it is appropriate to enlarge the rated power of the heating roller, i.e., the supply energy per unit time. Actually, many of the current high-speed image forming apparatuses with high print speed set the supply voltage to 200V.

However, the source power supply of the general-purpose outlet of the offices in Japan is 100V 15 A, and it is necessary to carry out a construction special to the power supply relation of the installation for making it correspond to 200V. Hence, setting the supply voltage to 200V is not a general solution.

Moreover, the product which raises the total supply power using two power lines of 100V 15 A is also put in practical use, but it can be installed only at the location near the place where the two plug sockets are available. For this reason, even if it is intended to heat the heating roller for a short time, the actual conditions are difficult to raise the maximum of supply energy.

Moreover, as a fixing device which realizes the short-time temperature rise, the heating roller is constituted with a plate-like ceramic heater having a small heat capacity and a film made of a heat-resistant resin wound around the circumference of the ceramic heater. Such fixing device is put in practical use for a low-speed image forming apparatus with the print speed of 30 sheets/minute or less.

However, in order to take measures to a higher speed machine, it is necessary to make the film of the heat-resistant resin thicker in order to prevent the breakage. When the film of the heat-resistant resin is thickened, the thermal conductivity of resin is worse than that of metal, and it is necessary to heat the film of the heat-resistant resin with the ceramic heater well before the recording medium enters into the nip portion between the heating roller and the pressure roller. For this reason, it is required to enlarge the area of the plate-like portion of the ceramic heater and use the power supply generating a higher power, and the actual conditions are that taking measures to the high-speed image forming apparatus is unrealizable.

To resolve the problem, Japanese Laid-Open Patent Application No. 5-232839 discloses a method in which a heating element is provided in the heating roller and an additional heating element of another system is provided in the lower portion of the pressure roller. In this method, power is supplied to the additional heating element of another system at the time of standby state.

Moreover, Japanese Laid-Open Patent Application No. 10-10913 discloses a method in which a voltage with a fixed low level is supplied to the heating roller when the fixing device changes into the standby state, in order to delay the falling of the temperature of the fixing device. Japanese Laid-Open Patent Application No. 10-282821 discloses a method in which the secondary battery which is the auxiliary power is charged at the time of standby state of the fixing device, and upon starting of the fixing device, power is supplied from the main power supply, the secondary battery and the primary battery to the fixing device, in order to shorten the temperature-rise time.

Furthermore, Japanese Laid-Open Patent Application No. 2000-315567 discloses a method in which the auxiliary power supply using a capacitor having a large capacity is used in addition to the main power supply. In this method, at the time of standby state, connection of the main power supply and the heater is cut off and connection of the main power supply and the auxiliary power supply is established to charge the auxiliary power supply. Upon starting of the heater from the standby state, power is supplied to the heater from both the main power supply and the auxiliary power supply, so that raising the temperature of the heater to a predetermined temperature is attained for a short time.

However, in the method of Japanese Laid-Open Patent Application No. 5-232839, power is supplied to the additional heating element of another system at the time of standby state. Also, in the method of Japanese laid-Open patent Application No. 10-10913, the voltage with a fixed low level is supplied to the heating roller when the fixing device changes into the standby state. It cannot be said that these methods provide sufficient power saving. Moreover, the restriction of the maximum supply voltage of the source power supply cannot be solved, and the temperature-rise time cannot be shortened.

Moreover, in the fixing device of Japanese Laid-Open Patent Application No. 10-282821, power from the main power supply, the secondary battery and the primary battery is supplied at the time of starting.

Generally, the secondary battery employs a nickel-cadmium battery or a lead battery, and such secondary battery has the property in which the operational life becomes short with large current. The capacity of such secondary battery will deteriorate if the charging and discharging is performed repeatedly. Even in a case of the nickel-cadmium battery which has, generally speaking, a long operational life, the permissible number of times of the charging and discharging repetition is about 500–1000 times. The nickel-cadmium battery must be changed by a new one within one month if the charging and discharging is repeated 20 times a day. The nickel-cadmium battery has the demerits in which the use over an extended period of time is difficult, and the time and effort of exchange must be taken and the running cost will become high. Moreover, the charging time also requires several hours for charging the large capacity at the full, and it is not suitable for the use in which the charging and discharging is performed repeatedly each day. Accordingly realization is difficult practically. Furthermore, the lead battery which uses sulfuric acid is not desirable in the image forming apparatus for office uses.

The halogen heater is usually used for heating of the fixing roller but its operational life will become short if a large amount of current is applied to the halogen heater. The permissible maximum current of the halogen heater is about 10–12 A, and it is difficult to enlarge the maximum current.

In order to obtain large power with the heating device using the halogen heater as a heating element, it is necessary to use a power supply device with a high voltage as the source power source of the heating device.

In the method of Japanese Laid-Open Patent Application No. 2000-315567, the auxiliary power supply having a large-capacitance capacitor is used in addition to the main power supply, the auxiliary power supply is charged at the time of standby state, and when starting the heater from the standby state, power is supplied to the heater from the main power supply and the auxiliary power supply. In order to prevent the electrolyzing of the solution inside the cells, the large-capacitance capacitor used in the auxiliary power supply has the characteristics that the voltage per cell is relatively low (about several volts). The voltage per cell of the aqueous solution type is as much as 1 volt, and the voltage per cell of the organic solution type is also about several volts.

For this reason, in order to heat the halogen heater as a heating element, it is necessary to use a power supply unit in which a large number of cells are connected in series to obtain a sufficiently high voltage.

With the composition in which the cells are connected in series to obtain a high voltage and a large power, even if it has energy sufficient for some cells to raise the temperature of the heating element, in order to raise voltage further, it is necessary to increase the number of the cells. There is the problem in that the cost and size of the heating device will be increased because the cells are currently expensive and the use of the large number of such cells raises the cost and size of the power supply.

DISCLOSURE OF THE INVENTION

It is a general object of the present invention to provide an improved useful heating device, auxiliary power supplying device, auxiliary power supply system, fixing device and image forming apparatus in which the above-described problems are eliminated.

A more specific object of the present invention is to provide a heating device, auxiliary power supplying device, auxiliary power supply system, fixing device and image forming apparatus in which the effect of power saving is heightened with a simple, inexpensive composition and the size of the auxiliary power supply is reduced to make the installation space small.

According to one aspect of the invention, the heating device includes a heater, a main power supply and an auxiliary power supply, and is characterized in that the heater includes a main heating element generating heat with power supplied from the main power supply, and an auxiliary heating element having a resistance different from a resistance of the main heating element and generating heat with power supplied from the auxiliary power supply, and the auxiliary power supply supplies to the auxiliary heating element a current that is different from a current supplied from the main power supply to the main heating element.

According to another aspect of the invention, the heating device includes a heater, a main power supply, an auxiliary power supply, a charger and a switching unit, and is characterized in that the heater includes a main heating element generating heat with power supplied from the main power supply, and an auxiliary heating element having a resistance different from a resistance of the main heating element and generating heat with power supplied from the auxiliary power supply, the auxiliary power supply includes a capacitor with a sufficiently large capacitance to allow charging and discharging of the capacitor and supplies to the auxiliary heating element a current that is different from a current supplied from the main power supply to the main heating element, the charger charges the capacitor of the auxiliary power supply with the power supplied from the main power supply, and the switching unit selectively allows one of the supplying of the power to the auxiliary heating element by the auxiliary power supply and the charging of the capacitor of the auxiliary power supply by the charger.

According to another aspect of the invention, the heating device includes a heater, a pressure unit pressed by the heater, a main power supply, and an auxiliary power supply, and is characterized in that each of the heater and the pressure unit includes a main heating element generating heat with power supplied from the main power supply, and an auxiliary heating element having a resistance different from a resistance of the main heating element and generating heat with power supplied from the auxiliary power supply, respectively, and the auxiliary power supply supplies to the auxiliary heating elements of the heater and the pressure unit a current that is different from a current supplied from the main power supply to the main heating element.

According to another aspect of the invention, the heating device includes a heater, a pressure unit pressed by the heater, a main power supply, an auxiliary power supply, a charger and a switching unit, and is characterized in that each of the heater and the pressure unit includes a main heating element generating heat with power supplied from the main power supply, and an auxiliary heating element having a resistance different from a resistance of the main heating element and generating heat with power supplied from the auxiliary power supply, respectively, the auxiliary power supply includes a capacitor with a sufficiently large capacitance to allow charging and discharging of the capacitor and supplies to the auxiliary heating elements of the heater and the pressure unit a current that is different from a current supplied from the main power supply to the main heating element, the charger charges the capacitor of the auxiliary power supply with the power supplied from the main power supply, and the switching unit selectively allows one of the supplying of the power to the auxiliary heating elements of the heater and the pressure unit by the auxiliary power supply and the charging of the capacitor of the auxiliary power supply by the charger.

In the heating device according to the invention, the resistance of the heating element of the above-mentioned heater and the resistance of the heating element of the pressure unit may be different from each other.

In the heating device according to the invention, the auxiliary heating element may have a resistance smaller than a resistance of the main heating element, the main power supply supplies a high-voltage power to the main heating element, and the auxiliary power supply supplies a large-current low-voltage power to the auxiliary heating element.

In the heating device according to the invention, a plurality of said auxiliary heating elements may be connected in parallel.

According to another aspect of the invention, the heating device includes a heater, a main power supply and an auxiliary power supply, and is characterized in that the heater includes a main heating element generating heat with power supplied from the main power supply, and a plurality of auxiliary heating elements each having a resistance different from a resistance of the main heating element and generating heat with power supplied from one of the main power supply and the auxiliary power supply, the auxiliary power supply supplies to the auxiliary heating elements a current that is different from a current supplied from the main power supply to the main heating element, and the heating device is provided such that the power from the auxiliary power supply is supplied to the auxiliary heating elements by connecting the auxiliary heating elements in parallel, and the power from the main power supply is supplied to the auxiliary heating elements by connecting the auxiliary heating elements in series.

In the heating device according to the invention, the heater may be provided so that the main heating element acts to heat a predetermined range of a heated object and the auxiliary heating elements act to heat a remaining range of the heated object other than the predetermined range.

In the heating device according to the invention, the auxiliary power supply may include a capacitor with a sufficiently large capacitance to allow charging and discharging of the capacitor, or may include a fuel cell.

In the heating device according to the invention, a cartridge may be removably mounted on the heating device, the auxiliary power supply includes a capacitor having a sufficiently large capacitance to allow charging and discharging of the capacitor, and the capacitor is accommodated in the removable cartridge. The cartridge may be made of a dielectric material. The cartridge may have an external terminal which is changed in shape according to specifications of the auxiliary power supply. An insulating cover may be provided in a circumferential portion of the external terminal of the cartridge. An insulating cover, which has a shutter member that is opened when attaching the cartridge to the heating device or closed when detaching the cartridge from the heating device, may be provided in a circumferential portion of the external terminal of the cartridge. A connection switching unit may be provided in the cartridge, the connection switching unit serving to cut off electrical conduction between the external terminal and the auxiliary power supply when the cartridge is detached from the heating device, and serving to allow the conduction of the external terminal and the auxiliary power supply when the cartridge is attached to the heating device.

In the heating device according to the invention, a display unit, which is indicative of the number of times of reuse of the auxiliary power supply, may be provided in the cartridge.

In the heating device according to the invention, a memory unit, which stores information concerning a specification of the auxiliary power supply and the number of times of reuse, may be provided in the cartridge. The heating device according to the invention may further comprise: an information reading unit which reads the information from the memory unit in the cartridge when the cartridge is attached to the heating device; and a determination unit which detects the contents of the auxiliary power supply contained in the cartridge attached to the heating device, based on the information read by the information reading unit.

In the heating device according to the invention, the heating device may comprise a cooling unit which cools the auxiliary power supply. The heating device may comprise a control unit which controls operation of the cooling unit according to a temperature of the heating device or a temperature of the auxiliary power supply.

In the heating device according to the invention, the heating device may comprise a control unit which controls operation of the cooling unit according to an operating state of the heating device.

In the heating device according to the invention, the auxiliary heating element may be constituted from a ceramic heater having a ceramic substrate and a resistive material printed on the ceramic substrate, or may be constituted from a resistor having a thin-film metal.

In the heating device according to the invention, the main heating element may be constituted from a material which is the same as a material of the auxiliary heating element, and the main heating element and the auxiliary heating element are formed on a same substrate.

In the heating device according to the invention, the main heating element and the auxiliary heating element may be formed on different substrates.

According to one aspect of the invention, the auxiliary power supplying device includes an auxiliary power supply and is connected to a plurality of electrical equipment modules to which a main power is supplied from a main power supply, and is characterized in that the auxiliary power supply is provided to supply an auxiliary power to each electrical equipment module to which the main power from the main power supply is supplied. In the auxiliary power supplying device according to the invention, the auxiliary power supply may include a capacitor with a sufficiently large capacitance to allow charging and discharging of the capacitor, or may include a fuel cell.

According to another aspect of the invention, the auxiliary power supplying system includes a plurality of electrical equipment modules to which a main power is supplied from a main power supply, and an auxiliary power supplying device including an auxiliary power supply, and is characterized in that each electrical equipment module comprises an output unit outputting a status information of the electrical equipment module, and the auxiliary power supplying device comprises: an input unit receiving the status information from each electrical equipment module; a determination unit determining control information of the auxiliary power supply based on the received status information of each electrical equipment module; and a control unit controlling the supply of the auxiliary power from the auxiliary power supply to each electrical equipment module based on the control information determined by the determination unit. In the auxiliary power supplying system according to the invention, the status information may include an electric supply information which indicates a state of the power supplied to each electrical equipment module from the auxiliary power supply, or may include a priority information which indicates a degree of power demand of each electrical equipment.

In the auxiliary power supplying system according to the invention, each electrical equipment module may comprise a heating device including a main heating element which supplies the main power from the main power supply, and an auxiliary heating element which supplies the auxiliary power from the auxiliary power supply. In the auxiliary power supplying system according to the invention, the status information may include a temperature information of the heating device.

According to another aspect of the invention, the fixing device includes the above-described heating device of the invention, and is characterized in that the fixing device fixes an image, which is transferred to a recording medium, to the recording medium by using the heating device.

In the fixing device according to the invention, a cylindrical film which is made of a heat-resistant resin and slides on a surface of the recording medium may be provided in the heating device.

According to another aspect of the invention, the fixing device includes a fixing roller with a built-in heater, a pressure roller and a heating device supplying power to the heater of the fixing roller, and is characterized in that the heater of the fixing roller includes a main heating element constituting a main halogen heater, and an auxiliary heating element constituting a plurality of halogen heaters each having a resistance different from a resistance of the main halogen heater and the halogen heaters being connected in parallel, and that the heating device includes a main power supply, an auxiliary power supply, a charger, and a switching unit, the main power supply supplying power to the main heating element, the auxiliary power supply including a capacitor with a sufficiently large capacitance to allow charging and discharging of the capacitor and supplying to the auxiliary heating element a current that is different from a current supplied from the main power supply to the main heating element, the charger charging the capacitor of the auxiliary power supply with the power supplied from the main power supply, and the switching unit selectively allowing one of the supplying of the power to the auxiliary heating element by the auxiliary power supply and the charging of the capacitor of the auxiliary power supply by the charger.

According to another aspect of the invention, the fixing device includes a fixing roller with a built-in heater, a pressure roller with a built-in heater, and a heating device supplying power to the heaters of the fixing roller and the pressure roller, and is characterized in that each heater of the fixing roller and the pressure roller includes a main heating element constituting a main halogen heater, and an auxiliary heating element constituting a plurality of halogen heaters each having a resistance different from a resistance of the main halogen heater and the halogen heaters being connected in parallel, and that the heating device includes a main power supply, an auxiliary power supply, a charger, and a switching unit, the main power supply supplying power to the main heating element, the auxiliary power supply including a capacitor with a sufficiently large capacitance to allow charging and discharging of the capacitor and supplying to the auxiliary heating element a current that is different from a current supplied from the main power supply to the main heating element, the charger charging the capacitor of the auxiliary power supply with the power supplied from the main power supply, and the switching unit selectively allowing one of the supplying of the power to the auxiliary heating element by the auxiliary power supply and the charging of the capacitor of the auxiliary power supply by the charger.

In the fixing device according to the invention, the auxiliary heating element may include a plurality of resistance heating elements, each having a resistance different from a resistance of the main heating element, which are connected in parallel and enclosed in a single glass tube, or may include a thin-film resistor formed on an internal surface of a base of the fixing roller and having a resistance different from a resistance of the main heating element.

According to another aspect of the invention, the image forming apparatus forms an image on a recording medium by using an electrophotographic method, and is characterized in that the image forming apparatus comprises the above-described fixing device of the invention. In the image forming apparatus according to the invention, an amount of charge of the auxiliary power supply may be detected when the image forming apparatus is powered up, and the power from the main power supply and the auxiliary power supply is supplied to the heater when the detected amount of charge reaches a reference amount, and only the power from the main power supply is supplied to the heater when the detected amount of charge does not reach the reference amount, and, when the image forming apparatus is in a standby state, the supply of the power to the heater is cut off and the auxiliary power supply is charged, and when the image forming apparatus changes from the standby state to a temperature-rise state, the power from the from the main power supply and the auxiliary power supply is supplied again to the heater. In the image forming apparatus according to the invention, the image forming apparatus may be provided to cut off the supply of the power from the auxiliary power supply to the auxiliary heating element when a temperature of the heater reaches a predetermined temperature.

BRIEF DESCRIPTION OF THE DRAWINGS

Other objects, features and advantages of the present invention will be apparent from the following detailed description when read in conjunction with the accompanying drawings.

Figure 1:
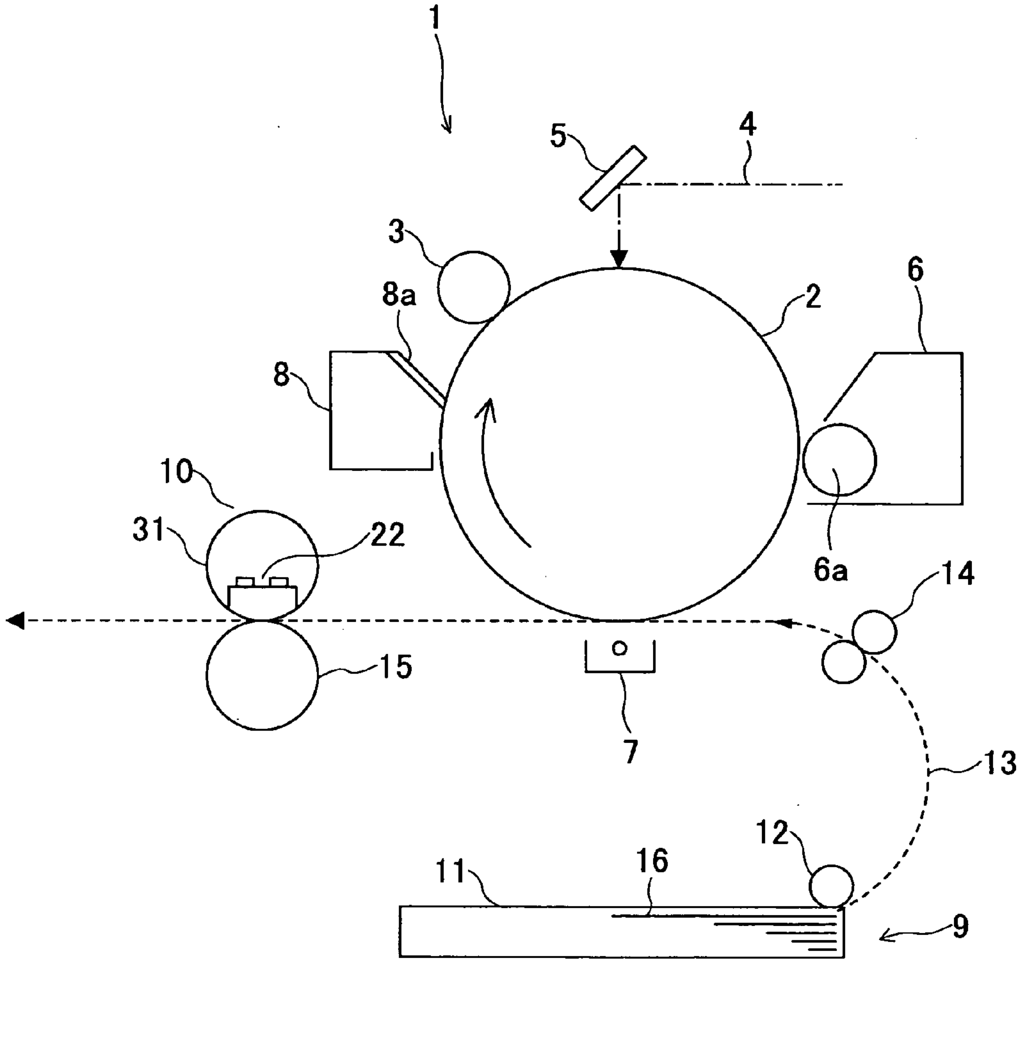
FIG. 1 is a diagram showing an image forming apparatus to which an embodiment of the invention is applied.

In the accompanying drawings, reference numeral 1 indicates an image forming apparatus, reference numeral 2 indicates a photoconductor, reference numeral 3 indicates a charging device, reference numeral 5 indicates a mirror, reference numeral 6 indicates a developing device, reference numeral 7 indicates a transferring device, reference numeral 8 indicates a cleaning device, reference numeral 9 indicates a paper feeding device, reference numeral 10 indicates a fixing device, reference numeral 15 indicates a pressure roller, reference numeral 16 indicates a recording sheet, reference numeral 21 indicates a heating device, reference numeral 22 indicates a heater, reference numeral 22*a* indicates a main heating element, reference numeral 22*b* indicates an auxiliary heating element, reference numeral 23 indicates a main power supply, reference numeral 24 indicates an auxiliary power supply, reference numeral 25 indicates a main switch, reference numeral 26 indicates a charger, reference numeral 27 indicates a switching unit, reference numeral 31 indicates a cylindrical film, reference numeral 44*a* indicates a main heating element, reference numeral 44*b* indicates an auxiliary heating element, reference numeral 50 indicates a cooling device, reference numeral 51 indicates a temperature detecting unit, reference numeral 61 indicates a cartridge, reference numeral 80 indicates an auxiliary power supplying system, reference numeral 91 indicates an auxiliary power supplying device, reference numeral 82 indicates a power switching unit, and reference numeral 83 indicates a control unit.

BEST MODE FOR CARRYING OUT THE INVENTION

A description will now be provided of preferred embodiments of the present invention with reference to the accompanying drawings.

FIG. 1 shows an image forming apparatus to which an embodiment of the present invention is applied.

As shown in FIG. 1, the image forming apparatus 1 using the electrophotographic method is configured to include the photoconductor 2, and the charging device 3 provided along with the photoconductor 2. The image forming apparatus 1 also includes the mirror 5 which is provided as a part of the optical writing unit on the downstream side of the charging device 3 in the rotation direction of the photoconductor 2 and reflects the laser beam 4 from the optical writing unit so that the reflected laser beam 4 is incident to the surface of the photoconductor 2. The image forming apparatus 1 also includes the developing device 6 which is provided on the downstream side of the photoconductor portion where the laser beam 4 is incident to the surface of the photoconductor 2, and has the developing-roller 6*a*. The image forming apparatus 1 also includes the transferring device 7 provided on the downstream side of the developing device 6, the cleaning device 8 provided on the downstream side of the transferring device 7 and having the cleaning blade 8*a*, and the paper feeding device 9, and the fixing device 10.

The paper feeding device 9 has the paper tray 11, the feed roller 12, the recording paper passage 13, and the resist roller pair 14, and conveys the recording paper contained in the paper tray 11 to the transferring device 7.

When forming the image by the image forming apparatus 1, the surface of the revolving photoconductor 2 is uniformly charged with the charging device 3, and the laser beam 4, emitted according to image information from the optical writing unit, is reflected by the mirror 5, and the reflected laser beam 4 is incident to the charged surface of the photoconductor 2 so that the electrostatic latent image according to the image information is formed on the photoconductor surface.

The electrostatic latent image formed on the surface of the photoconductor 2 is developed by the developing device 6, so that the toner image is formed. On the other hand, the recording paper which is fed from the paper tray 11 by the feed roller 12 passes through the recording paper passage 13, and is temporarily stopped at the position of the resist roller pair 14.

At the same timing as the toner image formed on the photoconductor 2 reaches the transferring device 7, the resist roller pair 14 starts the feeding of the recording paper. The toner image formed on the photoconductor 2 is transferred to the recording paper by the transferring device 7.

The recording paper to which the toner image is transferred by the transferring device 7 is sent to the fixing device 10, and the fixing device 10 carries out heating fusion of the toner of the toner image on the recording paper and fixes the toner image to the recording paper.

Moreover, the remaining toner which remains on the photoconductor 2 and is not transferred to the recording paper is removed by the cleaning device 8.

Figure 2:
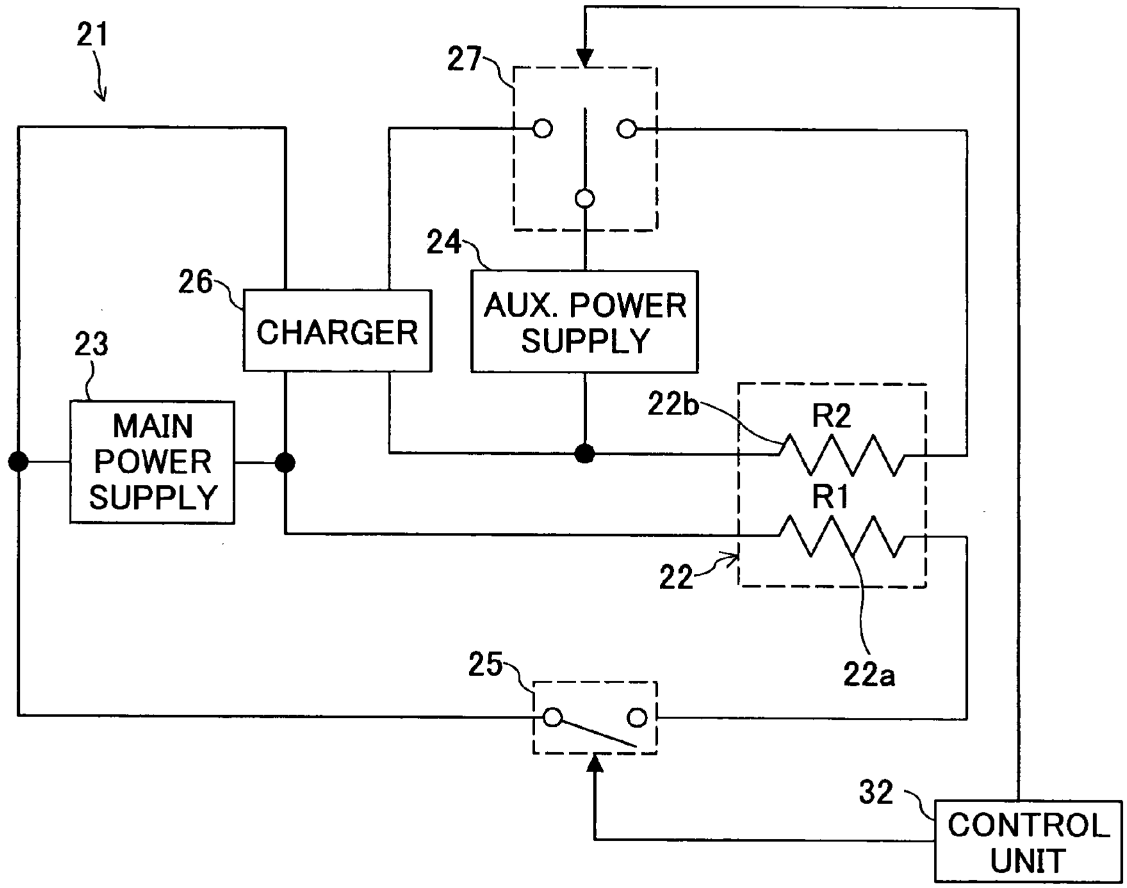
FIG. 2 is a circuit diagram of an embodiment of the heating device of the invention.

The heating device 21 of the fixing device 10 which fixes the toner image to the recording paper includes the heater 22, the main power supply 23, the auxiliary power supply 24, the main switch 25, the charger 26, and the switching unit 27, as shown in the circuit diagram of FIG. 2.

Figure 3:
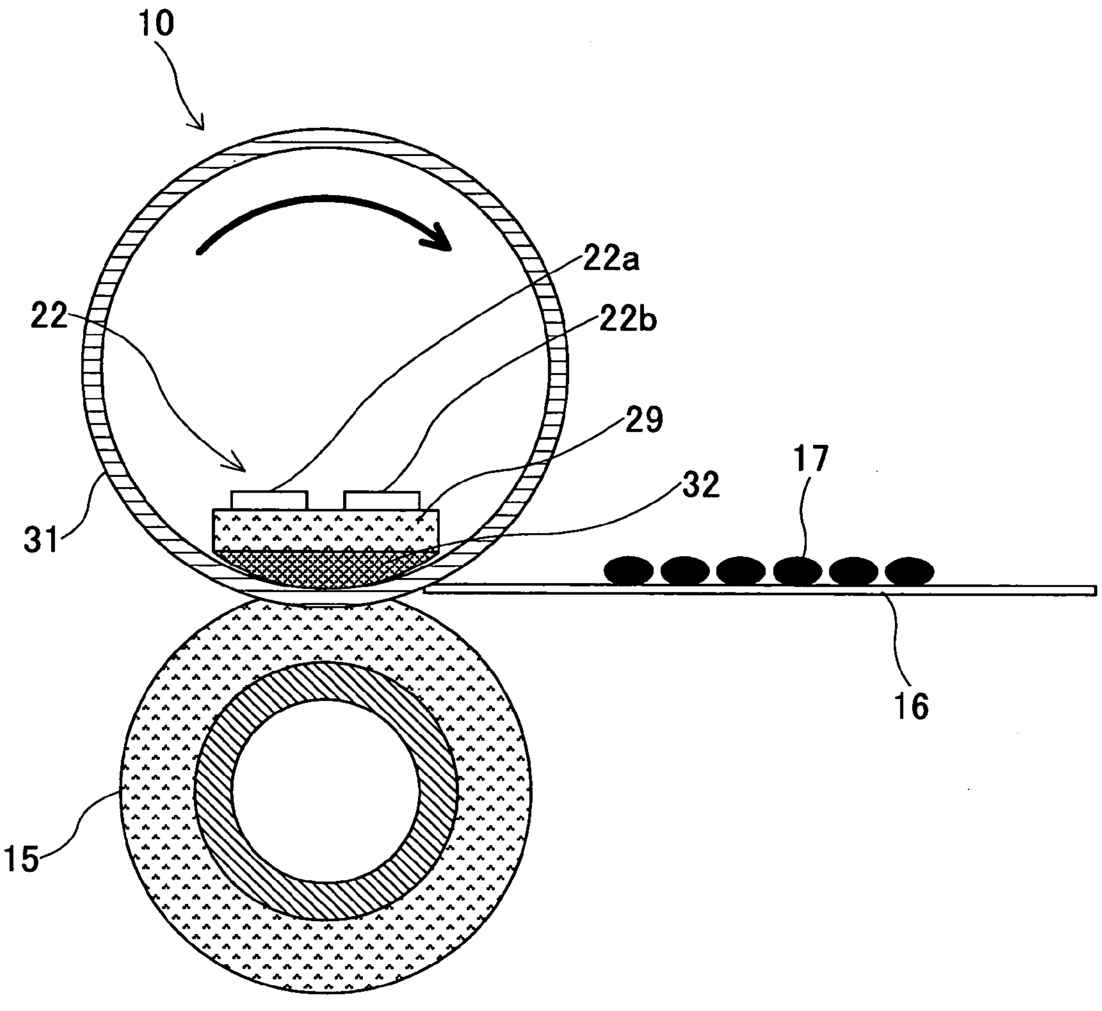
FIG. 3 is a cross-sectional view of an embodiment of the fixing device of the invention.

As shown in the cross-sectional view of FIG. 3, the heater 22 is configured so that it counters with the pressure roller 15, and carries out heating fusion of the toner image 17 transferred to the recording paper 16 sent to the nip portion with the pressure roller 15. The heater 22 includes a main heating element 22*a* which generates heat with the power supplied from the main power supply 23, and an auxiliary heating element 22*b* which generates heat with the power supplied from the auxiliary power supply 24.

Thus, by making the heater 22 into the two lines: the main heating element 22*a* and the auxiliary heating element 22*b*, and supplying power from the main power supply 23 and the auxiliary power supply 24, which are the different systems, to the main heating element 22*a* and the auxiliary heating element 22*b*, respectively, the circuit composition of the heating device 21 can be simplified and the cost can be reduced.

Figure 4:
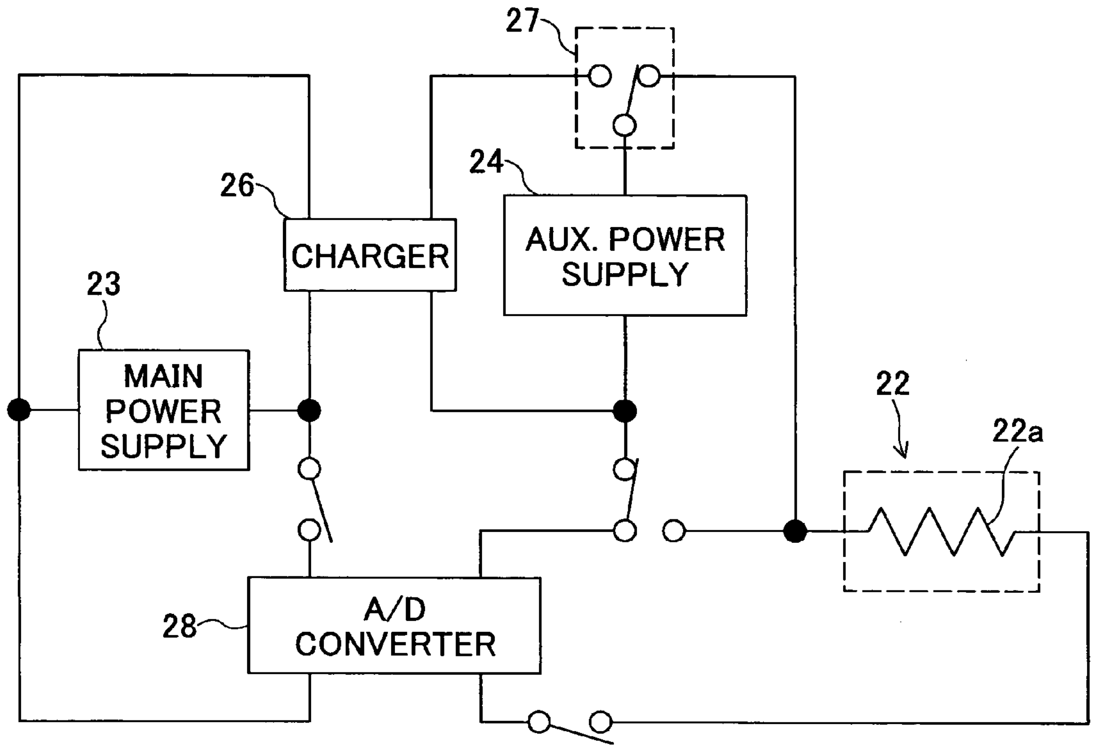
FIG. 4 is a circuit diagram of a heating device of a conventional fixing roller.

For example, as shown in FIG. 4, when the heater 22 is made into one line and the power from the main power supply 23 and the auxiliary power supply 24, which has the capacitor, is supplied, it is necessary to carry out A/D conversion of the power supplied to the heater 22 from the main power supply 23 at the A/D-conversion unit 28, and the circuit composition in such a case becomes complicated and the cost will be increased. Furthermore, the supply voltage will decline by the conversion efficiency of the A/D-conversion unit 28. According to the circuit composition of FIG. 2, it is possible to prevent such demerit of the heating device of FIG. 4.

Figure 5:
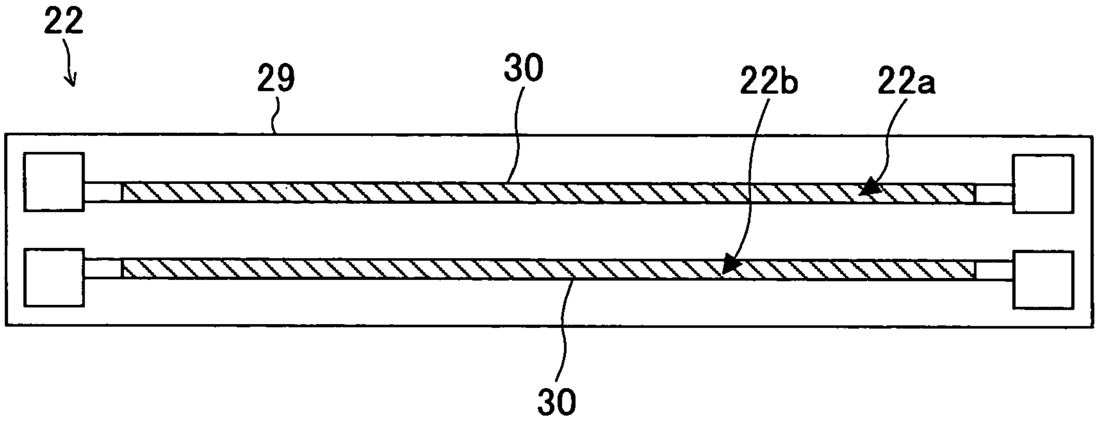
FIG. 5 is a top view of a heater of the heating device.

For example, as shown in FIG. 5, each of the main heating element 22*a* and the auxiliary heating element 22*b* of the heater 22 may be formed by the ceramic heater which includes the ceramic substrate 29 of $Al_2O_3$ or the like, and the resistor 30 which generates heat by supplying electric energy. The resistors 30 of the main heating element 22*a* and the auxiliary heating element 22*b* are formed by the patterning of a resistive material, such as silver-palladium, on the ceramic substrate 29 by printing and sintering. The heater 22 is provided so that the resistance R2 of auxiliary heating element 22*b* is smaller than the resistance R1 of main heating element 22*a*.

Thus, it is possible to make the resistance small by forming the main heating element 2*a* and the auxiliary heating element 2*b* with the ceramic heater, and it is possible to supply the low-voltage power with a large amount of current of several 10 A.

Moreover, by providing the main heating element 2*a* and the auxiliary heating element 2*b* on the same ceramic substrate 29, it is possible to reduce the manufacture cost, and the miniaturization can be attained.

In the case of FIG. 5, the main heating element 22*a* and the auxiliary heating element 22*b* are arranged with the same length. Alternatively, in order to obtain the desired thermal distribution, it is possible to change suitably the length or width of the main heating element 22*a* and the auxiliary heating element 22*b*.

Figure 6:
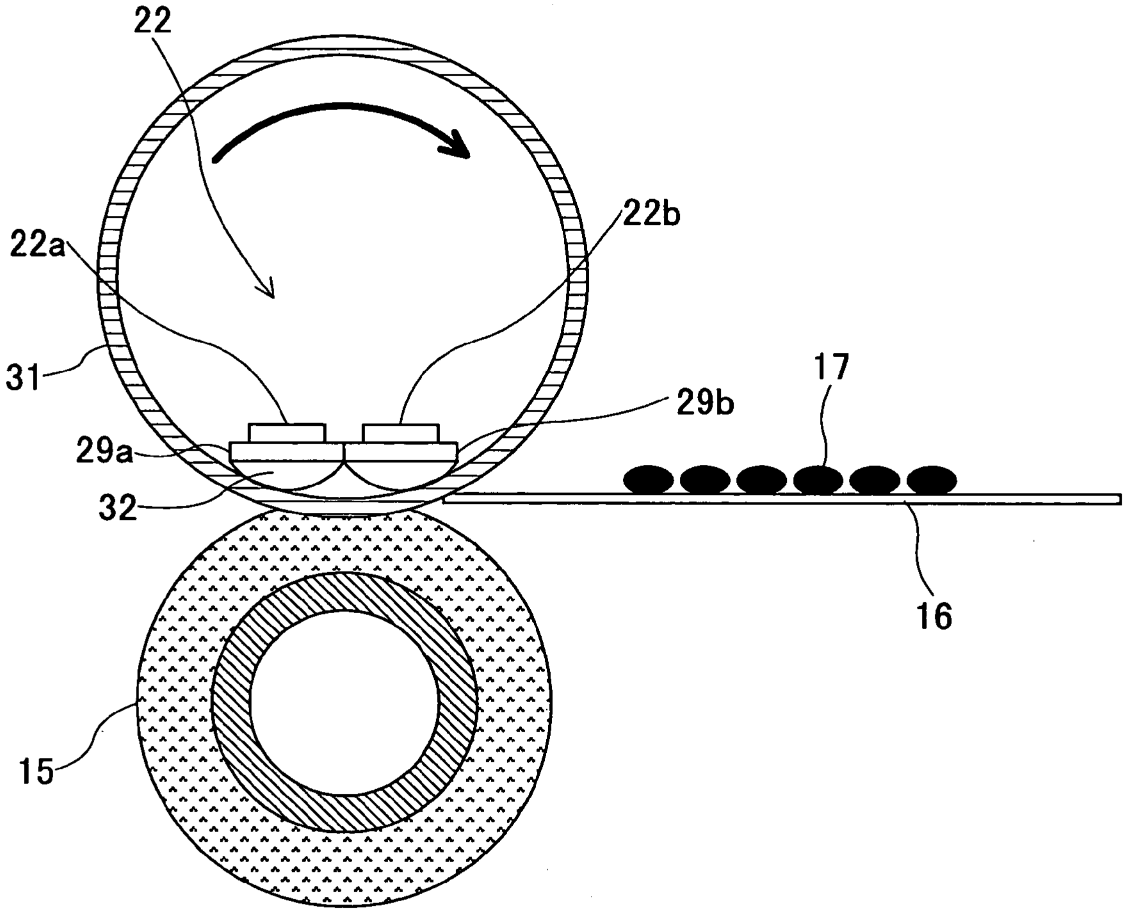
FIG. 6 is a cross-sectional view of a second embodiment of the fixing device of the invention.

Alternatively, as shown in FIG. 6, the main heating element 22*a* and the auxiliary heating element 22*b* may be provided on the different ceramic substrates 29*a* and 29*b*.

In order to prevent the adhering of the toner of the toner image 17, transferred to the recording paper 16, to the heater 22, there is the cylindrical film 31 which slides and rotates on the circumference of the heater 22.

The cylindrical film 31 is made of a heat-resistant resin, such as a polyimide resin, and it is suitable for the surface of the cylindrical film 31 to form the mold release layer for improving the mold-release characteristic with the recording paper 16.

Moreover, it is suitable to provide the sliding members 32 on the surface of the ceramic substrate 29 of the heater 22 which slides on the cylindrical film 31, and the sliding members 32 may be made of a thermally conductive material, such as aluminum, in order to maintain the surface smooth and to improve the sliding property with the cylindrical film 31.

The pressure roller 15 which counters with the heater 22 is formed to have the elastic layer 15*b* on the metal core 15*a* for securing the contact width with the heater 22, and it is made to secure the heater 22 with a predetermined contact width by the spring unit, as shown in FIG. 3.

The main power supply 23 is connected to the source power supply of AC 100 V, and has the functions, such as the adjustment of voltage according to the heater 22 and the rectification of the alternating current to the direct current.

The auxiliary power supply 24 has a capacitor with a sufficiently large capacitance to allow the charging and discharging of the capacitor.

As the capacitor of the auxiliary power supply 24, either the electric double-layer capacitor of NIPPON CHEMI-CON CORP., which has an electrostatic capacitance of about 2000 F d and is capable of being charged at a sufficient capacity in several seconds to several 10 seconds by the electric power supply, or the capacitor of NEC Corp. known as "hyper-capacitor", which has an electrostatic capacitance of about 80 F, may be used.

The auxiliary power supply 24 which uses the electric double-layer capacitor or the like is configured so that the low-voltage, large-current power may be supplied, and the capacity and the number of the capacitor are defined according to the electrical energy supplied to the auxiliary heating element 22*b*.

For example, when it is supposed that the auxiliary heating element 22*a* including the ceramic heater is provided to have the composition to pass a large current with the maximum of about 40 A and the auxiliary power supply 24 is provided to have the capacitors of 1300 F and 2.5V that supplies the power of 600 W to the auxiliary heating element 22*a*, six pieces of such capacitors must be used for the auxiliary power supply 24.

The main switch 25 turns on and off the supply of power to the main heating element 22*a* from the main power supply 23. The charger 26 charges the capacitor of the auxiliary power supply 24 with the power supplied from the main power supply 23. The switching unit 27 changes the electric power supply to auxiliary heating element 22*b* from the auxiliary power supply 24 to charge of the auxiliary power supply 24. The main switch 25 and the switching unit 27 are controlled by the control unit 32 which manages operation of the entire image forming apparatus 1.

Figure 7:
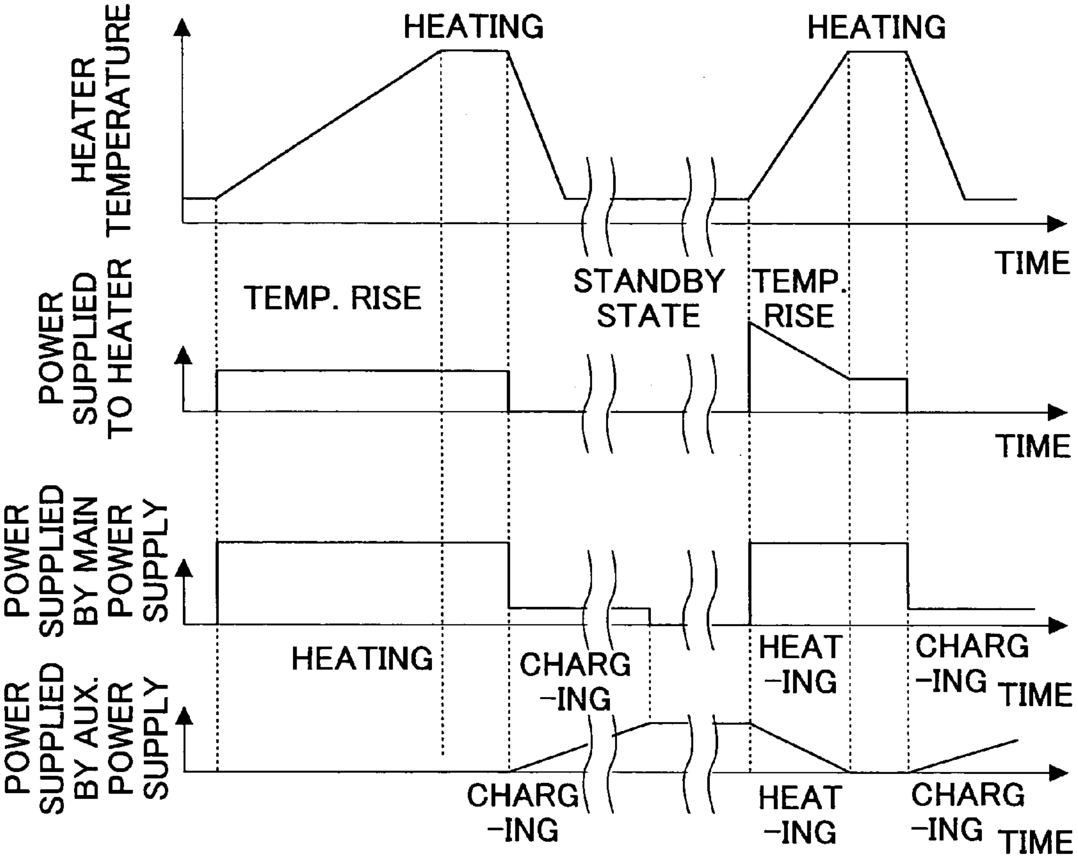
FIG. 7 is a time chart for explaining operation of the heating device of the fixing device in the image forming apparatus.

With reference to the time chart of FIG. 7, operation of the heating device 21 of the fixing device 10 in the above-described image forming apparatus 1 at the time of forming an image and the time of the standby state will be explained.

When the power supply of the image forming apparatus 1 is supplied early in the morning to heat the heater 22 of the fixing device 10 with the auxiliary power supply 24, including the electric double-layer capacitor of the heating device 21, being not fully charged, the control unit 32 turns ON the main switch 25 of the heating device 21 to supply the power only to the main heating element 22*a* from the main power supply 23 to heat the heater 22.

When the heater 22 carries out the temperature rise to the predetermined temperature, the control unit 32 starts the image forming operation.

When the image forming operation is completed and the image forming apparatus 1 is in the standby state, the control unit 32 turns OFF the main switch 25 and operates the switching unit 27 to connect the auxiliary power supply 24 to the charger 26, so that the power is supplied from the main power supply 23 through the charger 26 to the auxiliary power supply 24, and the charging of the auxiliary power supply 24 is performed.

Although it has several hours even if it performs boosting charge when charging the auxiliary power supply 24, and the common nickel-cadmium battery as an auxiliary power supply is used as a secondary battery, since the capacitor which it has in the auxiliary power supply 24 is not accompanied by the chemical reaction, unlike the secondary battery, it can perform rapid charge for about several minutes. Therefore, when the image forming apparatus 1 is in the standby state, most power dissipation can be made into zero.

Next, in order to rise from the standby state and to start the image forming operation, when starting heating of the heater 22, the control unit 32 turns ON the main switch 25 of the heating device 21 and supplies power to main heating element 22*a* from the main power supply 23. The control unit 32 operates the switching unit 27 to connect the auxiliary power supply 24 to the auxiliary heating element 22*b*, and supplies power to the auxiliary heating element 22*b* from the auxiliary power supply 24, so that the heater 22 is energized by the main heating element 22*a* and the auxiliary heating element 22*b*.

Thus, the power is supplied to the auxiliary heating element 22*b* from the auxiliary power supply 24 while supplying the power to the main heating element 22*a* from the main power supply 23 when the image forming apparatus 1 starts operation from the standby state, and a large quantity of power than that in the case where power is supplied only with the main power supply 23 can be supplied to the heater 22.

Moreover, by using the ceramic heater 30 which can pass a large current through the main heating element 22*a* and the auxiliary heating element 22*b*, a large quantity of power can be supplied and the heater can be heated to the predetermined temperature in a short time.

Figure 8:
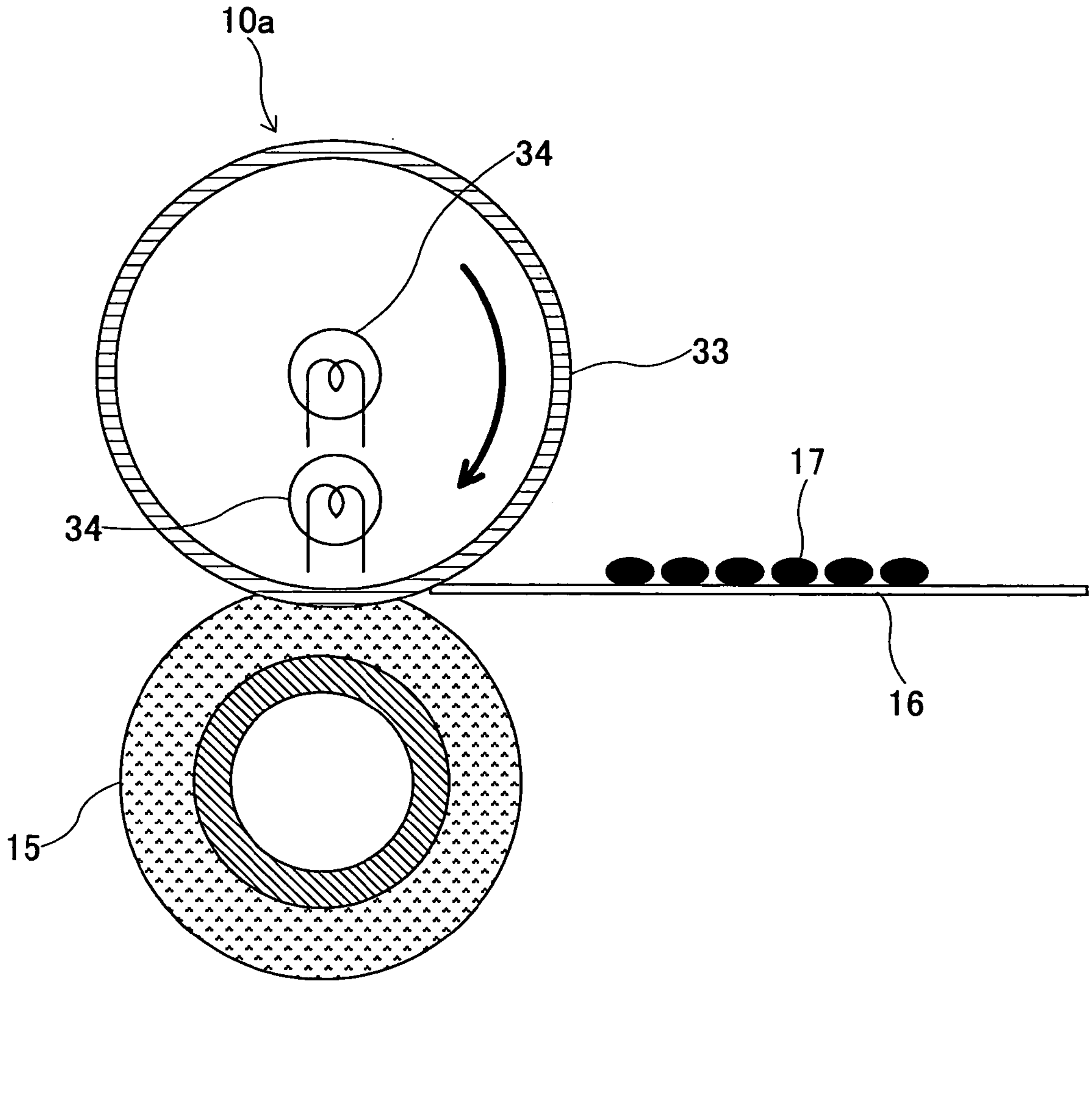
FIG. 8 is a cross-sectional view of a third embodiment of the fixing device of the invention.

For example, as shown in FIG. 8, the quantity of heat required to raise the temperature of the fixing roller 33 made of aluminum with the diameter of 30 mm and the thickness of 1 mm in the conventional fixing device 10*a* having the halogen heater 34 to the predetermined temperature of 180 degrees C. is about 12000 J.

Figure 9:
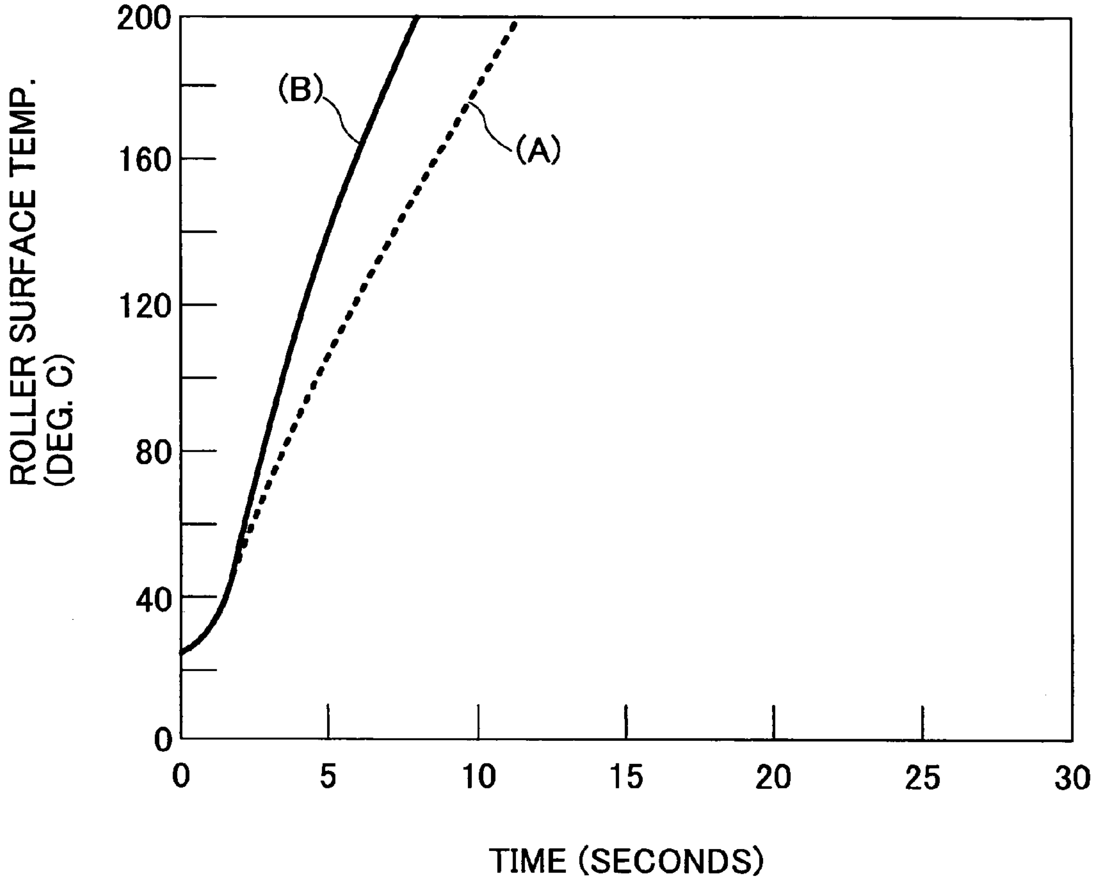
FIG. 9 is a diagram for explaining the time versus temperature characteristics of a fixing roller.

The halogen heater 34 used in the fixing roller 33 is capable of supplying the power of about 1200 W at the voltage of 100V, and the fixing roller 33 can be subjected to the temperature rise to 180 degrees C. in about 10 seconds, as shown in the temperature-rise characteristics of FIG. 9A.

The auxiliary halogen heater is provided in the fixing roller 33 separately from the halogen heater 34, and when the current is passed to the auxiliary halogen heater from the auxiliary power supply using the capacitor of 1300 F and 2.5V the maximum current of the auxiliary halogen heater is restricted. It is possible for the auxiliary halogen heater to take out the power of 600 W or the large current of 12 A when the voltage of the auxiliary power supply is set to 50V.

Thus, it is possible to supply the power of 1200 W to the halogen heater 34, and at the same time it is possible to supply the power of 600 W from the auxiliary power supply to the auxiliary halogen heater. It can supply to the fixing roller 33 a total of the power 1800 W, and the temperature-rise time of the fixing roller 33, which has been about 10 seconds, can be shortened to about 6 seconds, as shown in FIG. 9B.

In order to use it by setting the capacitor of 2.5 V to the voltage 50 V of the auxiliary power supply, it is necessary to connect about twenty capacitors or more in series. The energy which is held by the auxiliary power supply at this time becomes about 80000 J. However, the quantity of heat required to raise the temperature of the fixing roller 33 is ⅙ of the energy, and the necessary energy is equivalent to that of three pieces of such capacitors connected in series.

Figure 10:
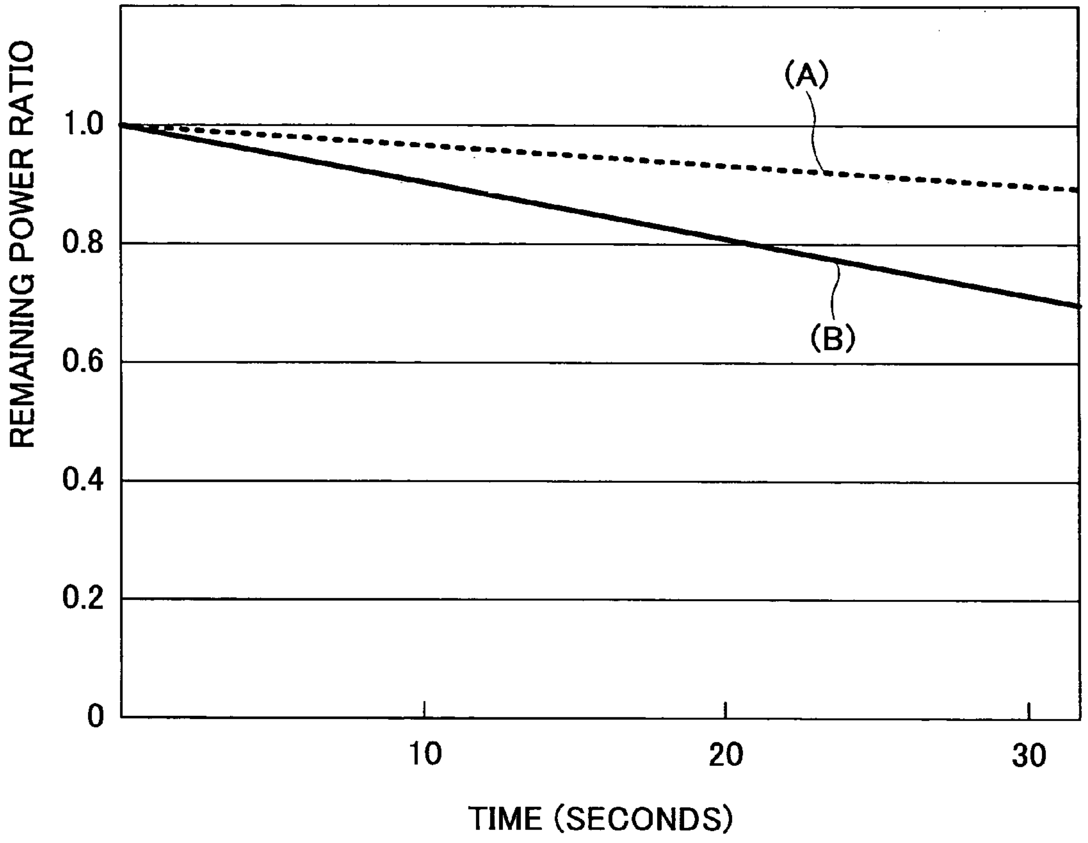
FIG. 10 is a diagram for explaining the time versus remaining power ratio characteristics of a capacitor of an auxiliary power supply.

Moreover, the remaining power quantity at the time of setting the capacitor of 2.5 V to the voltage of 50V and taking out the power at a rate of 600 W per 10 seconds becomes about 90% in 30 seconds, as shown in the change characteristics of the remaining power ratio FIG. 10A. In order to heat the fixing roller 33, when supplying the power 10 seconds from the auxiliary power supply, it takes out only the power of about 6000 J from the auxiliary power supply. This is about 8% less than that of the energy held by the auxiliary power supply.

Thus, while the excessive capacitor is needed only by raising voltage with the composition which used large voltage for the auxiliary power supply, it is difficult to take out the electrical energy to hold for a short time at the time of the temperature rise.

On the other hand, in the composition that takes out as the initial power the power of 600 W from the auxiliary power supply 24 using the ceramic heater which can pass the maximum current of about 40 A for the auxiliary heating element 22*b*, and using the capacitors of 1300 F and 2.5V, the voltage 15 V of the auxiliary power supply 24 for 10 seconds, that is, the electrical energy of about 6000 J can be supplied. The number of the capacitors of 1300 F and 2.5V becomes six.

As shown in FIG. 10B, the remaining power quantity of the capacitor of the auxiliary power supply 24 at this time reduces the capacitor of 2.5V compared with the case where it is made voltage 50V, and is used effectively. About 6000 J of the electrical energy which can be used at the time of the temperature rise, since the electrical energy held by the auxiliary power supply 24 using the six capacitors of 1300 F and 2.5 V is about 24000 J, becomes about 25% of the electrical energy held by the auxiliary power supply 24, and it is possible to raise the use efficiency to about 3 times.

And by supplying the power of 600 W or 800 W from the auxiliary power supply 24, the limit of 1200 W which are the maximum of the conventional electric power supply can be set to 1800 W–2000 W, and the time for the temperature rise to the predetermined temperature from the standby state can be shortened.

Moreover, it is possible to reduce the number of the capacitors used for the auxiliary power supply 24 and reduce the volume of the auxiliary power supply 24, and the cost of the auxiliary power supply 24 can be reduced.

Then, when rising from the standby state, while supplying the power of 1200 W to main heating element 22*a* by 100V from the main power supply 23, the power of 800 W is supplied to auxiliary heating element 22*b* by 20V from the auxiliary power supply 24, and the heater 22 is made to heat.

That is, if the lead wire which makes the current comparatively small and connects main heating element 22*a* from the main power supply 23 is made comparatively thin and voltage of the auxiliary power supply 24 is made high, when 100V and the high voltage like the main power supply 23 for example, can be supplied, since the number of the capacitor used for the auxiliary power supply 24 will increase and the auxiliary power supply 24 will be enlarged, voltage of the auxiliary power supply 24 is made low, and large current is supplied.

Thus, if power is supplied to the heater 22 and predetermined temperature is reached, the control unit 32 will cut off the power which the switching unit 27 is operated and is supplied to auxiliary heating element 22*b* from the auxiliary power supply 24.

And the power currently supplied to main heating element 22*a* from the main power supply 23 maintains the heater 22 at the predetermined temperature.

Between the heater 22 maintained at the predetermined temperature, and the pressure roller 15, as shown in FIG. 3, the recording paper 16 which imprinted the toner image 17 is conveyed, heating fusion of the toner image 17 is carried out in the heater 22, and it is established at the recording paper 16.

Since the cylindrical film 31 is formed in the portion in contact with the toner image 17 of the heater 22 when the toner image 17 imprinted on the recording paper 16 in the heater 22 is established, it can prevent the toner adhering.

When the image forming operation ends after the predetermined number of copy repetitions for the fixing of the toner image 17 to the recording paper 16, the image forming apparatus 1 is in the standby state. The control unit 32 turns OFF the main switch 25 and operates the switching unit 27 to connect the auxiliary power supply 24 to the charger 26, so that the power from the main power supply 23 is supplied through the charger 26 to the auxiliary power supply 24 and the charging of the auxiliary power supply 24 is performed. After this, whenever the image forming operation is performed, the above-mentioned operation is repeated.

Thus, when starting the image forming operation by charging the auxiliary power supply 24 whenever the image forming apparatus 1 will be in the standby state, the auxiliary power supply 24 can always maintain the predetermined amount of charge, can supply power from the auxiliary power supply 24 certainly at the time of heating starting, and can start the heater 22 to the temperature predetermined in a short time.

Moreover, degradation by the repetition of the charging and discharging is few, and the number of times of the permission repetition of the charging and discharging of the capacitor used for the auxiliary power supply 24 is 10,000 times or more. When compared with the nickel-cadmium battery whose number of times of the permission repetition of the charging and discharging is about 500–1000 times, it can be used and stabilized for a long period of time.

Moreover, the liquid exchange, the supplement, etc. which are needed for a lead battery are unnecessary and it can be used without hardly needing the maintenance.

In the above-described embodiment, the power from the main power supply 23 is supplied only to the main heating element 22*a* to heat the heater 22 when the image forming apparatus 1 is powered up early in the morning and the heater 22 of the fixing device 10 is heated. However, there is also a case in which the amount of charge of the capacitor of the auxiliary power supply 24 is not decreased so much, when the image forming apparatus 1 is powered up early in the morning.

Figure 11:
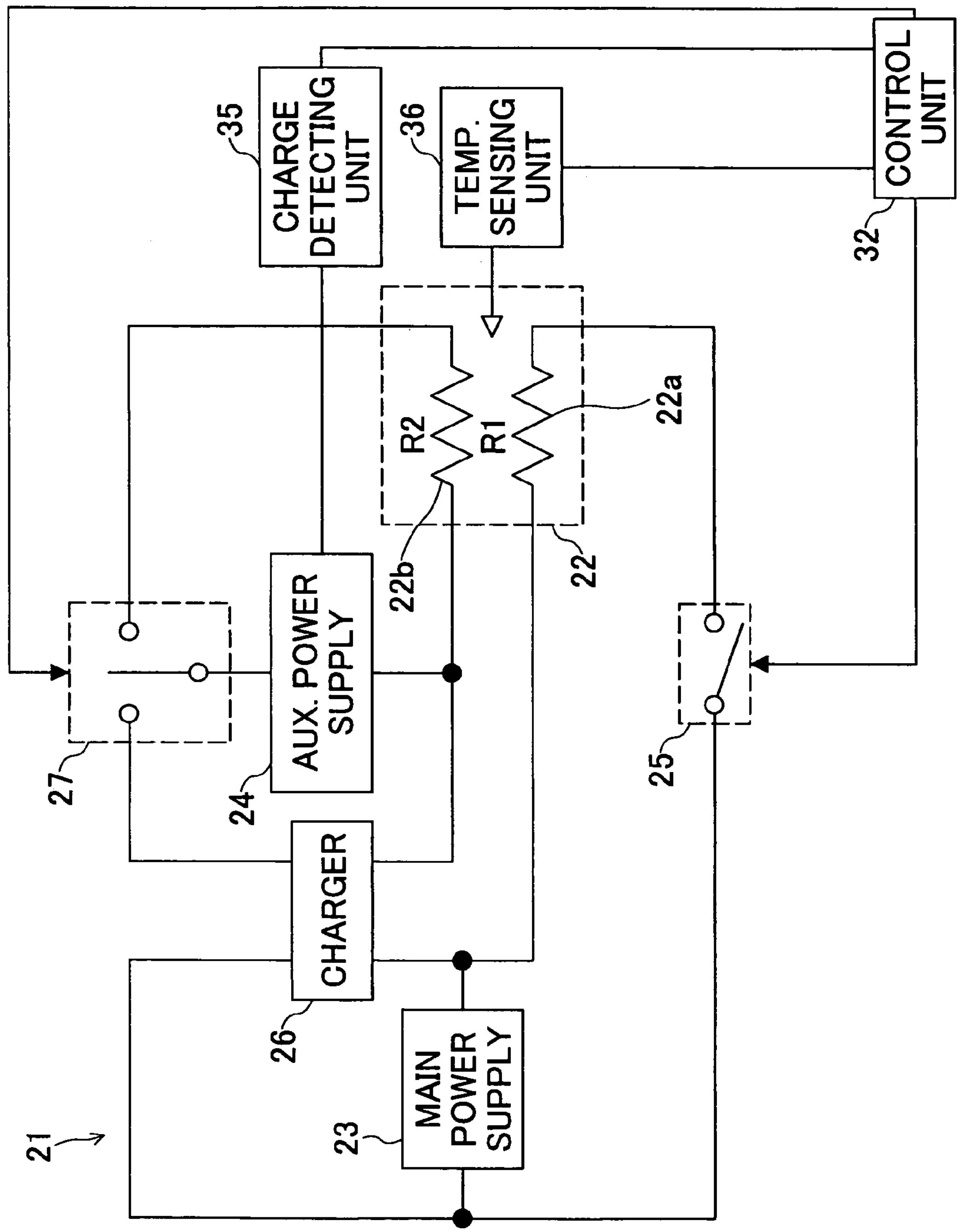
FIG. 11 is a circuit diagram of a second embodiment of the heating device of the invention.

Then, as shown in the circuit diagram of FIG. 11, it is possible to provide the charge detecting unit 35 which detects the amount of charge of the auxiliary power supply 24 is provided. When the image forming apparatus 1 is powered up, the power is supplied to the main heating element 22*a* from the main power supply 23, and the supply of power to the auxiliary heating element 22*b* from the auxiliary power supply 24 is controlled according to the detected amount of charge of the auxiliary power supply 24.

Figure 12:
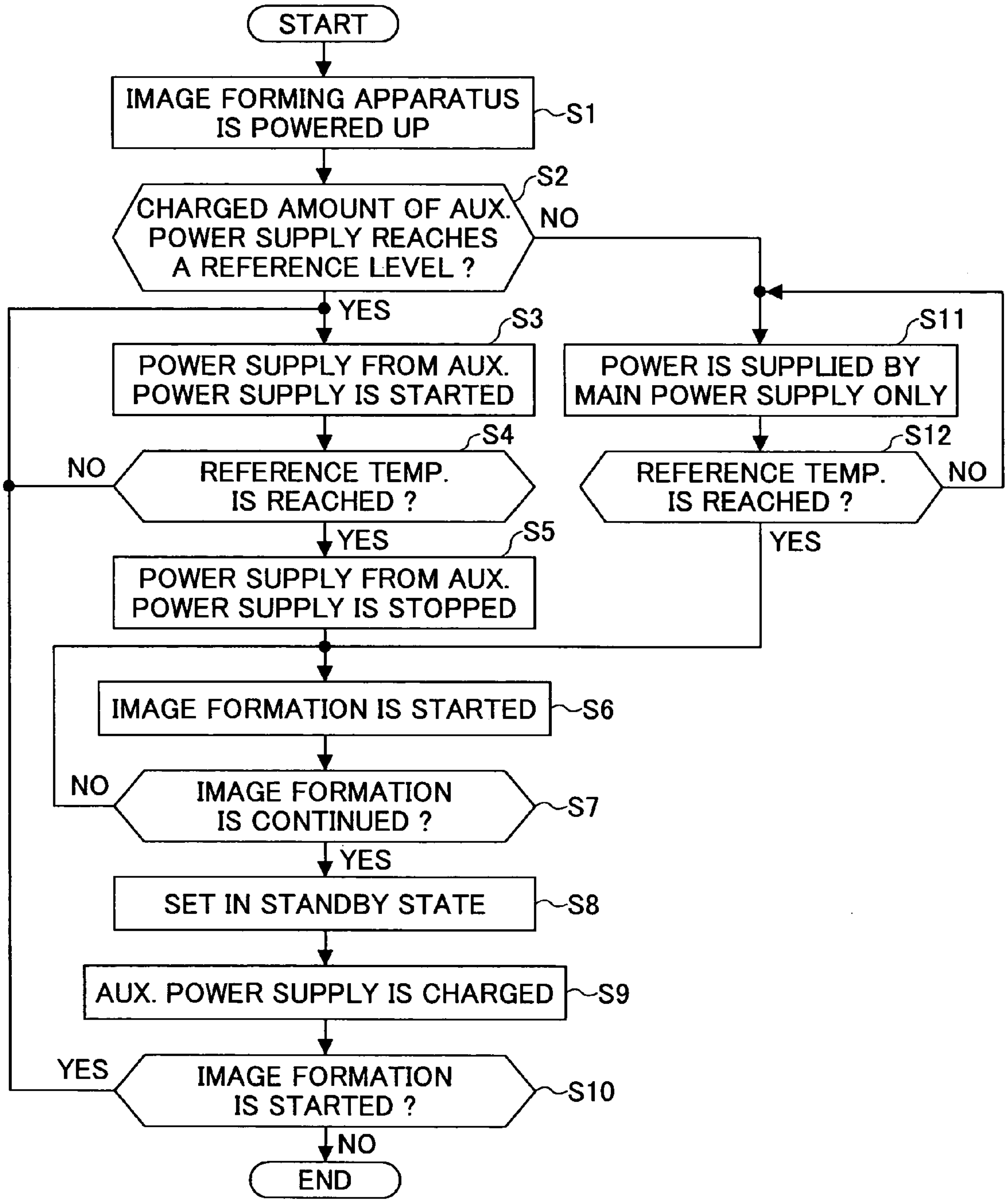
FIG. 12 is a flowchart for explaining operation of the fixing device of the present embodiment.

FIG. 12 is a flowchart for explaining operation of the fixing device of the present embodiment.

For example, when the image forming apparatus 1 is powered up early in the morning (step S1), the charge detecting unit 35 detects the amount of charge of the capacitor of the auxiliary power supply 24, and sends it to the control unit 32.

The control unit 32 determines whether the detected amount of charge of the auxiliary power supply 24 reaches a predetermined reference amount (step S2). When the detected amount reaches the reference amount, the power is supplied to the main heating element 22*a* from the main power supply 23, and the power is supplied to the auxiliary heating element 22*b* from the auxiliary power supply 24 in order to heat the heater 22 (step S3).

The control unit 32 determines whether the temperature of the heater 22, which is detected by the temperature detecting unit 36, such as a thermistor, thermocouple or radiation thermometer, while the heater 22 is heated, reaches a predetermined temperature (step S4). The control unit 32 cuts off the power currently supplied to the auxiliary heating element 22*b* from the auxiliary power supply 24 when the heater temperature reaches the predetermined temperature. And with the power currently supplied to the main heating element 22*a* from the main power supply 23, the heater 22 is maintained at the predetermined temperature (step S5).

Figure 13:
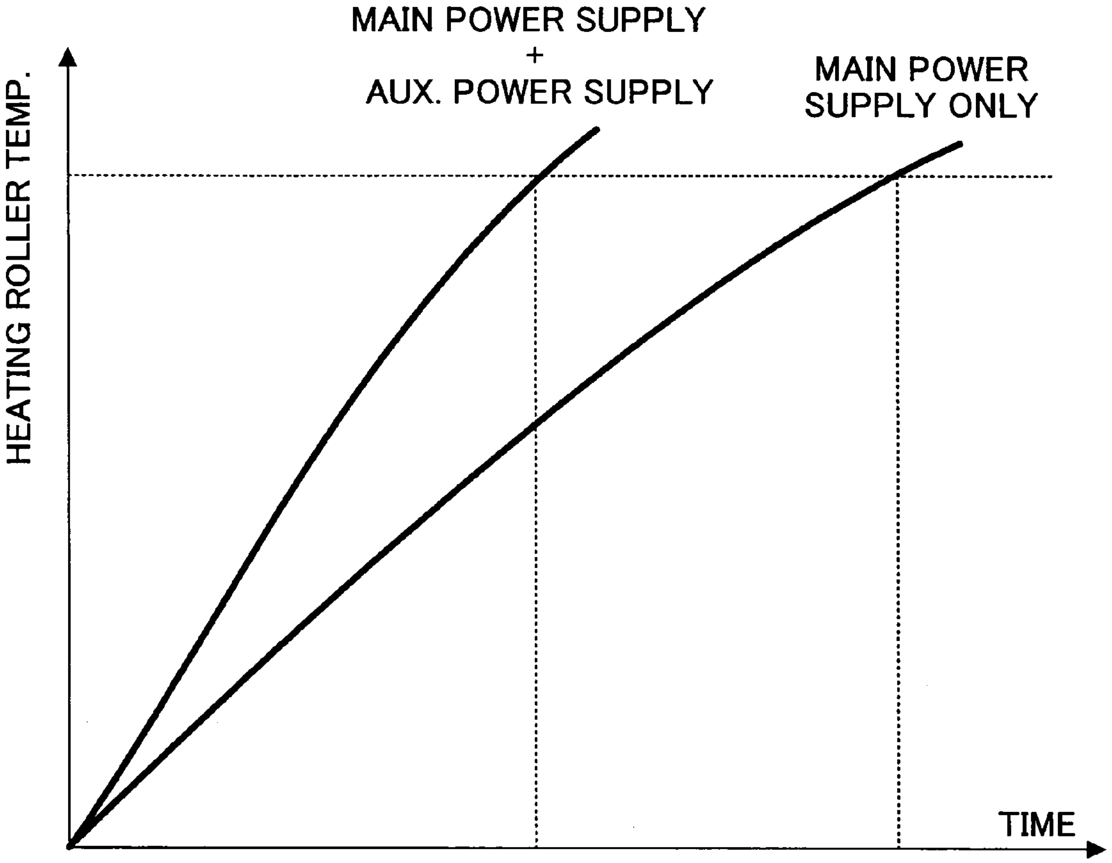
FIG. 13 is a diagram for explaining the time versus temperature characteristics of the fixing device of the present embodiment.

When the power supply of the image forming apparatus 1 is switched on and the amount of charge of the auxiliary power supply 24 reaches the reference amount, By supplying power to the heater 22 from the main power supply 23 and the auxiliary power supply 24, as shown in the time versus temperature characteristics of FIG. 13, after starting heating of the heater 22 compared with the case where power is supplied, only with the main power supply 23 until it reaches the predetermined temperature T can be shortened, and the heater 22 can be heated to the temperature T predetermined in a short time for the 10 or less seconds.

The control unit 32 starts the image forming operation in this state (step S6).

When the image forming operation is completed and the image forming apparatus 1 will be in the standby state (steps S7 and S8), the control unit 32 turns OFF the main switch 25, operates the switching unit 27, connects the auxiliary power supply 24 to the charger 26, from the main power supply 23, through the charger 26, will supply power to the auxiliary power supply 24, and will charge it (step S9).

After this, whenever the image forming operation is performed, the above-mentioned operation is repeated (steps S10, S3–S9).

Moreover, when the power supply of the image forming apparatus 1 is switched on and the amount of charge of the auxiliary power supply 24 does not reach the reference amount, power is supplied only to main heating element 22*a* from the main power supply 23, and the heater 22 is heated (steps S2, S11, and S12).

Thus, in order to secure from the main power supply 3 the power of voltage 100V and 1200 W which are supplied to main heating element 22*a* by current 12 A and to supply the power of 800 W to auxiliary heating element 22*b* from the auxiliary power supply 24, when it connects with the eight-piece serial and the capacitor of 1300 F and 2.5V is formed in the auxiliary power supply 24, the resistance R1 of main heating element 22*a* is set to 8.3 ohms, and the resistance of auxiliary heating element 22*b* is set to.

Figure 14:
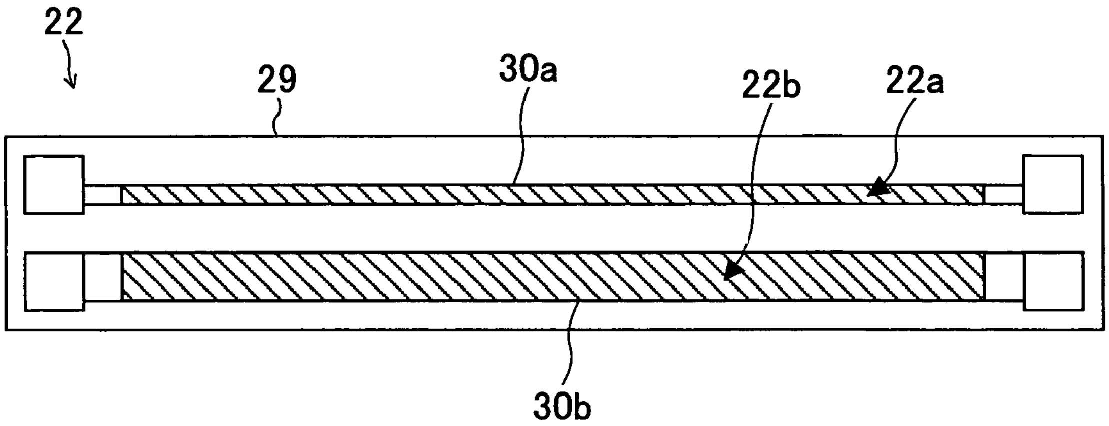
FIG. 14 is a top view of a variation of the heating device in the fixing device of the present embodiment.

Then, as shown in FIG. 14, main heating element 22*a* and auxiliary heating element 22*b* can be made easy at the composition according to the characteristics of the main power supply 23 and the auxiliary power supply 24 by changing resistance pattern 30*b* of resistor pattern 30*a* and auxiliary heating element 22*b* of main heating element 22*a* formed in the ceramic substrate 29, and enlarging the cross section of resistance pattern 30*b* of the auxiliary heating element 22*b*.

In the above-mentioned embodiment, the main heating element 22*a* and the auxiliary heating element 22*b* are formed with the ceramic heater. Alternatively, the main heating element 22*a* and the auxiliary heating element 22*b* may be formed with thin-film metal resistors.

Figure 15:
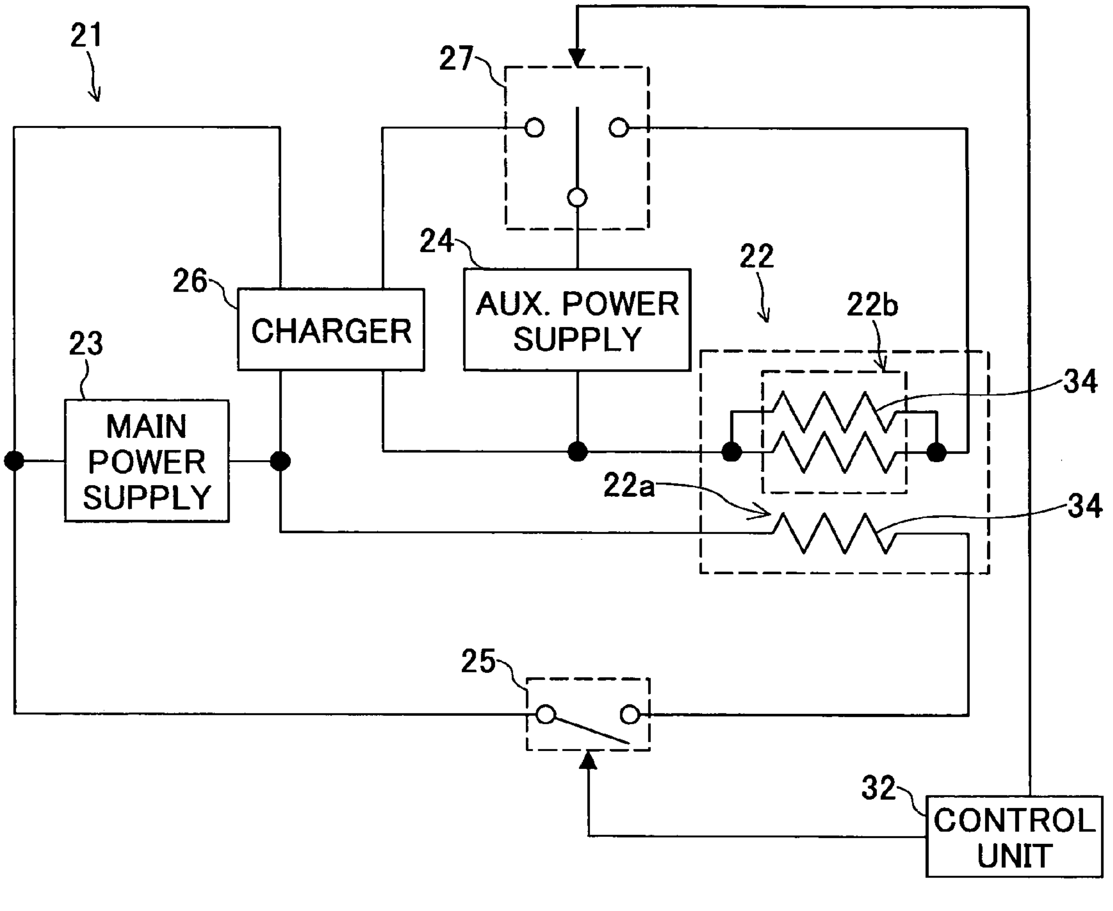
FIG. 15 is a circuit diagram of a third embodiment of the heating device of the invention.
Figure 16:
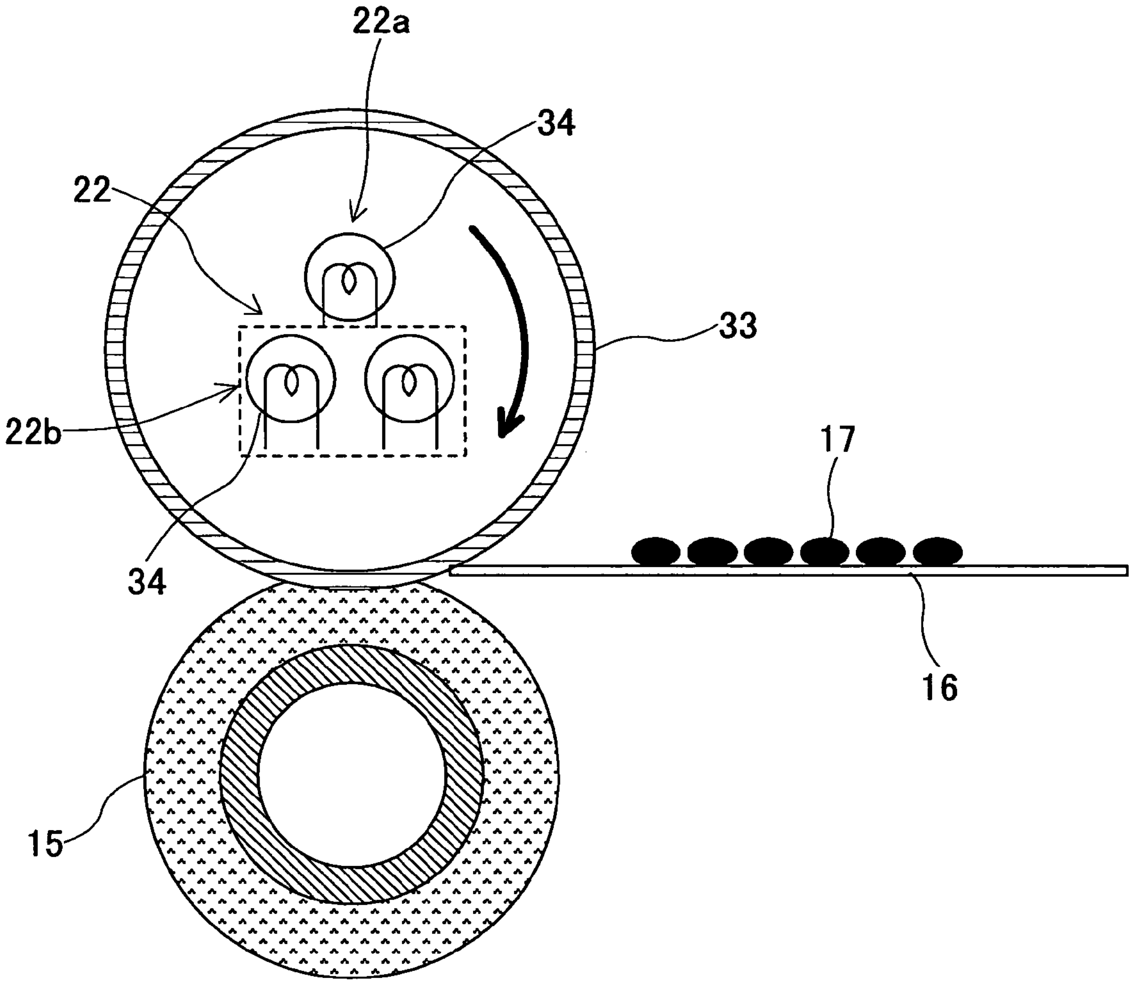
FIG. 16 is a cross-sectional view of the fixing roller having a halogen heater as an auxiliary heating element.

Moreover, as the auxiliary heating element 22*b*, instead of the ceramic heater or the thin-film metal resistor, as shown in the circuit diagram of FIG. 15 and the cross-sectional view of FIG. 16, it is possible to form two or more halogen heaters 34 in the interior of the fixing roller 33 in parallel as the auxiliary heating element 22*b* with the main heating element 22*a* which includes the halogen heater 34.

Thus, by using two or more halogen heaters 34 connected in parallel with auxiliary heating element 22*b*, large current can be passed to auxiliary heating element 22*b*.

Figure 17A:
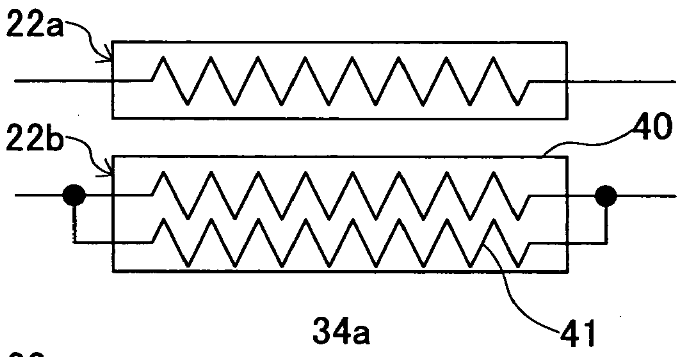
FIG. 17A, FIG. 17B and FIG. 17C are diagrams showing variations of the halogen heater providing in the fixing roller.

Furthermore, as shown in the block diagram of the heater 22 of FIG. 17, the auxiliary heating element 22*b* may be constituted from the halogen heater 34*a* which has the plurality 41, for example, the two heating wires, inside the glass tube 40, and may be provided in the interior of the fixing roller 33.

Thus, since there is only one glass tube 40 even when two or more heating wires 41 are used, heat capacity can be made small, the quantity of heat required for making the glass tube 40 at the time of temperature rise to heat the heater 22 can be made small, and the temperature rise time can be shortened.

Moreover, since the glass tube 40 is shared by two or more heating wires 41, the space to install the auxiliary heating element 22*b* can be made small. Therefore, it is applicable to the fixing roller 33 having a small diameter and a small heat capacity.

Figure 17B:
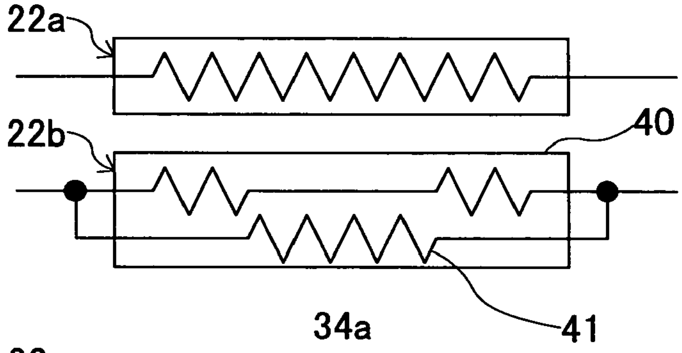

Moreover, by changing the resistance of two or more heating wires 41 provided in the interior of the glass tube 40 as shown in FIG. 17B, it is suitable to make the luminescence distributions of the respective heating wires 41 in the length direction of the glass tube 40 different from each other.

The thermal distribution of the halogen heater is adjusted depending on the method of turning the heating wires 41, and for the region where the resistance is high and the amount of luminescence is high, the heating wires 41 are made into the shape of a coil and the number of turns is increased, and the volume of the heating wires 41 in the interior of the glass tube 40 is increased for the region where the amount of luminescence is large.

If two or more heating wires 41 are provided in the glass tube 40, it is necessary to enlarge the diameter of the glass-tube 40 in the same region.

In order to prevent this, the resistance of two or more heating wires 41, i.e., the luminescence distribution, is changed in the direction of the length of the glass tube 40, the size of the amount of luminescence of each heating wire 41 is formed so that it may become alternate, and the path of the glass tube 40 is made small.

Figure 17C:
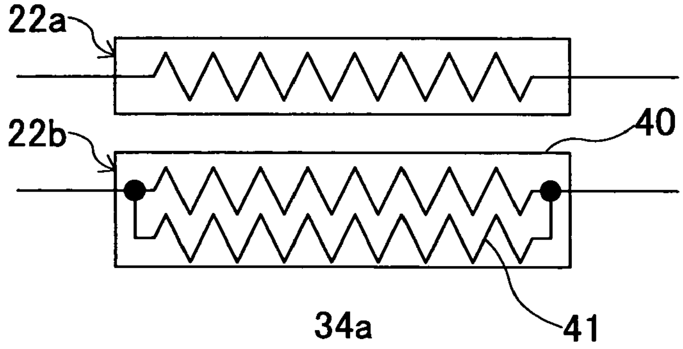

Furthermore, as shown in FIG. 17C, by connecting the both ends of two or more heating wires 41, and providing in the interior of the glass tube 40, the external connection terminal of halogen heater 34*a* which has two or more heating wires 41 can be packed into one, terminal composition can be simplified, and connection with auxiliary power supply 24 grade can be made easy.

Figure 18:
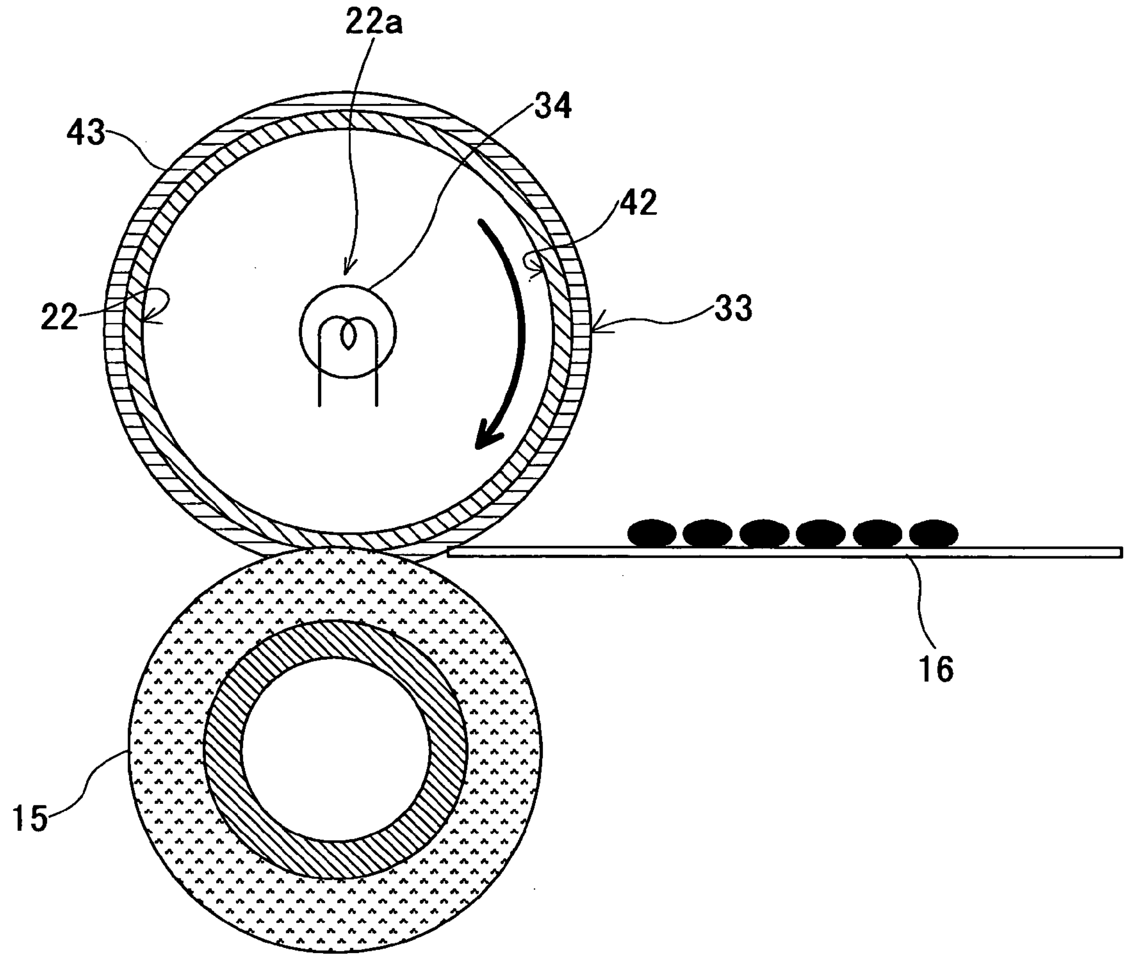
FIG. 18 is a cross-sectional view of the fixing roller having a thin-film metal auxiliary heating element.

Moreover, as shown in FIG. 18, while providing main resistor 22*a* which includes the halogen heater 34 in the interior of the fixing roller 33, it is possible to form in the inside of the roller base 43 the thin-film metal 42 like stainless steel which will generate heat if it energizes for auxiliary heating element 22*b*.

In this case, the roller base 43 may be made of ceramics or metal, such as aluminum or iron. When metal is used as the roller base 43, an insulating layer, such as a heat-resistant resin and ceramics, is provided between the roller base 43 and the thin-film metal 42.

Thus, by providing the auxiliary heating element 22*b* on the roller base 43, the heat of the auxiliary heating element 22*b* can be directly transferred to the roller base 43, and the fixing roller 33 can be heated to a predetermined temperature in a short time.

In the above-mentioned embodiment, the fixing device 10 of the image forming apparatus 1 is heated with the heating device 21. This is applicable to various heat-transfer devices and temperature-controlled devices.

Figure 19:
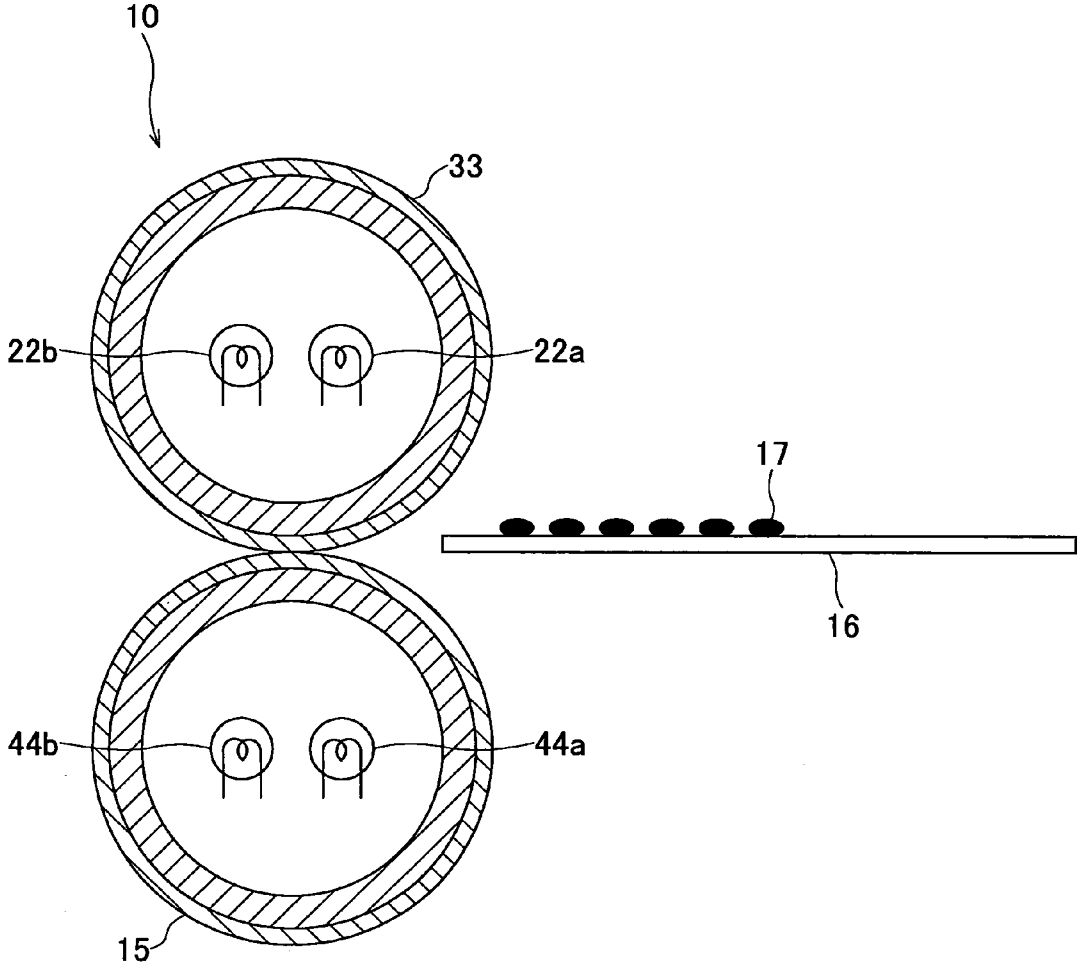
FIG. 19 is a cross-sectional view of a fourth embodiment of the fixing device of the invention.
Figure 20:
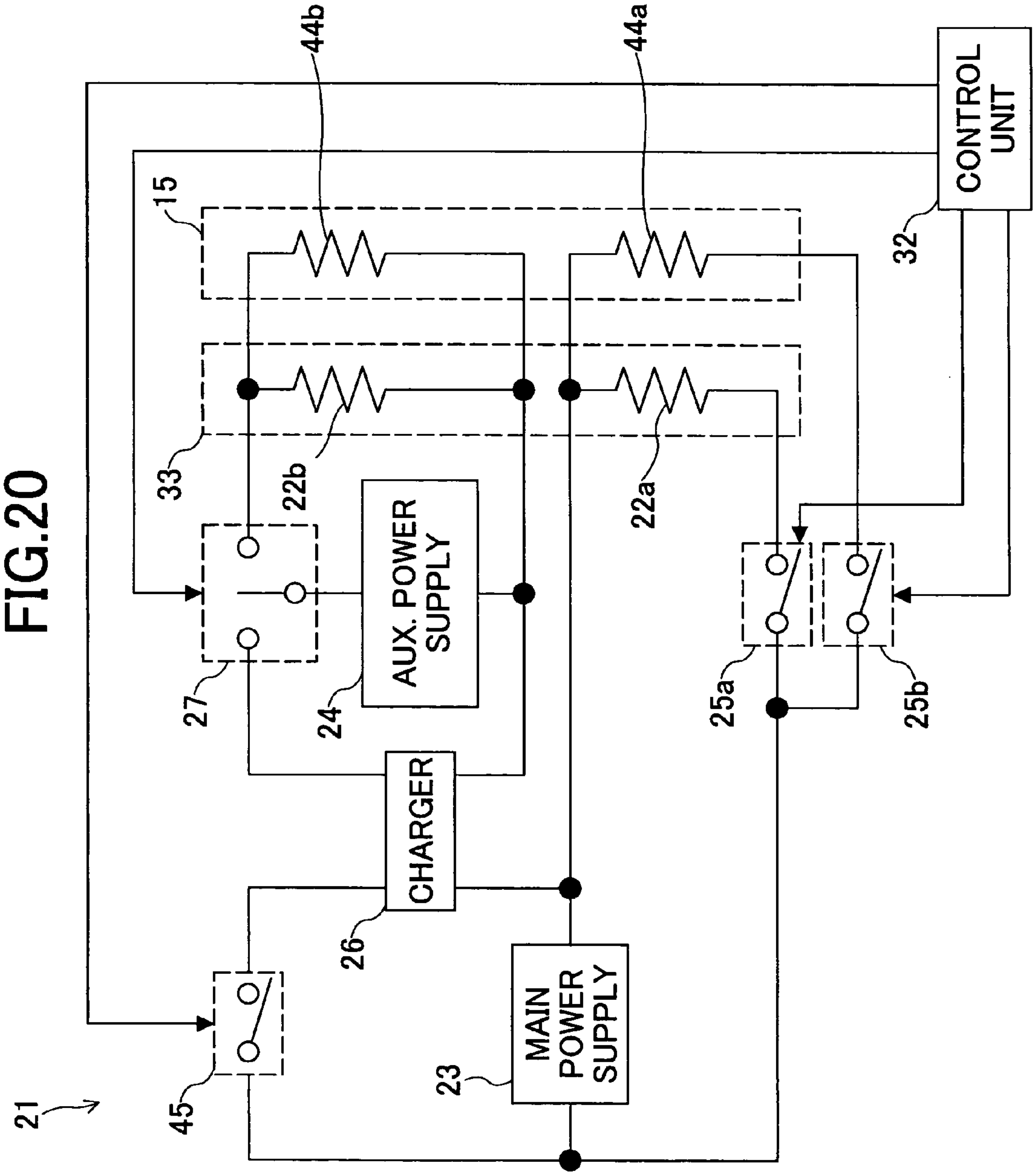
FIG. 20 is a circuit diagram of a first embodiment of the heating device in the fixing device of the present embodiment.

Moreover, although the above-mentioned explanation explained the case where main heating element 22*a* and auxiliary heating element 22*b* are provided in the fixing roller 33, power is supplied to main heating element 44*a* from the main power supply 23, it heats, and it is possible to make it supply power to auxiliary heating element 44*b* from the auxiliary power supply 24, as shown in the block diagram of FIG. 19, and the main heating element 44*a* and the auxiliary heating element 44*b* are provided also in the pressure roller 15 as shown in the circuit diagram of FIG. 20.

Thus, by providing and heating main heating element 44*a* and auxiliary heating element 44*b* also on the pressure roller 15, the fixing device 10 can be heated more efficiently and it can maintain at the predetermined temperature.

Moreover, when forming the color image etc. by controlling independently the power supplied to main heating element 22*a* provided in the fixing roller 33, and the power supplied to main heating element 44*a* provided in the pressure roller 15 by different main switches 25*a* and 25*b*, the quality of image of the image which can be established on the optimal conditions and forms the toner image 17 imprinted by the recording paper 16 can be improved.

Moreover, since the voltage applied to auxiliary heating element 44*b* of the pressure roller 15 turns into the voltage and the voltage which are applied to auxiliary heating element 22*b* of the fixing roller 33 from the auxiliary power supply 24, the pressure roller 15 and the fixing roller 33 are controllable by the temperature characteristics suitable for each by setting auxiliary heating element 44*b* of the pressure roller 15, and auxiliary heating element 22*a* of the fixing roller 33 as the different resistance.

Thus, in order for large current to flow on this cable if it connects by the cable common from the switching unit 27 to auxiliary heating element 22*b* and auxiliary heating element 44*b* when supplying power to auxiliary heating element 22*b* of the fixing roller 33, and auxiliary heating element 44*b* of the pressure roller 15 from the auxiliary power supply 24, it is necessary to use the cable according to the current.

Figure 21:
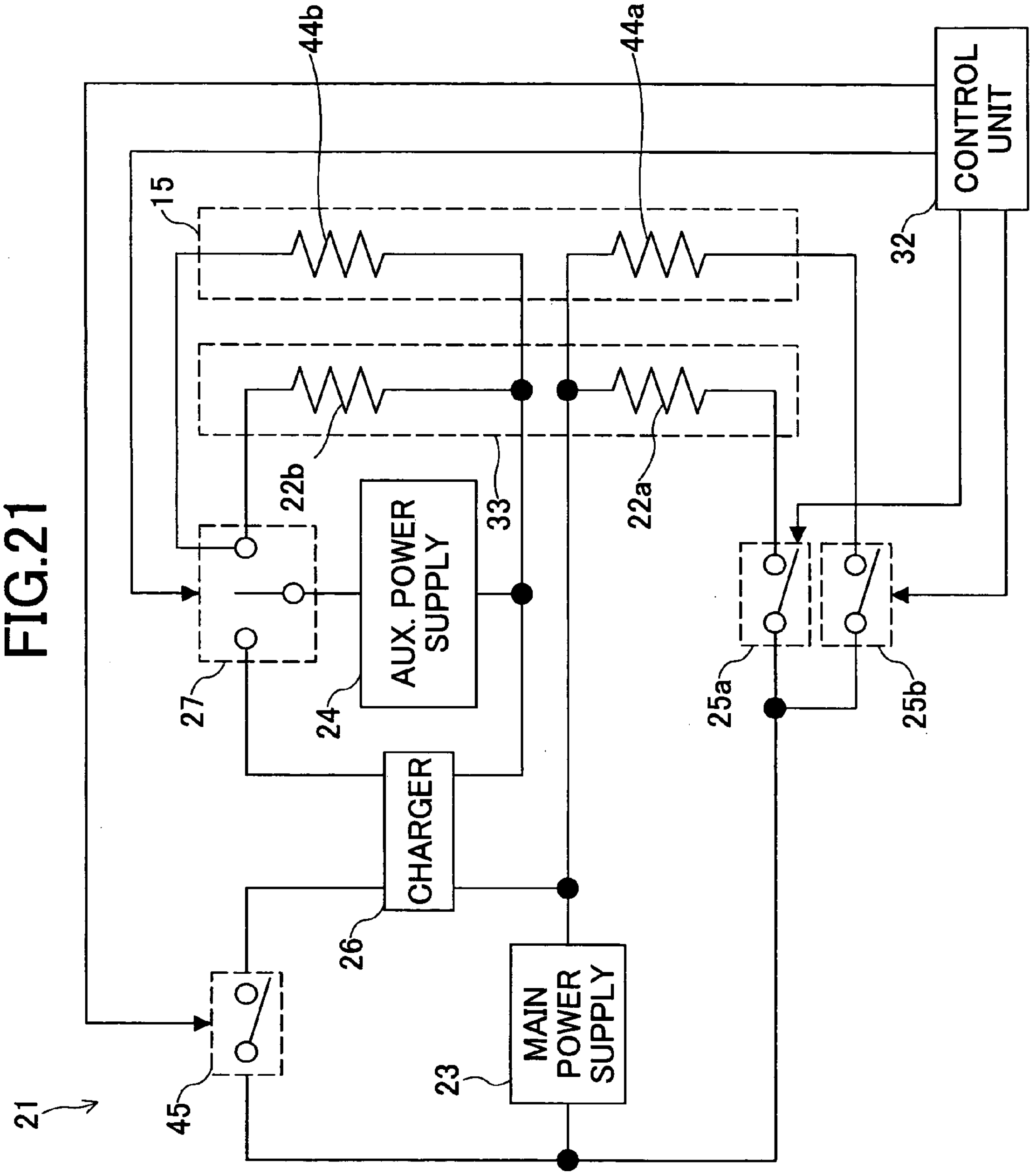
FIG. 21 is a circuit diagram of a second embodiment of the heating device in the fixing device of the present embodiment.

Then, as shown in the circuit diagram of FIG. 21, auxiliary heating element 22*b* and auxiliary heating element 44*b* are connectable with the switcher 27 with the cable suitable for the current value by connecting it between the switching unit 27 and auxiliary heating element 22*b* and between the switching unit 27 and auxiliary heating element 44*b* by the different cable, and lessening the current which flows on each cable.

Figure 22:
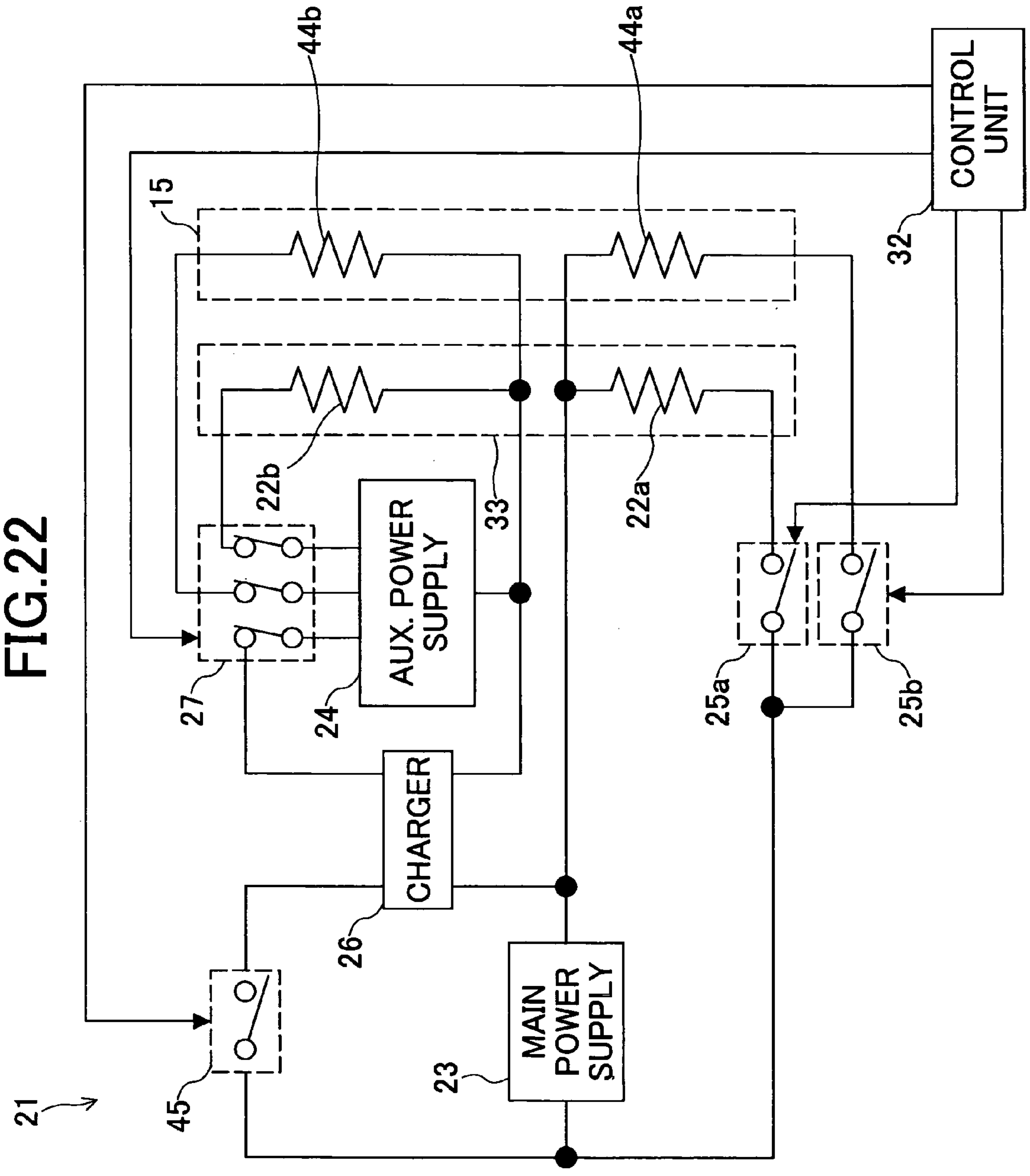
FIG. 22 is a circuit diagram of a third embodiment of the heating device in the fixing device of the present embodiment.

Moreover, two or more output terminals are provided in the auxiliary power supply 24, and it is possible to make it supply power to auxiliary heating element 22*b* and auxiliary heating element 44*b* through the switcher 27 from each output terminal, as shown in the circuit diagram of FIG. 22.

In this case, the pressure roller 15 and the fixing roller 33 are controllable by the temperature characteristics suitable for each by controlling independently the power supplied to auxiliary heating element 22*b* and auxiliary heating element 44*b* by the switcher 27.

Figure 23:
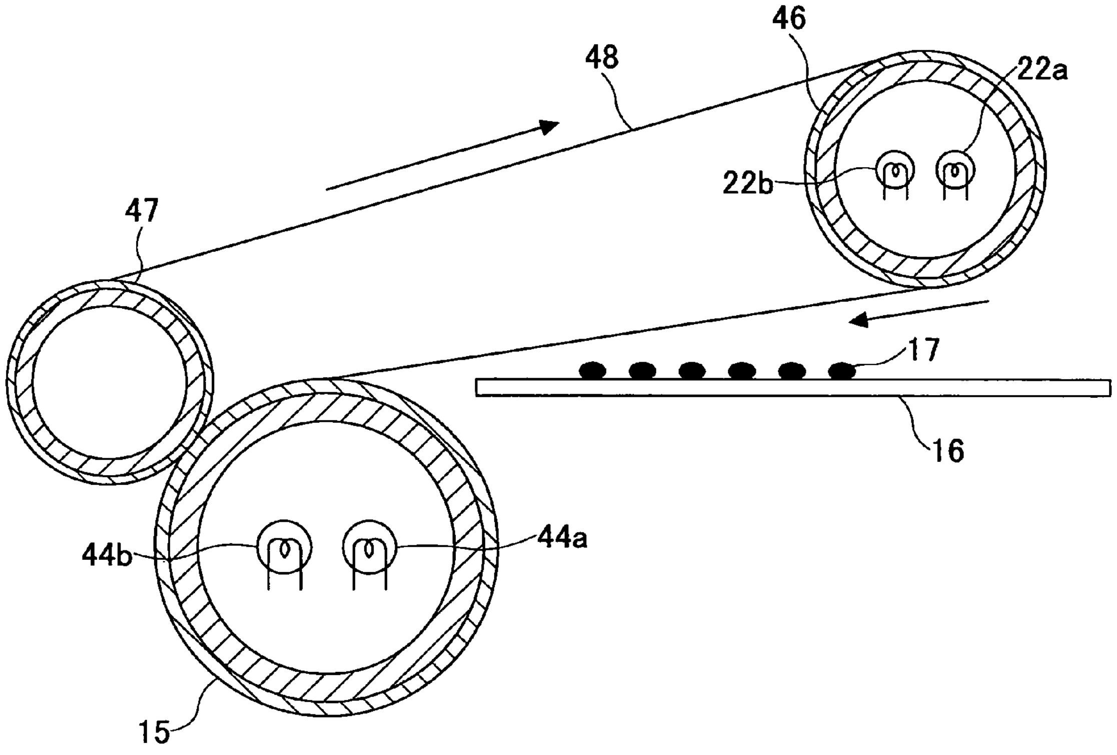
FIG. 23 is a cross-sectional view of a fifth embodiment of the fixing device of the invention.

As shown in the block diagram of FIG. 23, while using the fixing belt 48 wound about around main heating element 22*a*, the heating roller 46 which has auxiliary heating element 22*b*, and the auxiliary roller 47 and heating the fixing belt 48 with the heating roller 46, it is possible to make the pressure roller 15 heat, although the above-mentioned explanation explained the case where the fixing roller 33 is formed in the fixing device 10.

Figure 24:
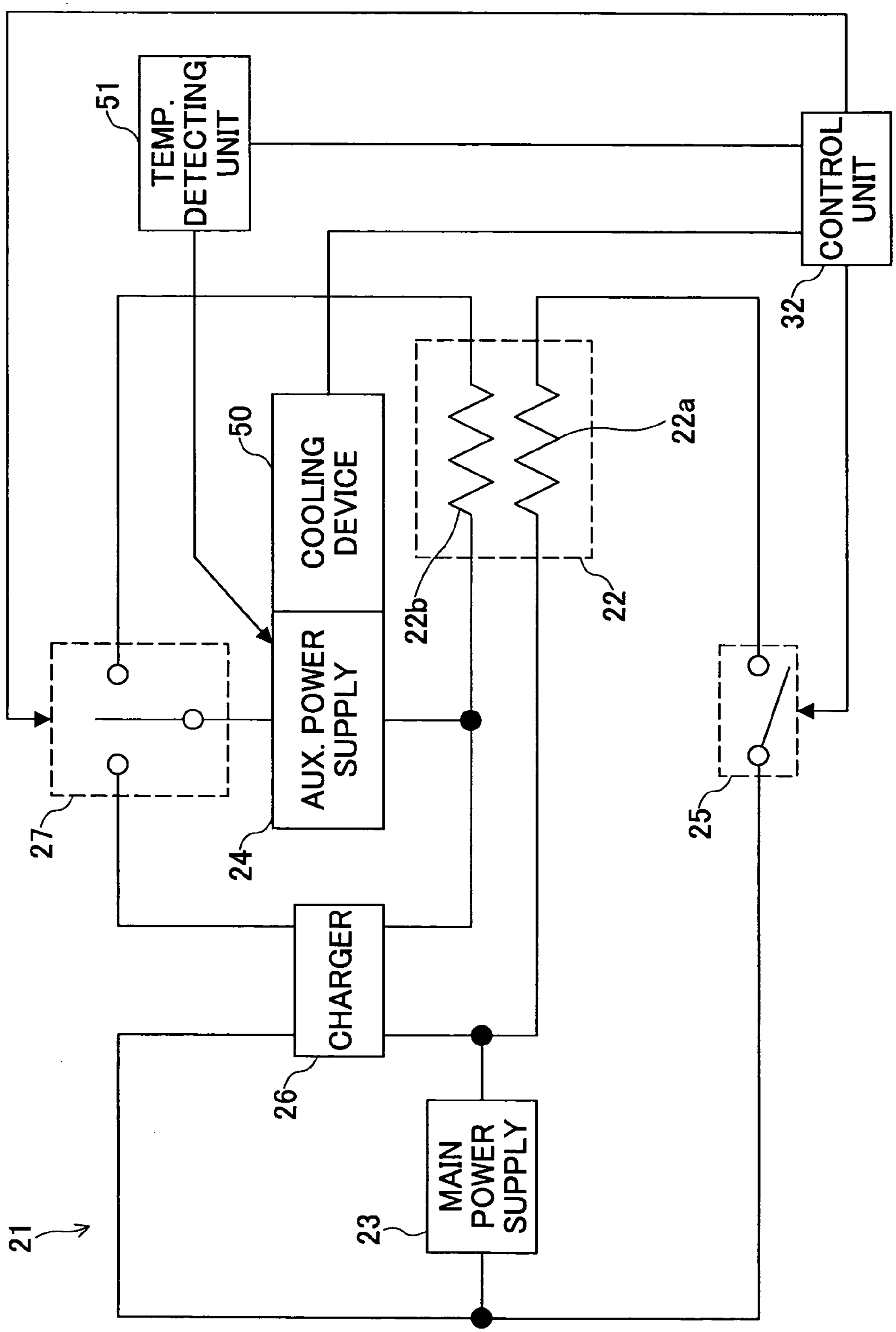
FIG. 24 is a circuit diagram of the fixing device having a cooling device.

Moreover, as shown in FIG. 24, it is suitable for the heating device 21 to cool the auxiliary power supply 24 with the cooling unit 50 according to the temperature of the auxiliary power supply 24 which formed the temperature detecting element 51 which detects a cooling unit 50 to cool the auxiliary power supply 24, and the temperature of the auxiliary power supply 24, and is detected by the temperature detecting element 51.

Thus, by cooling the auxiliary power supply 24 with the cooling unit 50, it can prevent the auxiliary power supply 24 from becoming high temperature, which causes the durability to deteriorate, and the durability of the auxiliary power supply 24 can be improved.

Moreover, by detecting the temperature of the auxiliary power supply 24 directly by the temperature detecting element 51, and controlling the drive of the cooling unit 50 by the control unit 32, it is possible to prevent the auxiliary power supply 24 from being heated or cooled too much, and it is possible to improve the durability of the electric double-layer capacitor etc. of the auxiliary power supply 24, and the electric discharge effect can be heightened.

Figure 25A:
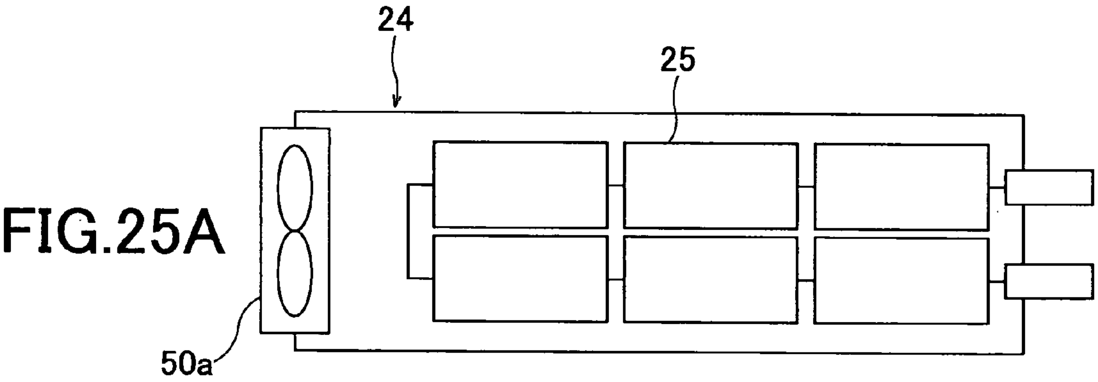
FIG. 25A and FIG. 25B are diagrams showing the auxiliary power supply having a cooling device.

As shown in the block diagram of FIG. 25A, the cooling unit 50 attaches fan 50*a* in the auxiliary power supply 24 to which two or more battery cells 52, such as the electric double-layer capacitor, are summarized directly, it cools with the external air, or circulates through the peltier element or the coolant object with the pump, and should just cool them.

Thus, even if it arranges the auxiliary power supply 24 which supplies large current to auxiliary heating element 22*b* by cooling the auxiliary power supply 24 directly in the near position of the heater 22, it connects by short wiring and it reduces the own heat loss of wiring, it can prevent the auxiliary power supply 24 heating too much with the heat of the heater 22, it is stabilized in auxiliary heating element 22*b* from the auxiliary power supply 24, and large current can be supplied.

Moreover, when driving the fan 50*a* by the control unit 32 to cool the auxiliary power supply 24, the rotational speed of fan 50*a* may be varied to control the flow rate of cooling air according to the operating state as to whether the power is supplied to the auxiliary heating element 22*b* or whether the auxiliary power supply 24 is being charged. In the present embodiment, the temperature rise of the auxiliary power supply 24 can be suppressed more efficiently.

That is, when charging the auxiliary power supply 24, the generation of heat by the auxiliary power supply 24 tends to become large rather than the time of discharging. Then, the airflow is increased at the time of charging of the auxiliary power supply 24, and the cooling efficiency is raised.

Moreover, the flow rate of cooling air is increased when the heater 22 is heated, in order to prevent the auxiliary power supply 24 from being heated with the heat from the heater 22.

Thus, by controlling the cooling effects, such as the fan 50*a*, by the control unit 32 according to the operating state of the heating device 21, it is possible to prevent efficiently the excessive temperature rise of the auxiliary power supply 24, and the energy efficiency can be raised.

Figure 25B:
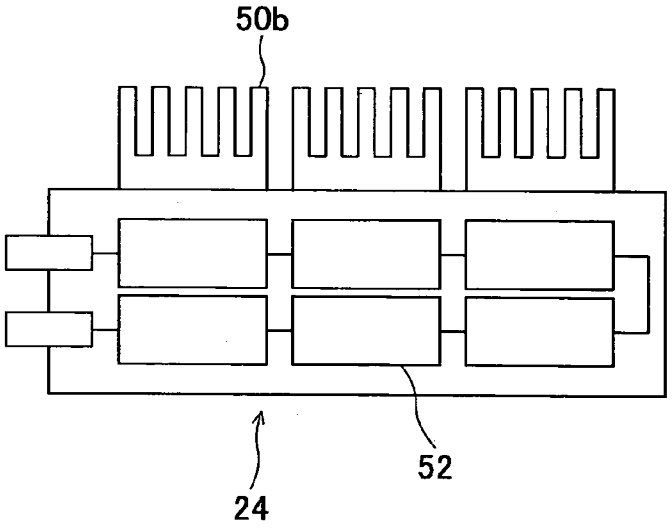

Moreover, as shown in FIG. 25B, as a cooling unit 50, it is possible to attach the fin or heat pipe 50*b*, which does not need drive control, to the auxiliary power supply 24.

Thus, by attaching the fin or heat pipe 50*b* which does not need drive control, it is possible to reduce the power dissipation at the time of standby state and at the time operating state. In this case, operation sound does not occur, and the silence of the image forming apparatus 1 is raised.

Figure 26:
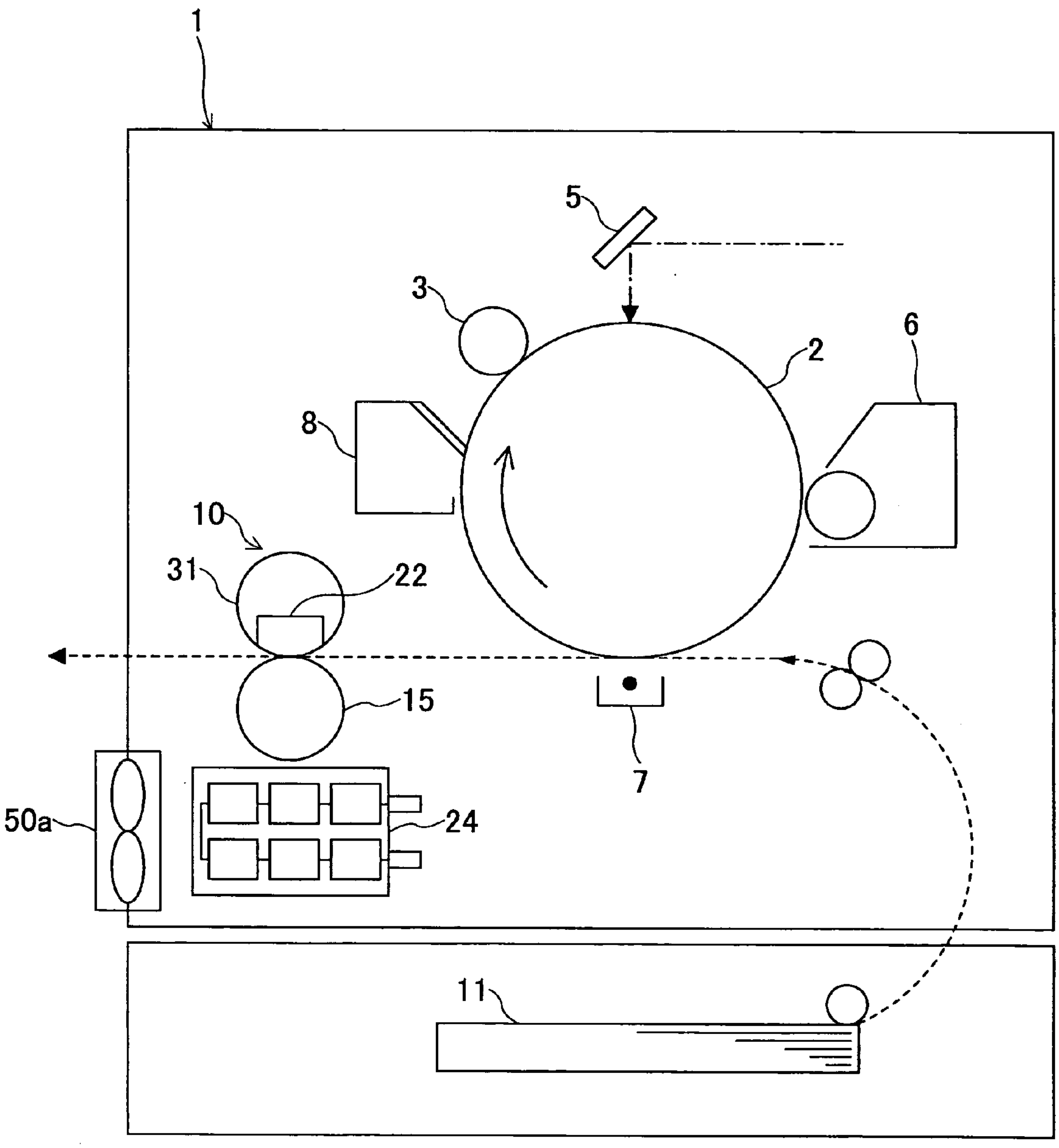
FIG. 26 is a diagram showing the image forming apparatus having a cooling device.

Furthermore, it arranges in the position near the position which has arranged the auxiliary power supply 24 of the image forming apparatus 1 for fan 50*a* which cools the auxiliary power supply 24 as shown in the block diagram of FIG. 26, the drive control of the fan 50*a* is carried out according to the temperature which detected and detected the temperature in the image forming apparatus 1, the temperature in the image forming apparatus 1 is maintained at the predetermined range, and it is possible to prevent the excessive temperature rise of the auxiliary power supply 24.

Namely, the temperature inside the image forming apparatus 1 rises at 70–80 degrees C. or more depending on the conditions of the heat generated at the fixing device 10, the other electric elements, etc.

The temperature rise has a significant influence to the temperature of the battery cells 52, such as the electric double-layer capacitor of the auxiliary power supply 24, and even if operation of the image forming apparatus 1 is completed, it will become the cause of raising the temperature of the auxiliary power supply 24.

Then, by detecting the internal temperature of the image forming apparatus 1, and cooling so that it may not become after the image forming operation ends over the predetermined temperature, the excessive temperature rise of the auxiliary power supply 24 can be prevented, and the durability can be raised.

Although each above-mentioned explanation explained the case where supplied power to main heating element 22*a* from the main power supply 23, and power is supplied to auxiliary heating element 22*b* from the auxiliary power supply 24 of another system in the main power supply 23.

As shown in FIG. 27, the two sets of auxiliary heating elements 22*b* and 22*c* may be formed, and power is supplied to the heater 22 of the cylindrical film 31 of the fixing device 10 or the fixing roller 33 from the auxiliary power supply 24 or the main power supply 23.

In this case, when changing connection of the auxiliary heating elements 22*b* and 22*c* to the auxiliary power supply 24 and the main power supply 23 by the change-over switch 53 and supplying power to the auxiliary heating elements 22*b* and 22*c* from the auxiliary power supply 24, the parallel connection of the auxiliary heating elements 22*b* and 22*c* is carried out, and when supplying power to the auxiliary heating elements 22*b* and 22*c* from the main power supply 23, the series connection of the auxiliary heating elements 22*b* and 22*c* is carried out.

Thus, when supplying power to the auxiliary heating elements 22*b* and 22*c* from the auxiliary power supply 24, large current can be supplied to the auxiliary heating elements 22*b* and 22*c* from the auxiliary power supply 24 of the low voltage by carrying out the parallel connection of the auxiliary heating elements 22*b* and 22*c*.

Moreover, when supplying power to the auxiliary heating elements 22*b* and 22*c* from the main power supply 23, the current which enlarges the resistance of the auxiliary heating elements 22*b* and 22*c*, and flows to the auxiliary heating elements 22*b* and 22*c* can be made small by carrying out the series connection of the auxiliary heating elements 22*b* and 22*c*.

Moreover, as shown in FIG. 27, the main heating element 22*a* is arranged in a predetermined range of the center of the cylindrical film 31 of the fixing device 10 or the fixing roller 33, for example, the range corresponding to A4 size recording paper most frequently used in the image forming apparatus 1, and the auxiliary heating elements 22*b* and 22*c* are arranged at both ends of the range, respectively.

Figure 27A:
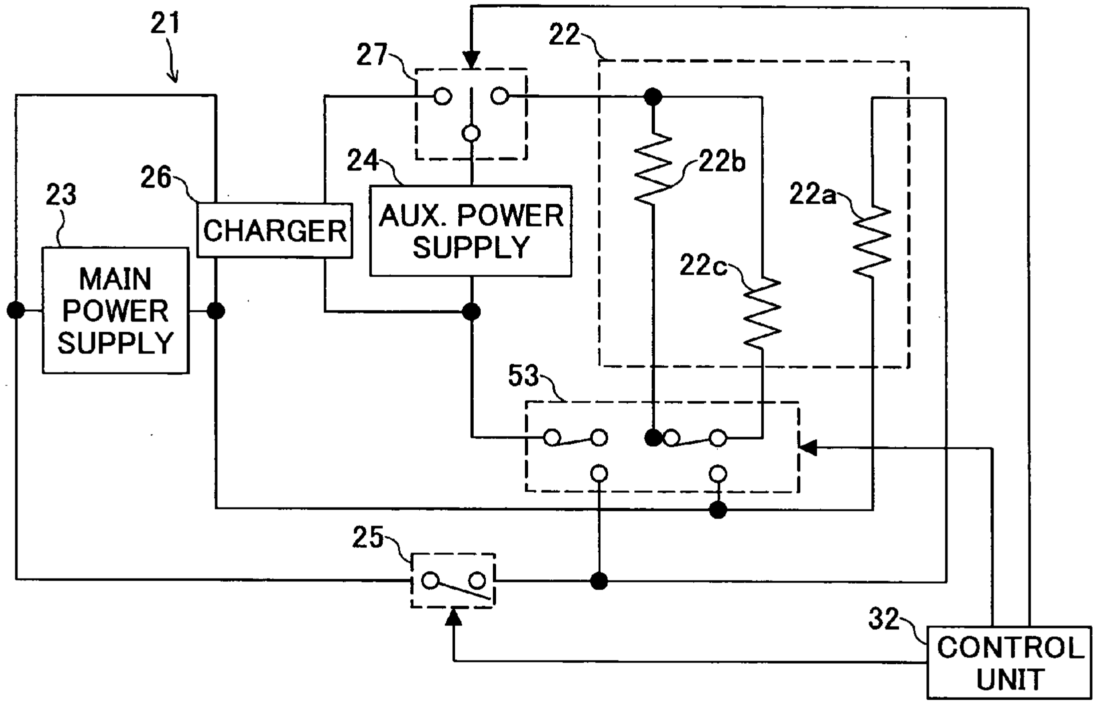
FIG. 27A and FIG. 27B are circuit diagrams of the heating device in which power from the auxiliary power supply and power from the main heating element are supplied to the auxiliary heating element.

When starting the fixing device 10, making it heat from the low temperature to the predetermined temperature or rising from the standby state, the parallel connection of the auxiliary heating elements 22*b* and 22*c*, as shown in FIG. 27A, is established so that the power is supplied to the main heating element 22*a* of the heater 22 from the main power supply 23, and the power is supplied to the auxiliary heating elements 22*b* and 22*c* from the auxiliary power supply 24.

Thus, a large amount of power can be supplied to the heater 22 at the time of starting of the fixing device 10, and the fixing device 10 can be heated to a predetermined temperature in a short time.

Figure 27B:
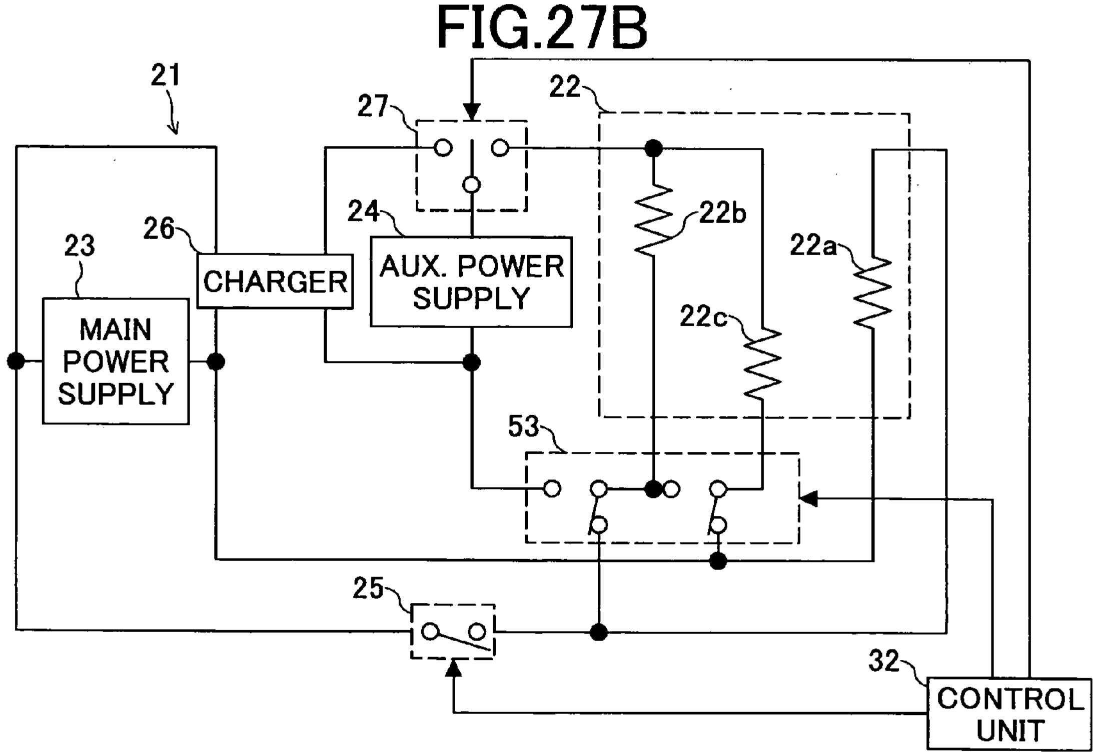

When the heater 22 is heated to the predetermined temperature, the series connection of the auxiliary heating elements 22*b* and 22*c*, as shown in FIG. 27B, is established by the switching operation so that the power is supplied from the main power supply 23.

For example, if the power of 1200 W is supplied to the auxiliary heating elements 22*b* and 22*c* at the voltage of 60V from the auxiliary power supply 24 and the power of 600 W is supplied to the main heating element 22*a* at the voltage of 100V from the main power supply 23 when starting the fixing device 10, the power of 1800V can be supplied to the fixing device 10.

If the auxiliary heating elements 22*b* and 22*c* are switched to the series connection and power is supplied from the main power supply 23, when the fixing device 10 heats to the predetermined temperature by supply of the power the auxiliary heating elements 22*b* and 22*c* about 800 the power of 1400 W can be supplied to the fixing device 10 in the range which can supply the power of W and does not exceed 15 A which is the maximum of the supply voltage of the source power supply.

Moreover, since the cylindrical film 31 or the thin-layered fixing roller 33 has a small heat capacity, it enables the temperature rise for a short time, but the surface temperature irregularity tends to occur.

And although the quantity of heat is taken from the range which the recording paper 16 passes in case the recording paper 16 with small size is passed continuously, since the heat is accumulated in the circumferential portion where the recording paper 16 does not pass, it becomes the unusual high temperature, and there is fault of shortening the life of the fixing device 10.

On the other hand, when the auxiliary heating elements 22*b* and 22*c* are formed in the circumferential portion of the cylindrical film 31 or the fixing roller 33 and the fixing device 10 reaches the predetermined temperature, the series connection of the auxiliary heating elements 22*b* and 22*c* is carried out.

By passing the small current from the main power supply 23, it can suppress that reduce the quantity of heat added to the circumferential portion where the recording paper 16 does not pass, and the temperature distribution of the fixing device 10 can be distributed in the optimal conditions.

Moreover, the temperature distribution of the fixing device 10 can be set as the optimal temperature distribution by controlling the current which detects the temperature of the circumferential portion of the cylindrical film 31 or the fixing roller 33, and passes it to the auxiliary heating elements 22*b* and 22*c* with the detected temperature.

Although the case where the current is simultaneously passed to main heating element 22*a* and the auxiliary heating elements 22*b* and 22*c* is explained by the above-mentioned explanation when supplying power to the auxiliary heating elements 22*b* and 22*c* from the main power supply 23.

Figure 28:
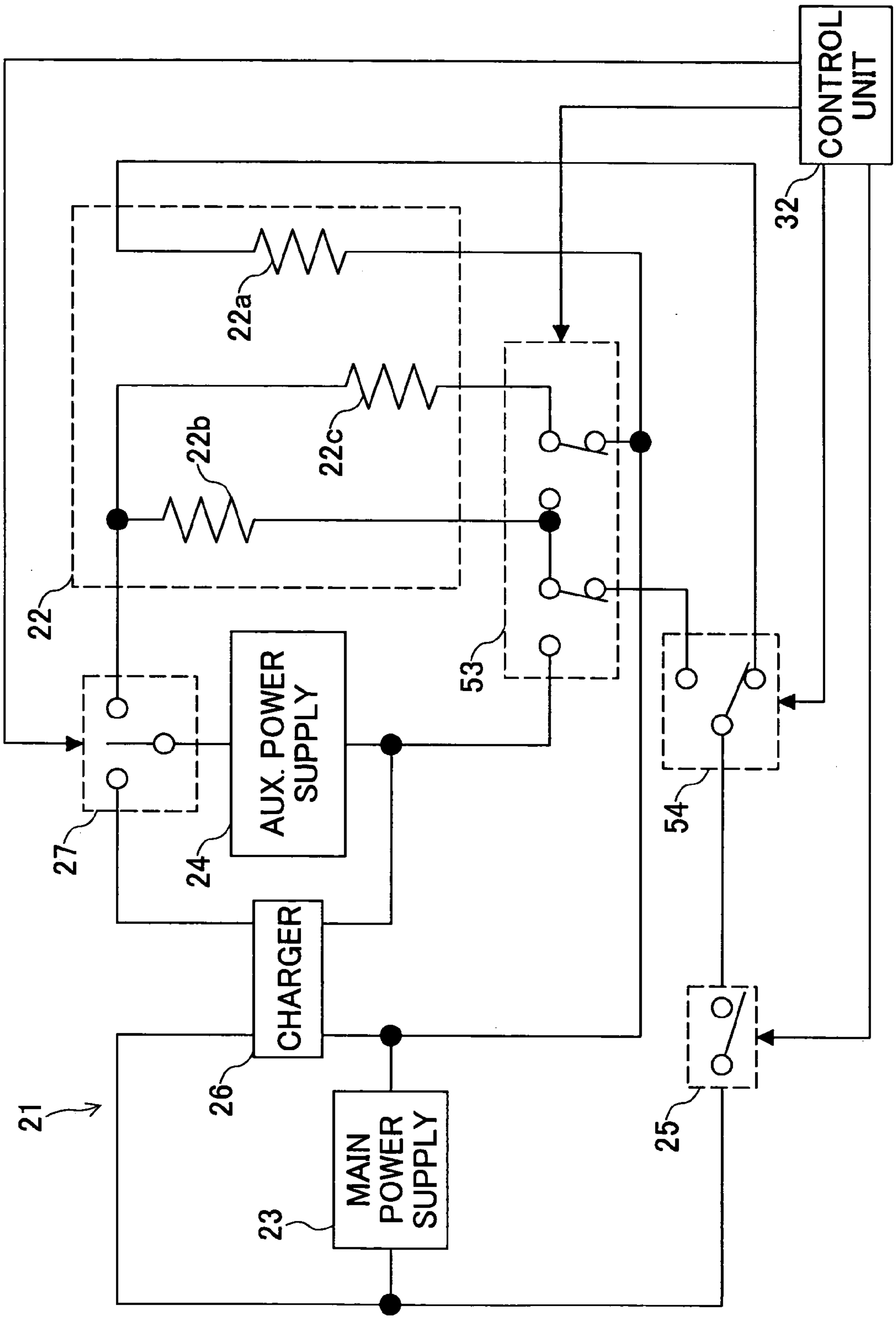
FIG. 28 is a circuit diagram of a variation of the heating device in which power from the auxiliary power supply and power from the main heating element are supplied to the auxiliary heating element.

As shown in FIG. 28, the circuit which supplies power to main heating element 22*a* from the main power supply 23, and the circuit which supplies power to the auxiliary heating elements 22*b* and 22*c* from the main power supply 23 are switched by the change-over switch 54, and the change-over switch 54 is switched in time.

The current from the main power supply 23 can be made small by supplying power to main heating element 22*a* and the auxiliary heating elements 22*b* and 22*c* by turns from the main power supply 23.

For example, if the power of 600 W is supplied to the auxiliary heating elements 22*b* and 22*c* by voltage 50V from the auxiliary power supply 24 and the power of 1200 W is supplied to main heating element 22*a* by voltage 100V from the main power supply 23 when starting the fixing device 10, the power of 1800V can be supplied to the fixing device 10.

If the auxiliary heating elements 22*b* and 22*c* are switched to the series connection and power is supplied from the main power supply 23, when the fixing device 10 heats to the predetermined temperature by supply of the power the auxiliary heating elements 22*b* and 22*c* about 600 when the power of W will be supplied and power is supplied to main heating element 22*a* and the auxiliary heating elements 22*b* and 22*c* from the main power supply 23, from the main power supply 23, the current beyond 15 A which is the maximum of the supply voltage of the source power supply will be passed.

By switching the change-over switch 54 in time at this time, and supplying power to main heating element 22*a* and the auxiliary heating elements 22*b* and 22*c* by turns from the main power supply 23, the current passed from the main power supply 23 can be switched to 12 A and 6 A, and the current passed from the main power supply 23 can be held down to below 15 A.

Thus, when supplying power to main heating element 22*a* from the main power supply 23, while suppressing consuming power beyond necessity by setting up arbitrarily the maximum voltage which carries out phase control of the voltage applied to main heating element 22*a*, and is applied to the main heating element 22, or supplying power through the transformer from the main power supply 23, and controlling the voltage applied to main heating element 22*a* or the auxiliary heating elements 22*b* and 22*c*, it can prevent exceeding the maximum current of the source power supply.

Moreover, the electric double-layer capacitor etc. may use the fuel cell instead of as an auxiliary power supply 24.

Thus, when the fuel cell is used, while the generating efficiency is high and very gentle to environment, it is not necessary to charge, and the composition of the heating device 21 can be simplified.

Moreover, the number of times of the repetition of the charging and discharging is almost unrestricted at tens of thousands of times or more, the electric double-layer capacitor used as an auxiliary power supply 24 can be used semipermanently substantially, and its maintenance is unnecessary.

Taking advantage of the long operational life of the electric double-layer capacitor, when the life of the image forming apparatus 1 main parts, such as the copier, finishes, effective use of resources and reduction of the cost of the heating device 21 can be aimed at by collecting and reusing the electric double-layer capacitor etc. Furthermore, it accumulates until the charged charge discharges to the electric double-layer capacitor.

Therefore, there is the danger of receiving an electric shock when collecting from the heating device 21, in order to reuse the electric double-layer capacitor etc., and the serious accident may be caused, and in case electric double-layer capacitors etc. are collected from the heating device 21, it is necessary to fully secure the worker's safety.

Then, the auxiliary power supply 24 which has the battery module 60 which packed the auxiliary power supply 24 which used the electric double-layer capacitor etc. for two or more battery cells 52, such as the electric double-layer capacitor, as shown in the block diagram of FIG. 29 is contained to the cartridge 61, and the attachment and detachment become free to the heating device 21.

Figure 29A:
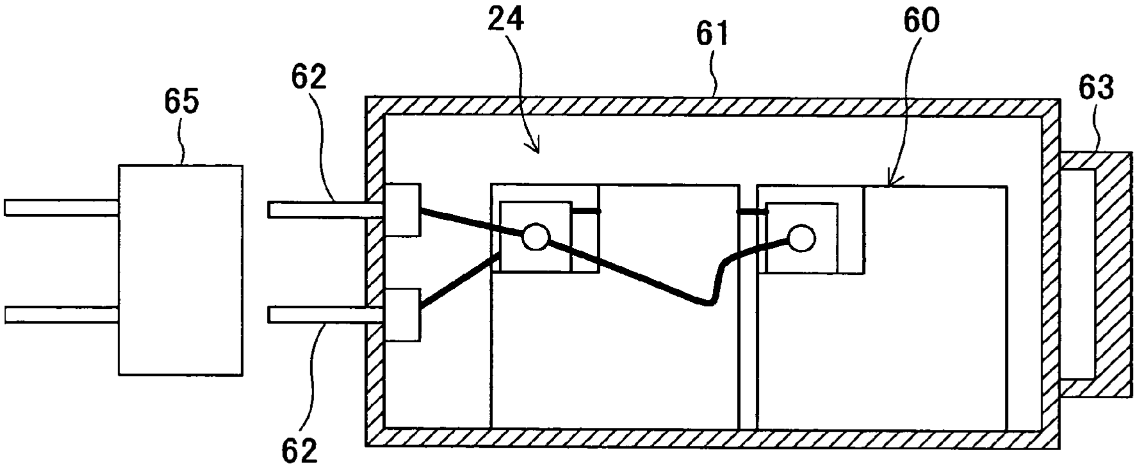
FIG. 29A and FIG. 29B are diagrams of a cartridge in which the auxiliary power supply is contained.

As it is formed by the insulating material and shown in FIG. 29A, the cartridge 61 has the external terminal 62 connected to the insertion to heating device 21 side at the positive electrode and negative electrode of the battery module 60 of the auxiliary power supply 24, and has the maintenance unit 63 in the opposite side of the external terminal 62.

Figure 29B:
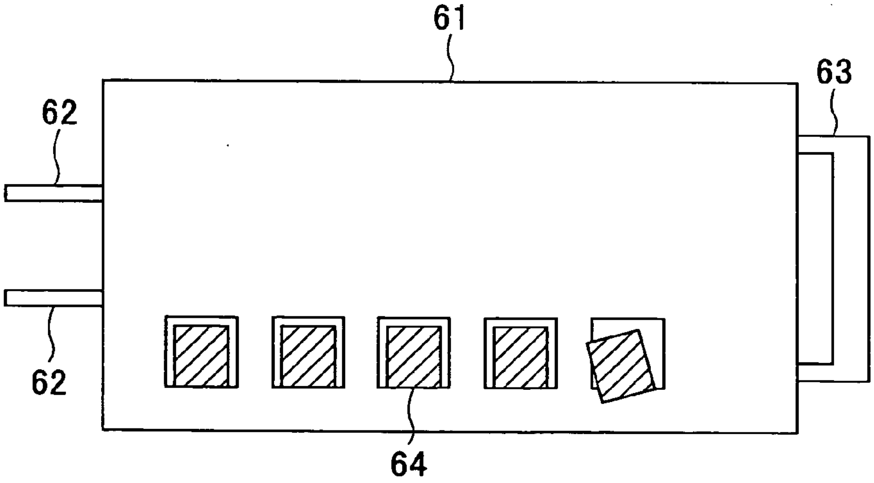
Figure 30:
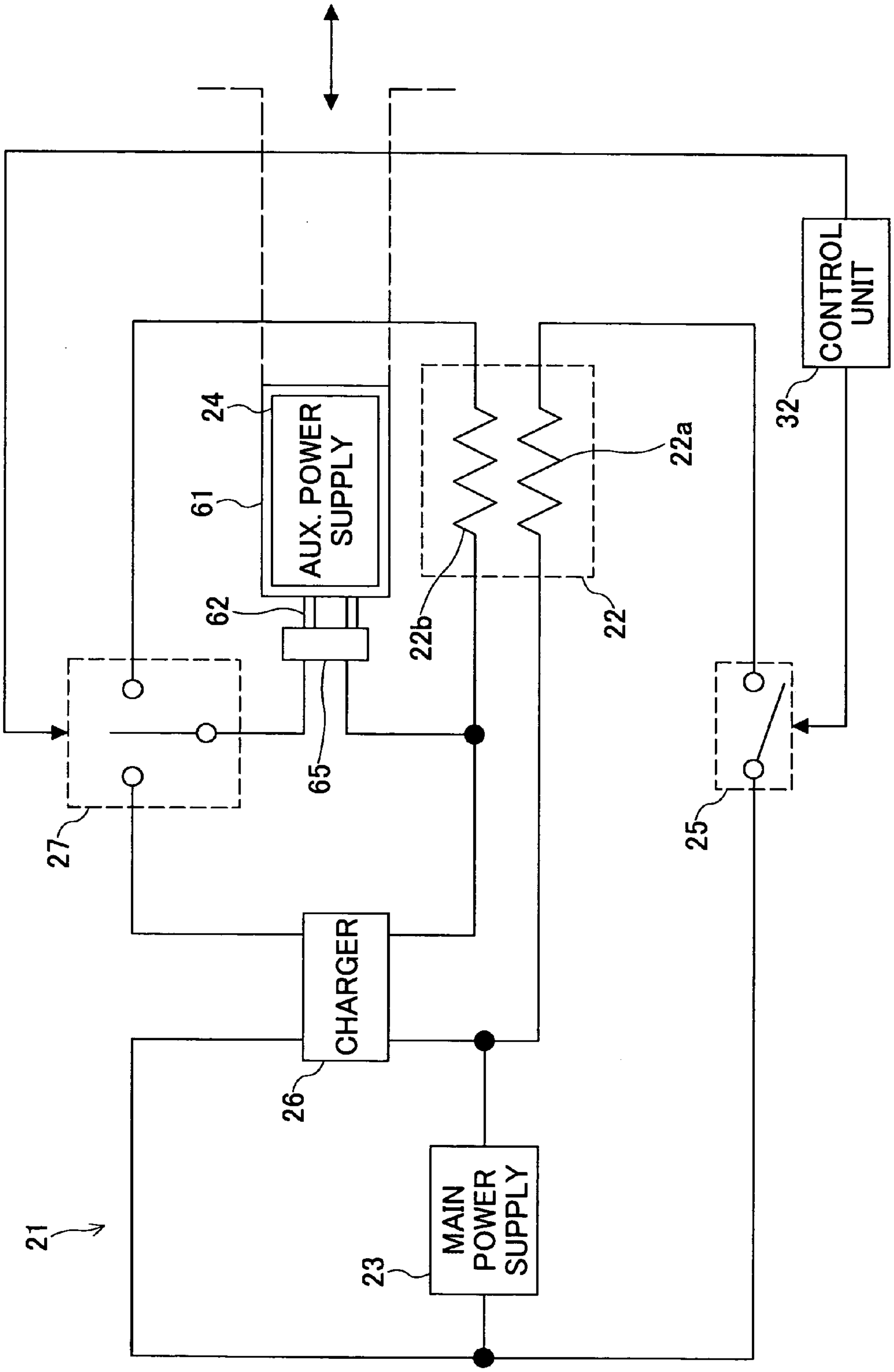
FIG. 30 is a circuit diagram of the heating device having the cartridge in which the auxiliary power supply is contained.

Moreover, as shown in the side elevation of FIG. 29B, it has the lug 64 which can be broken by the plurality. The external terminal 62 of the cartridge 61 carries out form which changed with the voltage of the battery module 60 and specifications, such as electrostatic capacity, which are accommodated in the cartridge 61, and to the heating device 21, as shown in the circuit diagram of FIG. 30, it has the connection terminal 65 which carried out form connectable only with the external terminal 62 of the cartridge 61 with which the battery module 60 of the specification to need is accommodated.

Thus, voltage of the battery module 60 and specifications, such as electrostatic capacity which are accommodated in the cartridge 61 in the external terminal 62 of the cartridge 61, and the connection terminal 65 of the heating device 21.

By making it different form, the heating device 21 can be equipped only with the cartridge 61 which accommodated the battery module 60 suitable for the specification of the heating device 21, the operation mistake which connects to the heating device 21 the battery module 60 from which specification differs can be prevented, and the failure and the accident by the operation mistake can be prevented certainly.

If the seal which indicated the specification of the battery module 60 to the cartridge 61 and the heating device 21 is stuck, facilities can be given to the worker when equipping the heating device 21 with the cartridge 61 here.

Moreover, since the attachment and detachment of the cartridge 61 to the heating device 21 are enabled, the recovery and attachment for reusing the auxiliary power supply 24 which has the battery module 60 can be done easily, and the recycling of the auxiliary power supply 24 can be promoted.

Furthermore, the auxiliary power supply 24 can also be later attached in the image forming apparatus which does not equip the auxiliary power supply 24 the first stage, and the rise time of the image forming apparatus can be shortened.

Whenever to which the lug 64 expresses the number of times of the limit when reusing the auxiliary power supply 24 which has the battery module 60, and the worker reuses the auxiliary power supply 24 breaking the nail 64 every one the box if it takes and the lug 64 is lost altogether, it will manage so that it may discard or process as a life of the battery module 60 of the cartridge 61 and the interior.

By showing the limit of reuse of the auxiliary power supply 24 by the lug 64, the accident and failure accompanying superannuation of the battery module 60 can be prevented.

Furthermore, since the cartridge 61 is formed by the insulating material and the battery module 60 is covered completely, when detaching and attaching the cartridge 61, the worker can avoid the danger of receiving an electric shock to the charge charged by the battery module 60.

Figure 31A:
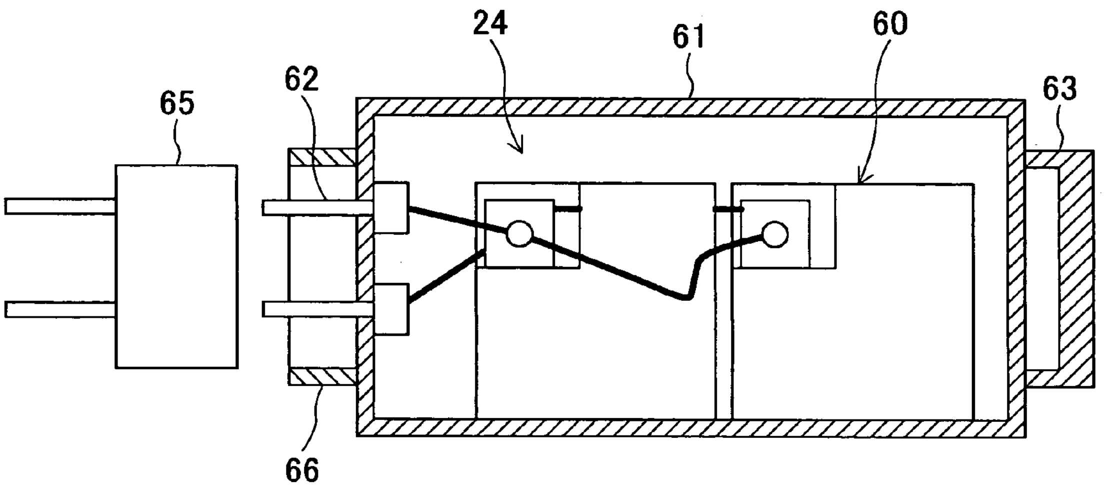
FIG. 31A and FIG. 31B are diagrams of protective covers of external terminals of the cartridge in which the auxiliary power supply is contained.
Figure 31B:
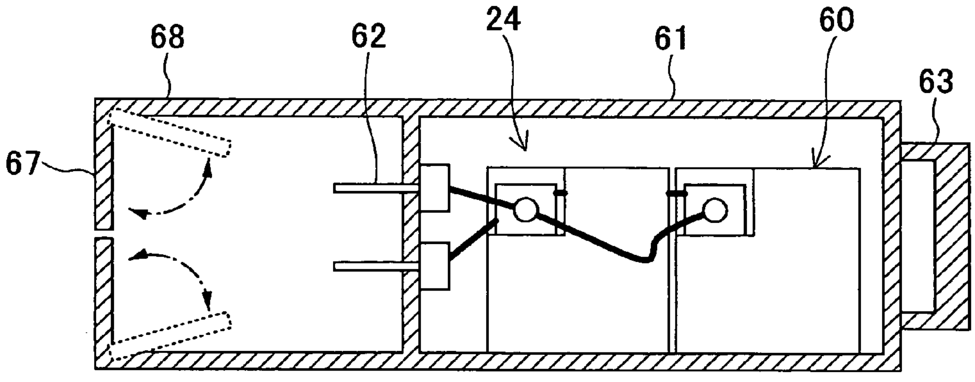

Moreover, as shown in FIG. 31A, the external terminal 62 provided in the cartridge 61 is covered with the cover 66 formed by the circumferential portion of the connection terminal 65 of the heating device 21, and the insulating material which fits in. Alternatively, as shown in FIG. 31B, the shutter 67 may be provided for protecting the external terminal 62 of the cartridge 61, which is opened when attaching the cartridge 61 to the heating device 21, and is closed when removing the cartridge 61 from the heating device 21.

While the external terminal 62 of the cartridge 61 can prevent the accident which touches and receives an electric shock to the worker or the conductive member. It can prevent damaging the auxiliary power supply 24 which has the battery module 60.

Figure 32:
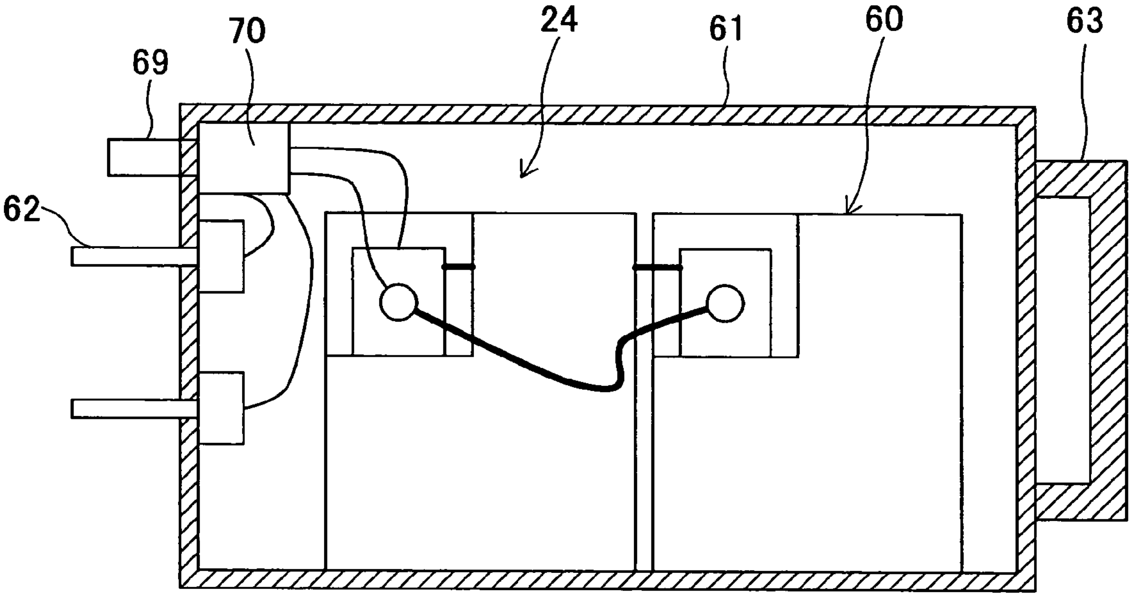
FIG. 32 is a cross-sectional view of a cartridge having a switch switching connection between the auxiliary power supply and the external terminals of the cartridge.
Figure 33A:
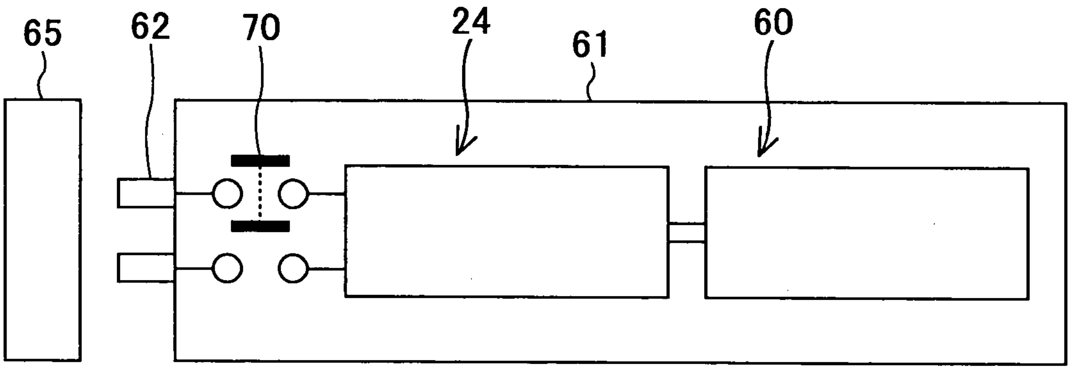
FIG. 33A and FIG. 33B are diagrams for explaining switching operation of the switch in the cartridge.
Figure 33B:
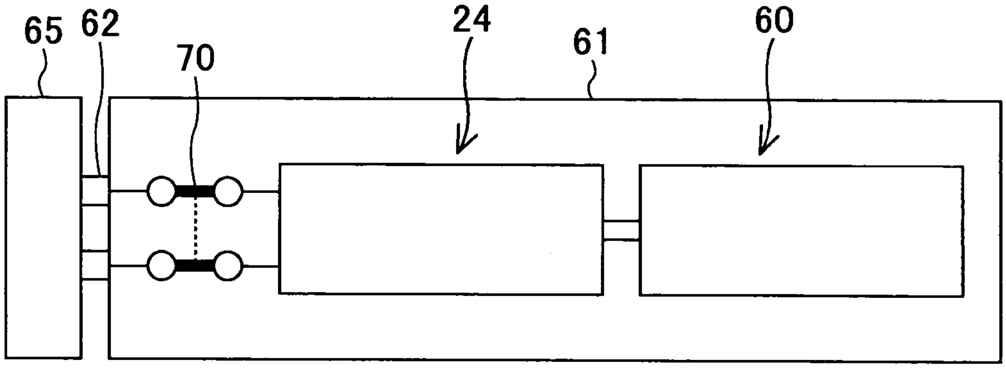

Moreover, as shown in FIG. 32, form the switch 70 which has the control unit 69 in the field which has the external terminal 62 of the cartridge 61, and be shown in the circuit diagram of FIG. 33.

The external terminal 62 is connected with the battery module 60 through the switch 70, in the state where the cartridge 61 is not attached in the heating device 21, as shown in FIG. 33A, when the switch 70 is made into the OFF state and the cartridge 61 is attached in the heating device 21, the control unit 69 is driven with the connection terminal 65 of the heating device 21, and the switch 70 may be made into ON state.

Thus, when detaching or attaching the cartridge 61 to the heating device 21 by carrying out the conduction of between the battery module 60 and the external terminals 62 only when the cartridge 61 is attached in the heating device 21, the worker can avoid the danger of receiving an electric shock to the charge charged by the battery module 60, and can do attachment-and-detachment work safely.

Furthermore, since it flows through between the battery module 60 and the external terminals 62 only when the cartridge 61 is attached in the heating device 21, by detecting the existence of the conduction by the control unit 32 of the heating device 21, the auxiliary power supply 24 which has the battery module 60 is normally attached in the heating device 21, or no can be detected certainly.

Although the above-mentioned explanation explained the case where the number of times of reuse of the auxiliary power supply 24 is displayed with the seal which is provided in the cartridge 61 and which broke, detected by the nail 64 and stuck specifications, such as voltage of the battery module 60 in the cartridge 61, and electrostatic capacity, on the cartridge 61.

Figure 34:
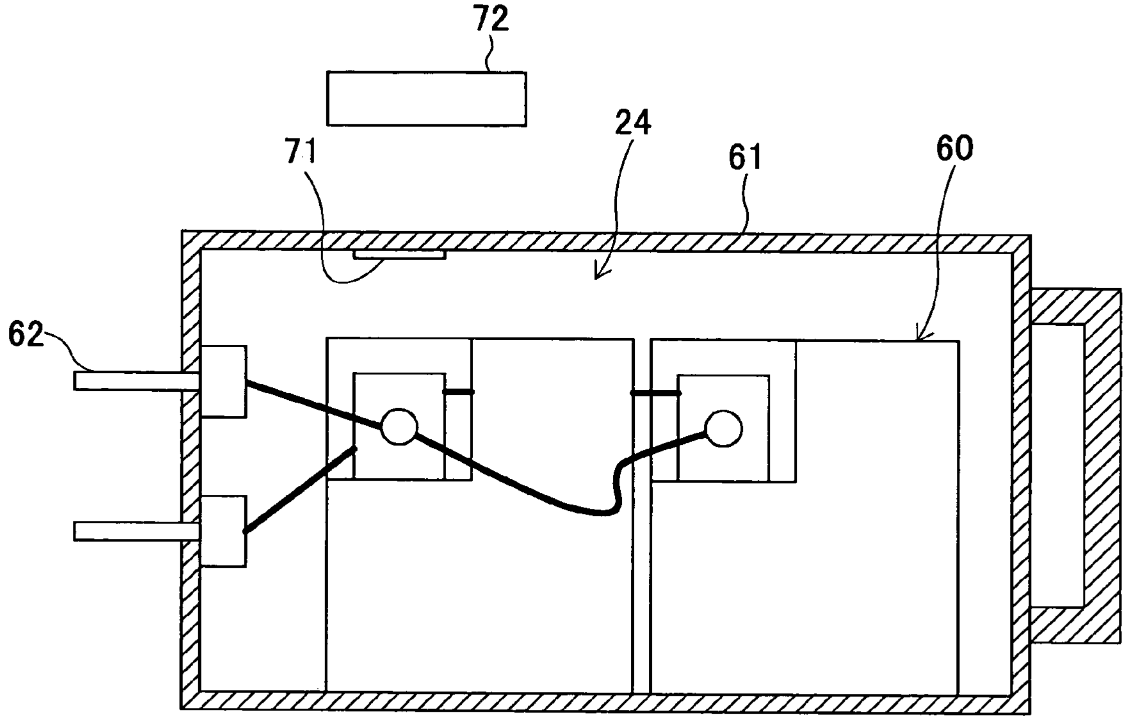
FIG. 34 is a cross-sectional view of the cartridge having a memory unit.

As shown in FIG. 34, the memory unit 71, such as IC chip, is provided in the cartridge 61. Even if it reads the information which recorded the information, such as specifications, such as manufacture time, the number of times of reuse and voltage of the battery module 60, and electrostatic capacity, on the memory unit 71, and can be recorded on the memory unit 71 with the information record regenerative apparatus 72 of the cartridge 61 and not contacting or updates the number of times of reuse.

Thus, by providing the memory unit 71 in the cartridge 61, the various information on the battery module 60 accommodated in the cartridge 61 can be acquired correctly, and the auxiliary power supply 24 can be managed proper.

Moreover, when recycling and reusing the auxiliary power supply 24, by reading the information recorded on the memory unit 71, it can classify and manage for every different specification or number of times of reuse, and the time needed for the sorting work of the auxiliary power supply 24 etc. can be shortened sharply.

Furthermore, by forming the information record regenerative apparatus 72 also in the heating device 21, no can also be checked to see the auxiliary power supply 24 attached in the heating device 21 is proper.

Figure 35:
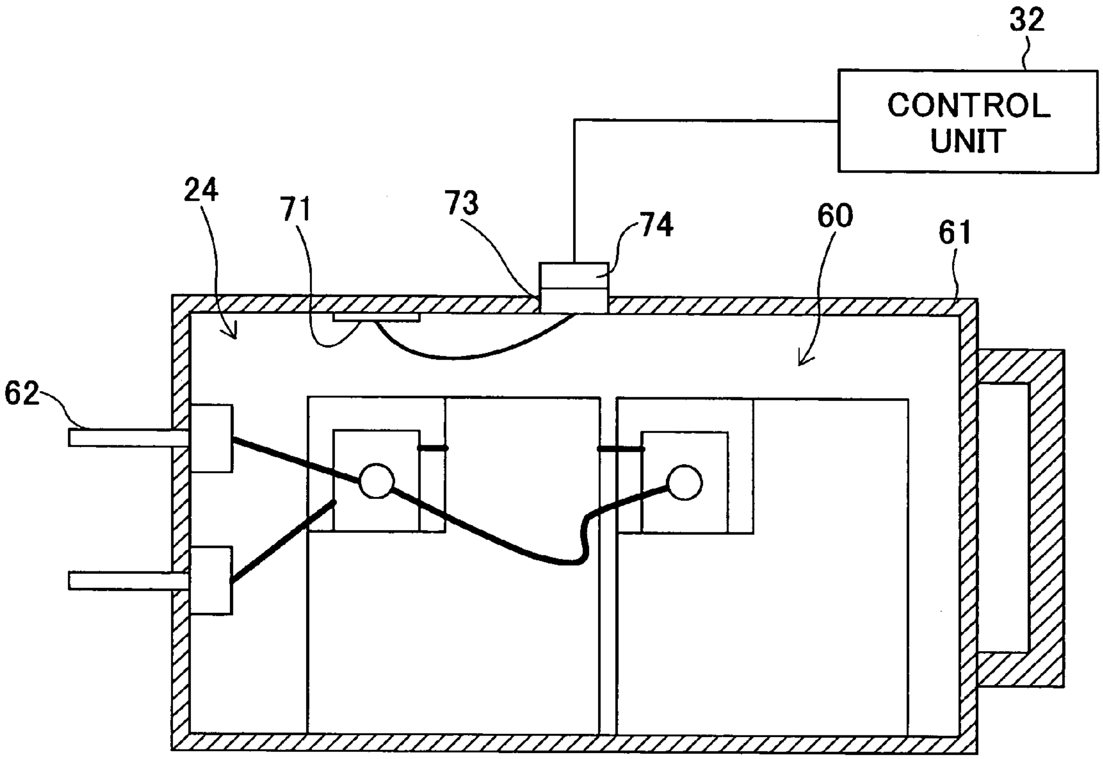
FIG. 35 is a diagram showing connection of the memory unit and the control unit of the heating device.

For example, when an SRAM is used as an memory unit 71, as shown in FIG. 35, the output terminal 73 of the memory unit 71 is formed in the cartridge 61, it connects with the attachment portion of the cartridge 61 of the heating device 21 at the control unit 32, and the input terminal 74 through which contacts the output terminal 73 of the memory unit 71, and it flows is formed.

And when the cartridge 61 is attached to the heating device 21, specifications recorded on the memory unit 71 by CPU which it has in the control unit 32, such as the number of times of reuse and voltage, are read, and when the read specification is unsuitable, the electric power supply from the auxiliary power supply 24 is inhibited.

Figure 36:
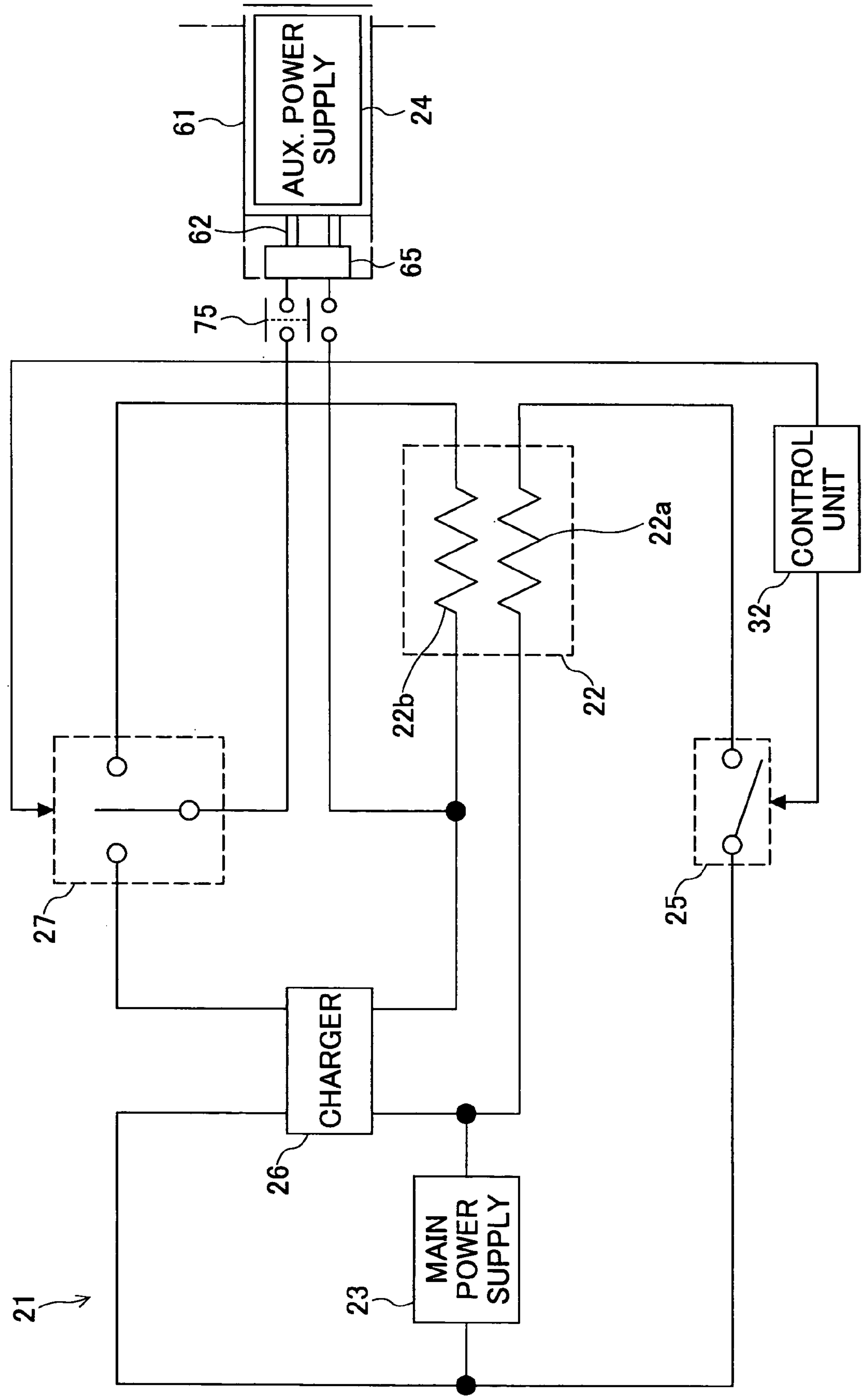
FIG. 36 is a circuit diagram of the heating device having a switching unit.

For example, as shown in FIG. 36, the heating device 21 may be provided with a connection switching unit 75 on the output side of the connection terminal 65 of the heating device 21, and the control unit 32 controls the electrical conduction of the connection switching unit 75 so that the conduction of the connection switching unit 75 is cut off when the specification recorded on the memory unit 71 is read and the read specification is detected as being unsuitable.

Thus, it is possible to prevent that the unsuitable auxiliary power supply 24 is attached to the heating device 21, causing a failure or accident to occur.

Moreover, the cartridge 61 which has the auxiliary power supply 24 is normally attached in the heating device 21 by the existence of contact of the input terminal 74 connected with the output terminal 73 of the memory unit 71 at the control unit 32, or no can also be detected.

The electric double-layer capacitor used for the auxiliary power supply 24 although each above-mentioned explanation explained the case where the auxiliary power supply 24 is formed in the heating device 21 of the fixing device 10 of the image forming apparatus 1.

It will become cost quantity while being unable to use resources effectively in the present condition if the auxiliary power supply 24 which has the electric double-layer capacitor etc. is attached in each image forming apparatus 1, when using the two copiers which are very expensive and used two or more image forming apparatuses 1, for example, the electrophotographic method, or using the copier and printer which became independent, respectively.

Moreover, since the electric double-layer capacitor has a substantially permanent life of the charging and discharging, if the number of times of use within the same period increases, since it can make cost per time of the charging and discharging cheap, it is desirable to increase the number of times of use within the same period, and to use efficiently.

However, if the usage count of the image forming apparatus 1 is increased in order to increase the number of times of use of the electric double-layer capacitor of the auxiliary power supply 24 by the one set of the image forming apparatus 1, the life of image forming apparatus 1 the very thing will become short.

Then, it is desirable to share the auxiliary power supply 24 which uses two or more image forming apparatuses 1, and has the electric double-layer capacitor etc. by two or more image forming apparatuses 1.

The auxiliary power supplying system for sharing the auxiliary power supply 24 which has the electric double-layer capacitor etc. by two or more of these image forming apparatuses 1 is explained.

Figure 37:
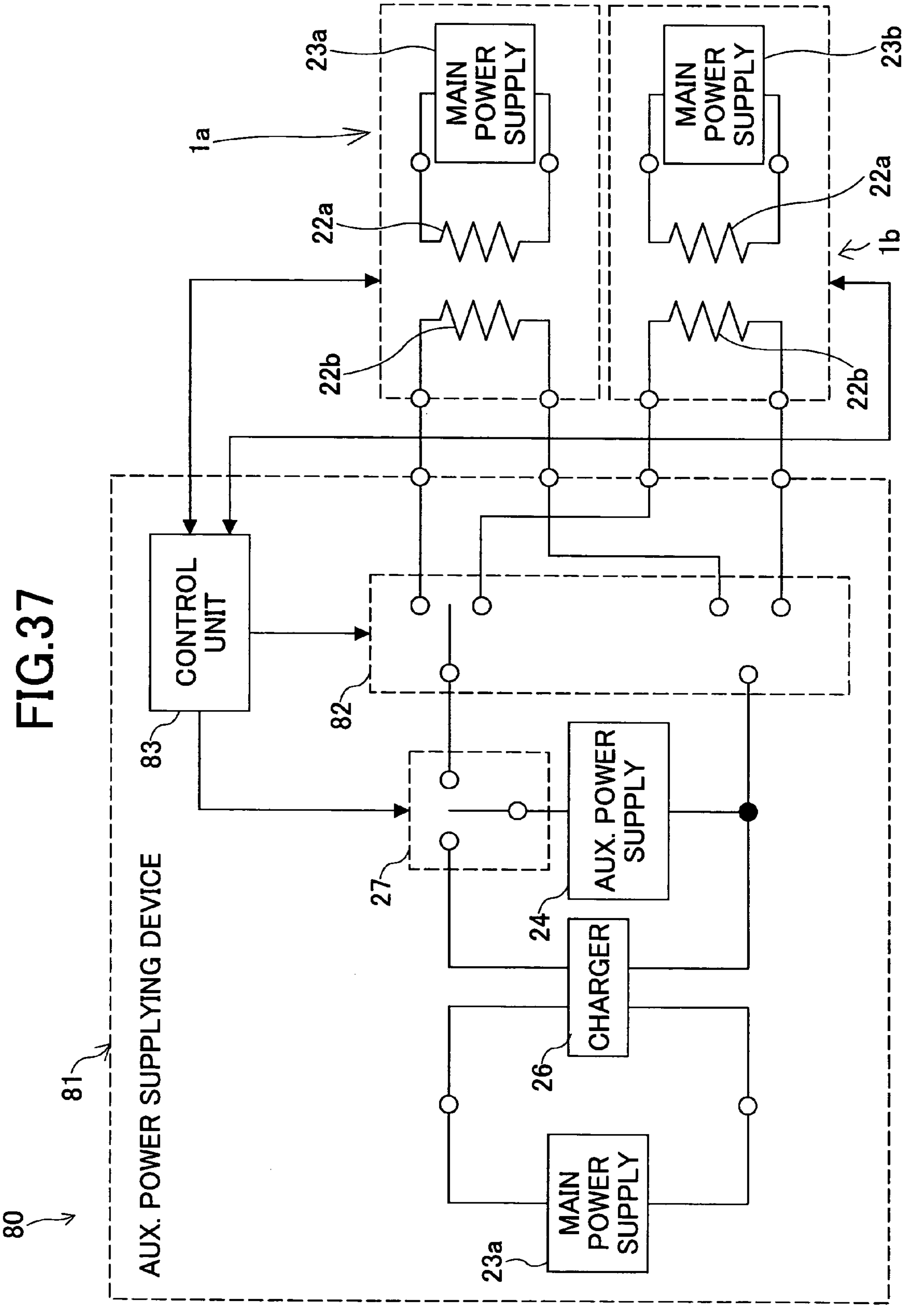
FIG. 37 is a circuit diagram of an embodiment of the auxiliary power supplying system of the invention.

FIG. 37 shows an embodiment of the auxiliary power supplying system of the invention.

As shown in FIG. 37, the auxiliary power supplying system 80 includes the auxiliary power supply 81 which supplies auxiliary power to the two sets of the image forming apparatuses 1*a* and 1*b*.

The image forming apparatuses 1*a* and 1*b* have main heating element 22*a* which supplies power from the main power supplies 23*a* and 23*b* connected to the fixing device 10 at the alternator, respectively, and auxiliary heating element 22*b* which supplies power from the auxiliary power supply 81. The auxiliary power supply 81 has the auxiliary power supply 24, the charger 26 and the switching unit 27 which have the electric double-layer capacitor etc., the supply-voltage switching unit 82, and the control unit 83.

The charger 26 charges the auxiliary power supply 24 with the power supplied from main power supply 23*c* connected to the alternator.

The switching unit 27 switches connection of the charger 26 and the supply-voltage switching unit 82 to the auxiliary power supply 24.

The supply-voltage switching unit 82 switches whether the auxiliary power outputted from the auxiliary power supply 24 is supplied to image forming apparatus 1*a*, or image forming apparatus 1*b* is supplied.

The control unit 83 switches connection of the switching unit 27 and the supply-voltage switching unit 82 using the information from the image forming apparatuses 1*a* and 1*b*.

Figure 38:
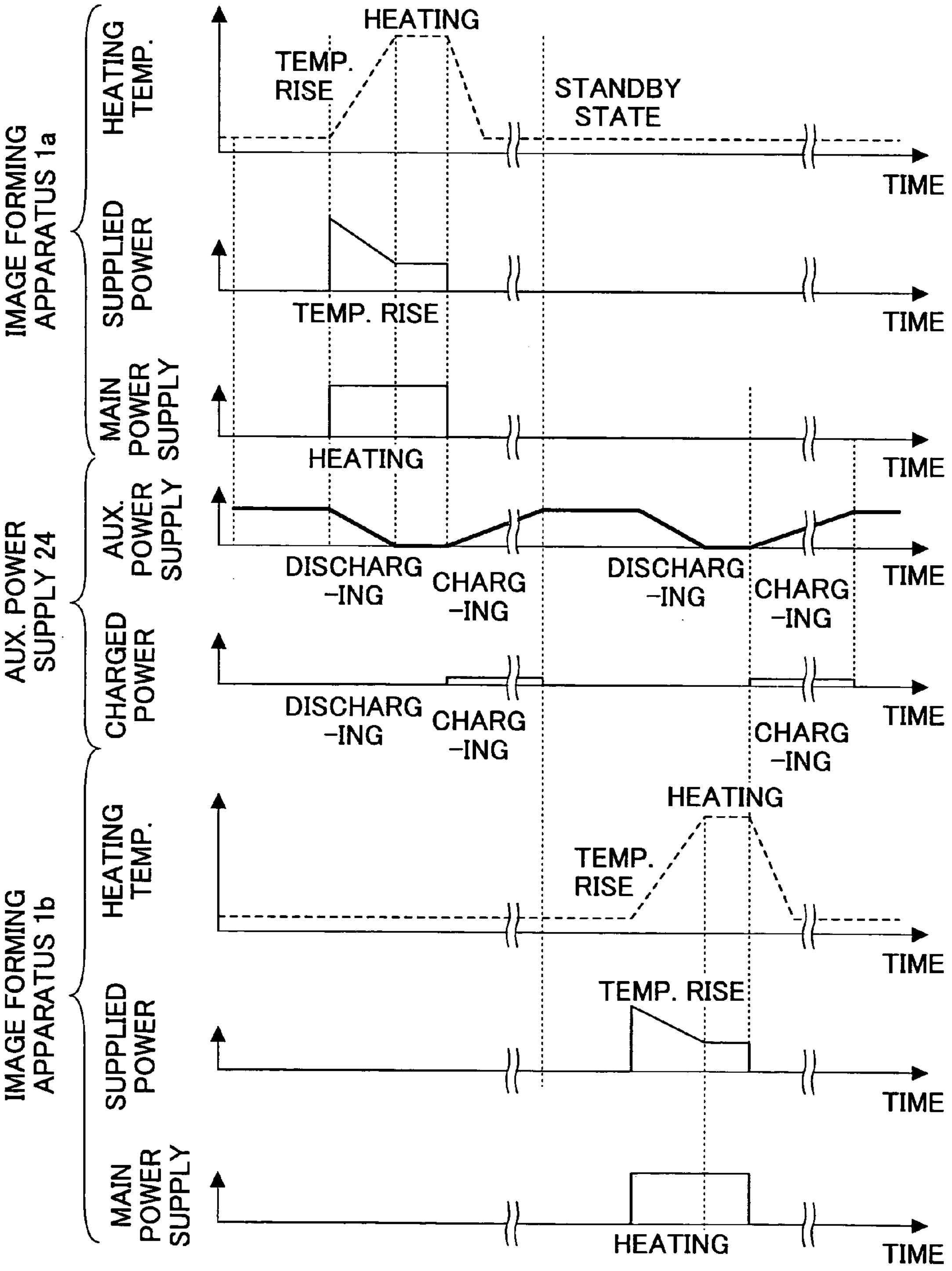
FIG. 38 is a time chart for explaining operation of the auxiliary power supplying system when power from the auxiliary power supply is supplied to two image forming apparatuses.

With reference to the time chart of FIG. 38, a description will be given of the operation when supplying auxiliary power to the image forming apparatuses 1*a* and 1*b* from the auxiliary power supply 24.

If the supply of power is started from the main power supply 23*a* to the main heating element 22*a* in order that image forming apparatus 1*a* may rise from the standby state and may start the image forming operation, the control unit 83 of the auxiliary power supply 81 will connect the switching unit 27 to the supply-voltage switching unit 82 and connect the supply-voltage switching unit 82 to the image forming apparatus 1*a*, and will supply the auxiliary power to the auxiliary heating element 22*b* of the image forming apparatus 1*a* from the auxiliary power supply 24.

If the fixing device 10 which has main heating element 22*a* and auxiliary heating element 22*b* by supply of the power reaches the predetermined temperature, the control unit 83 will cut off the auxiliary power which drives the supply-voltage switching unit 82 and is supplied to image forming apparatus 1*a* from the auxiliary power supply 24.

If the image forming operation of image forming apparatus 1*a* is completed and it will be in the standby state, the control unit 83 will connect the switching unit 27 to the charger 26 side, and will charge the auxiliary power supply 24 with the charger 26.

If the supply of power is started from main power supply 23*a* to main heating element 22*a* in order for image forming apparatus 1*b* to rise from the standby state in this state and to start the image forming operation, the auxiliary power supply 24 will be connected to the image forming apparatus 1*b* side, and auxiliary power will be supplied to the auxiliary heating element 22*b* of the image forming apparatus 1*b* from the auxiliary power supply 24.

Thus, it is not necessary to form the auxiliary power supply 24 in each image forming apparatuses 1*a* and 1*b*, and by supplying the auxiliary power to the two sets of the image forming apparatuses 1*a* and 1*b* from the auxiliary power supply 81, using effectively the auxiliary power supply 24 of the auxiliary power supply 81, while being able to raise use efficiency, the cost of the image forming apparatuses 1*a* and 1*b* can be reduced.

Moreover, since the auxiliary power supply 24 is charged when the image forming apparatuses 1*a* and 1*b* are in the standby state, when the image forming apparatuses 1*a* and 1*b* are started, the auxiliary power supply 24 can be made into the predetermined amount of charge.

Figure 39:
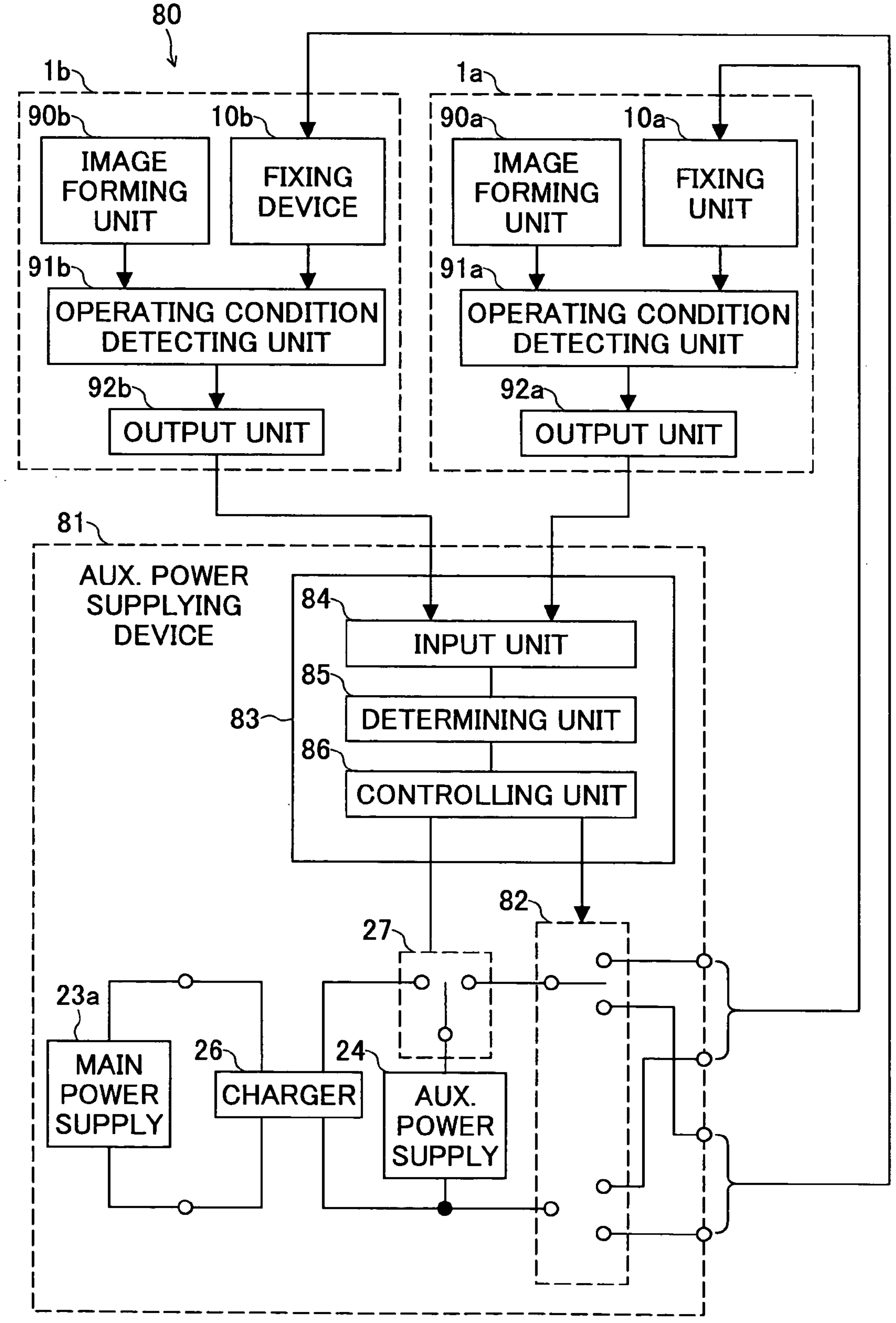
FIG. 39 is a diagram showing control functions of the auxiliary power supplying system.

With reference to the block diagram of FIG. 39, a description will be given of the control of the auxiliary electric power supply operation of the auxiliary power supply 81 performed by the control unit 83 based on the information from the image forming apparatuses 1*a* and 1*b*.

The control unit 83 of the auxiliary power supply 81 charges the input unit 84 which uses the signal line or the general-purpose network of exclusive use of the information from the image forming apparatuses 1*a* and 1*b*, and receives, a determination unit 85 which determines the contents of the received information, and the auxiliary power supply 24, or has a control unit 86 to control the auxiliary power outputted from the auxiliary power supply 24.

The image forming apparatuses 1*a* and 1*b* have the output unit 92 which transmits the photoconductor 2, the charging device 3, the optical writing unit and the developing device 6, the image-formation unit 90 of transferring device 7 grade, main heating element 22*a* and the fixing device 10 which has auxiliary heating element 22*b* etc., the operating state detection unit 91 that detects the various operating state, and the detected operating state to the auxiliary power supply 81, as shown in FIG. 1, respectively.

When the power supply of image forming apparatus 1*a* is switched on, operating state detection unit 91*a* detects various device states, such as temperature of fixing device 10*a*, the remaining quantity of the recording paper 16, and propriety of printing, the remaining power quantity of the auxiliary power supply 24, the priority of image forming apparatus 1*a*, etc. as status information, and sends it to output-unit 92*a* as status information.

The output unit 92*a* transmits the status information to the input unit 84 of the auxiliary power supply 81. The operating state detection unit 91*b* of image forming apparatus 1*b* also detects status information, and transmits to the input unit 84 of the auxiliary power supply 81 through output-unit 92*b*.

The input unit 84 of the auxiliary power supply 81 sends the received status information of the image forming apparatuses 1*a* and 1*b* to the determination unit 85.

The determination unit 85 determines control information, such as the supply location of auxiliary power and the power supply start and stop timing, from the contents of the received status information, and sends it to the control unit 86. The control unit 86 controls the timing of the supply of auxiliary power based on the control information concerning any of the image forming apparatuses 1*a* and 1*b*.

Thus, the supply location to which the auxiliary power is supplied based on the control information on the individual state of each image forming apparatus 1*a* or 1*b* or the operating state thereof, and the supply timing are controlled. The image forming apparatus 1 for which temperature is high enough and does not need auxiliary power, and the electric power supply suited to the situation of each image forming apparatus 1*a* or 1*b* by there being no residual quantity of the recording paper 16, not supplying auxiliary power to the image forming apparatus 1 in which the image formation is impossible, and supplying auxiliary power to the image forming apparatus 1 which needs auxiliary power can be performed, and the auxiliary power supply 24 can be used effectively.

Moreover, when supplying auxiliary power to for example, the image forming apparatus 1*b* by including the priority in status information and supply of auxiliary power is required from image forming apparatus 1*a* with the high priority, the supply of auxiliary power to image forming apparatus 1*b* can be stopped, and auxiliary power can also be supplied to the image forming apparatus 1*a*.

In the present embodiment, the auxiliary power supply 81 is provided separate from the image forming apparatuses 1*a* and 1*b*, and when other image forming apparatuses are connected additional, it is possible to easily carry out the connection of such image forming apparatuses.

Moreover, in case the amount of accumulation of electricity of the auxiliary power supply 24, the time change at the time of electric discharge, etc. are operated safely, many management items can be managed collectively.

Figure 40:
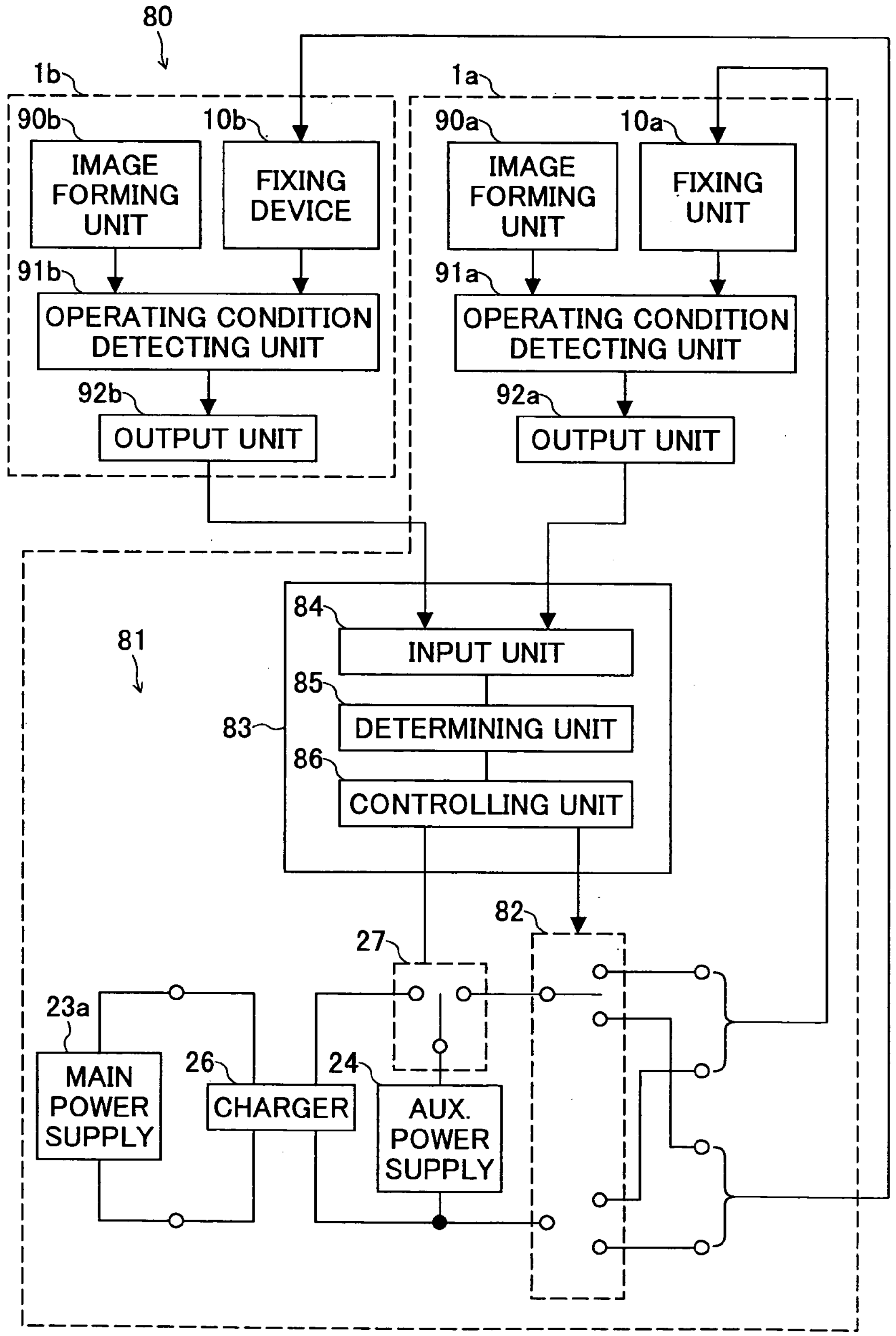
FIG. 40 is a diagram showing the auxiliary power supplying system in which the auxiliary power supplying device is provided in one of the two image forming apparatuses.

In the above-mentioned embodiment, the auxiliary power supply 81 is provided separately from the image forming apparatuses 1*a* and 1*b*. Alternatively, the auxiliary power supply 81 may be provided, for example, in the image forming apparatus 1*a*, and it is possible to make it supply auxiliary power to the other image forming apparatus 1*b* from the image forming apparatus 1*a*, as shown in the block diagram of FIG. 40.

Thus, while not providing the space which installs the auxiliary power supply 81 by forming the auxiliary power supply 81 in image forming apparatus 1*a*, the auxiliary power supply 24 can be arranged near the fixing device 10*a* of image forming apparatus 1*a*, and loss by wiring resistance of the auxiliary power supplied to auxiliary heating element 22*b* can be reduced.

Figure 41:
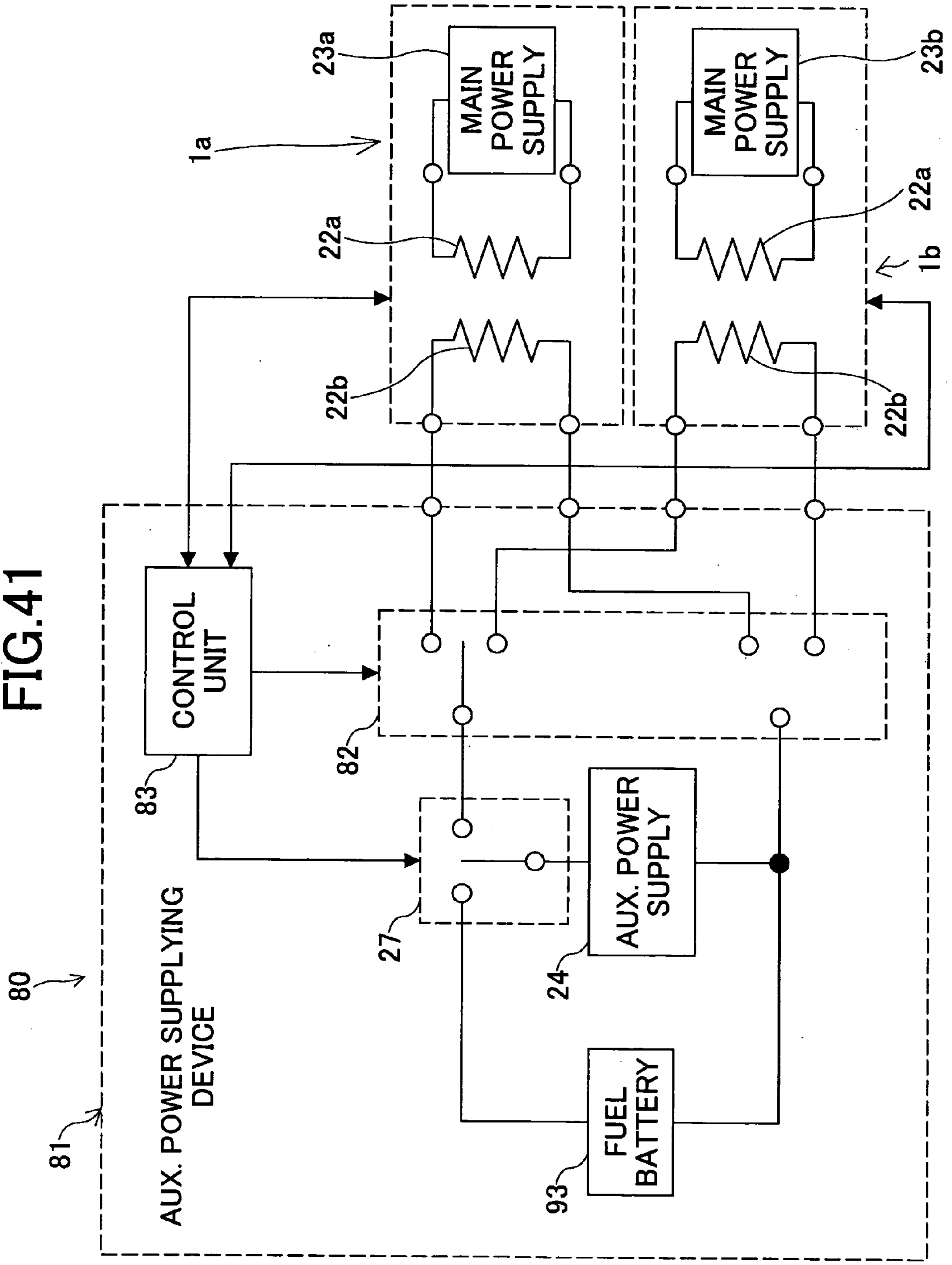
FIG. 41 is a circuit diagram of another embodiment of the auxiliary power supplying system of the invention.

Moreover, although the above-mentioned explanation explained the case where the auxiliary power supply 24 is charged through the charger 26 from the main power supply 23, it is possible to make it charge the auxiliary power supply 24 with the power supplied from the fuel cell 93, as shown in the block diagram of FIG. 41.

Figure 42:
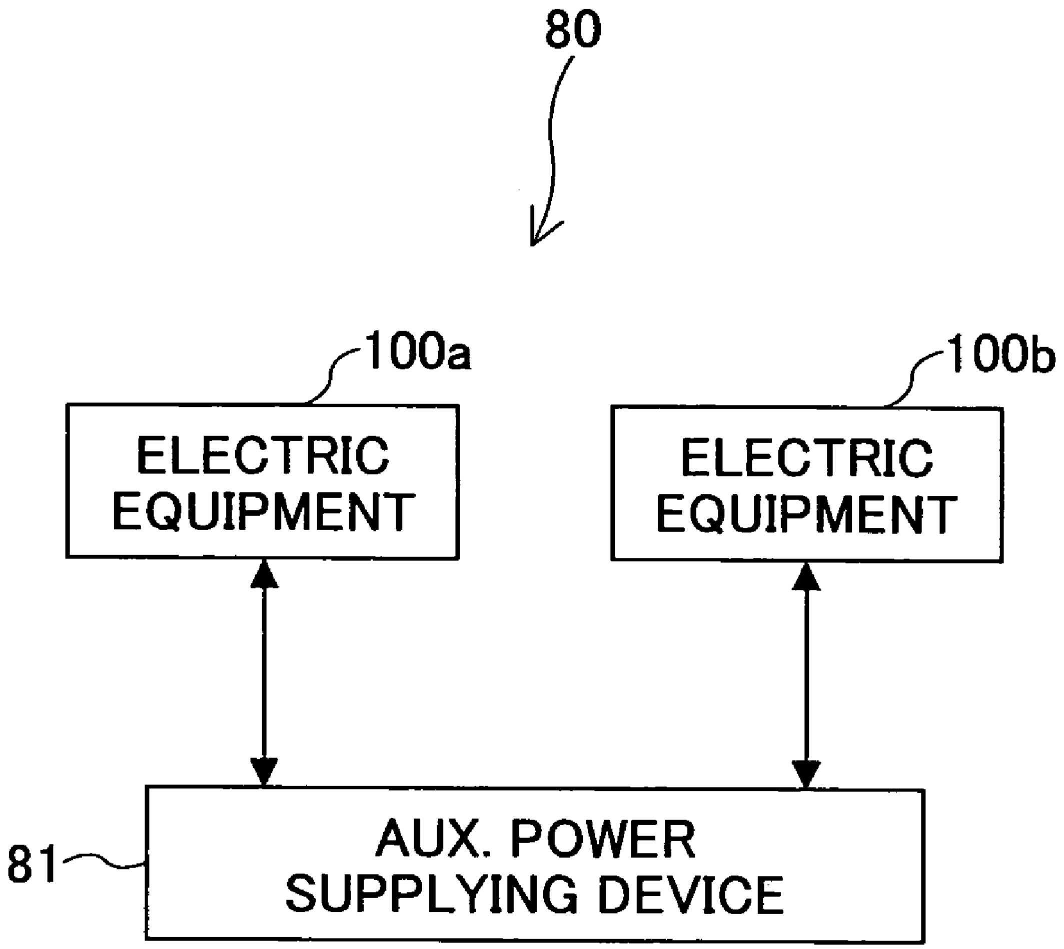
FIG. 42 is a block diagram of another embodiment of the auxiliary power supplying system of the invention.

Furthermore, the homoiothermy which needs large power temporarily as shown in the block diagram of FIG. 42 although the above-mentioned explanation explained the case where auxiliary power is supplied to the image forming apparatuses 1*a* and 1*b* from the auxiliary power supply 81 auxiliary power can be similarly supplied to the various electrical equipment modules 100*a* and 100*b*, such as the device and the air-conditioner, from the auxiliary power supply 81 prepare the main heating element and the auxiliary heating element to the heater, and the invention should change the resistance of the auxiliary heating element with the resistance of the main heating element, as explained above by supplying the current supplied to the main heating element, and the different current to the auxiliary heating element, and setting up appropriately the current which flows to the auxiliary heating element, when optimizing the power supplied to the heater and heating the heater, it can heat to the temperature predetermined in a short time.

Moreover, the mass capacitor in which the charging and discharging is possible is formed in the auxiliary power supply, and while being able to use the electric power supply to the auxiliary heating element by from charge and the auxiliary power supply of the capacitor of the auxiliary heating element, stabilizing the auxiliary heating element for a long period of time, it can be used, without hardly needing the maintenance.

Moreover, by providing the main heating element and the auxiliary heating element also in the pressure unit pressed by the heater, and heating the pressure unit with the heater, it can heat more efficiently and can maintain at the predetermined temperature.

By changing the resistance of the heating element of the heater, and the resistance of the heating element of the pressure unit, the heater and the pressure unit can be heated by the optimal temperature characteristics according to each structure, thermal conductivity, etc.

Furthermore, by making the resistance of the auxiliary heating element smaller than the resistance of the main heating element, and the main power supply supplying the power of high voltage to the main heating element, by supplying the power of large current to the auxiliary heating element by the low voltage, the auxiliary power supply can supply power to the auxiliary heating element efficiently while it reduces the number of the capacitors of the auxiliary power supply and attains the miniaturization.

Moreover, by connecting two or more auxiliary heating elements in parallel, large current can be passed with the auxiliary heating element, and the temperature of the heater can be started quickly.

Moreover, the two or more auxiliary heating elements are connected in parallel when providing two or more auxiliary heating elements and supplying power to the auxiliary heating elements from the auxiliary power supply, and two or more auxiliary heating elements are connected in series when supplying power to the auxiliary heating elements from the main power supply. When a low-voltage, large-current power can be supplied to the auxiliary heating elements from the auxiliary power supply and power is supplied to the auxiliary heating elements from the main power supply, the current flowing through the auxiliary heating elements can be made small, the electrical power supply can be stabilized for a long time.

Moreover, the auxiliary heating element can make the heater the optimal temperature distribution by making the range of others of the heated body into the main exothermic ranges by the main heating element of the heater making the range which the heated body defined beforehand the main exothermic ranges.

Moreover, by having the mass capacitor in which the charging and discharging is possible, or having the fuel cell, the auxiliary power supply is stabilized and can supply big auxiliary power.

Furthermore, the auxiliary power supply is easily reusable by accommodating in the cartridge which can detach and attach freely the mass capacitor in which the charging and discharging of the auxiliary power supply is possible.

Moreover, when detaching and attaching the auxiliary power supply by constituting the cartridge from the member which has the insulation, the danger of receiving an electric shock to the charge by which the worker is charged can be avoided.

Moreover, by changing the form of the external terminal of the cartridge according to the specification of the auxiliary power supply, it can prevent equipping the heating device with the auxiliary power supply with which use differs, and failure and the accident can be prevented.

Furthermore, the connection switching unit which serves to cut off the electrical conduction between the external terminal and the auxiliary power supply when the conduction of the external terminal and the auxiliary power supply is carried out when prepare the insulating cover in the circumferential portion of the external terminal of the cartridge, the insulating cover which has the shutter member opened and closed when detaching and attaching on the main part is provided in the circumferential portion of the external terminal of the cartridge or it attaches in the main part at the cartridge, and it removes from the main part is established.

It can prevent the external terminal from touching the manufacturing worker etc., and safety of the recovery work when reusing the auxiliary power supply can be assured.

Moreover, the convenience can be given to the user concerning the reuse of the auxiliary power supply by providing a display unit, which is indicative of the number of times of reuse of the auxiliary power supply, in the cartridge.

Furthermore, it is possible to prevent using the wrong auxiliary power supply which is provided according to a different specification, by providing a detection unit which detects the specification of the auxiliary power supply contained in the cartridge using the information read by an information reading unit from the memory unit contained in the cartridge, and the memory unit is read out by the information reading unit when the memory unit stores the specification of the auxiliary power supply and the information about the number of times of reuse of the cartridge attached to the heating device. The use state of the auxiliary power supply can be clarified.

Moreover, by cooling the auxiliary power supply with the cooling unit, overheating of the auxiliary power supply can be prevented, while being able to improve the durability of the auxiliary power supply, it is stabilized and auxiliary power can be supplied.

The auxiliary power supply can be efficiently used by controlling the drive of the cooling unit by temperature of the whole device which has the temperature or the heating device of the auxiliary power supply, or controlling by the operating state.

Moreover, by constituting from the ceramic heater which printed the resistive material to the ceramic substrate and formed the auxiliary heating element in it, or constituting from the thin-film metal resistor, it is stabilized and large current can be passed.

Furthermore, by constituting the main heating element from the same material as the auxiliary heating element, and forming the main heating element and the auxiliary heating element on the same substrate, while making manufacture of the heater easy, miniaturization can be realized.

Moreover, the temperature distribution of the main heating element and the auxiliary heating element can be set up to the optimal conditions by forming the main heating element and the auxiliary heating element on the different substrates.

The auxiliary power supply of the invention supplies the auxiliary power to two or more electrical equipment modules to which the main power is supplied from the main power supply, and the auxiliary power supply can be used effectively and the cost of the electrical equipment modules can be reduced.

Moreover, by controlling the destination place and supply timing to which the auxiliary power is supplied, based on the status information which indicates the information on the individual state of each electrical equipment or the operating state thereof, the auxiliary power can be supplied to the electrical equipment which requires the auxiliary power, the electric power supply suited to the situations of the electrical equipment modules can be performed, and the auxiliary power supply can be used effectively.

Moreover, the convenience can be given to the user of the electrical equipment by supplying the auxiliary power according to the status information including the priority.

Moreover, by countering with the pressure roller, forming the heating device, putting the recording medium which imprinted the image between the heating device and the pressure roller, and fixing the image to the recording medium, the temperature of the fixing device can be started rapidly and temperature-rise time can be shortened sharply.

Furthermore, by providing the cylindrical film made of the heat-resistant resin in contact with the sliding side with the recording medium of the heating device, it prevents the toner etc. adhering to the heating device, and while the image imprinted by the recording medium can be stabilized and established, the image with high quality can be formed in the recording medium.

Moreover, the main heating element which includes the halogen heater the heater built in the fixing roller of the fixing device, by constituting from the auxiliary heating element which connected in parallel two or more halogen heaters which have the different resistance from the main heating element, supplying power to the main heating element from the main power supply, and supplying power to the auxiliary heating element from the auxiliary power supply which has the mass capacitor in which the charging and discharging is possible, the power of large current can be supplied to the auxiliary heating element by the low voltage, and the temperature of the fixing roller can be started in a short time.

Moreover, while being able to make heat capacity of the auxiliary heating element small and being able to start the temperature of the fixing roller in a short time by constituting from the main heating element which consists the heater of the halogen heater, and the auxiliary heating element which connected in parallel two or more resistance heating elements which have the different resistance from the main heating element, and is closed in one glass tube, the auxiliary heating element can be miniaturized.

Furthermore, when heating the fixing roller by having the different resistance from the main heating element which consists the heater of the halogen heater, and the main heating element, and constituting from the auxiliary heating element which includes the thin film resistor formed in the inside of the roller base of the fixing roller, while being able to tell direct heat to the roller base of the fixing roller from the auxiliary heating element and being able to start the temperature of the fixing roller in a short time, the fixing roller itself can be miniaturized.

By forming the fixing device in the image forming apparatus, the temperature of the fixing roller is started for a short time, it is stabilized and the image with high quality can be formed.

When the amount of charge which detected the amount of charge of the auxiliary power supply, and is detected reaches the power up of the image forming apparatus at the reference amount.

When power is supplied to the heater and the detected amount of charge does not reach the reference amount from the main power supply and the auxiliary power supply, power is supplied to the heater from the main power supply.

The supply of the power to the heater is cut off at the time of the standby state, the auxiliary power supply is charged and at the time of changing from the standby state to the temperature-rise state, the power from the main power supply and the auxiliary power supply is supplied to the heater.

When heating the heater, the temperature of the heater can be started quickly, power which the heater supplies at the time of standby can be made into zero, and power-saving can be attained.

Furthermore, when the heater reaches the predetermined temperature, the power which the auxiliary power supply holds can be efficiently used by cutting off the power currently supplied to the auxiliary heating element from the auxiliary power supply.

Furthermore, the present invention is not limited to the above-described embodiments, and variations and modifications may be made without departing from the scope of the present invention.

The invention claimed is:

1. A fixing device comprising:

a main power supply;

an auxiliary power supply;

a heater unit disposed to face a pressure unit and configured to heat and fuse a toner image onto a recording medium which is delivered to a nip portion between the heater unit and the pressure unit;

a main heating element configured to generate heat with power supplied from the main power supply; and a plurality of auxiliary heating elements connected in parallel and configured to generate heat with power supplied from the auxiliary power supply, wherein the auxiliary heating elements have a resistance smaller than the resistance of the main heating element, a current supplied from the auxiliary power supply to the plurality of auxiliary heating elements is separate from a current supplied from the main power supply to the main heating element, the main power supply supplies a high-voltage power to the main heating element, and the auxiliary power supply supplies a large current low-voltage power to the auxiliary heating elements.

2. The fixing device according to claim 1 wherein the fixing device comprises a cooling unit configured to cool the auxiliary power supply.

3. The fixing device according to claim 2 wherein the fixing device comprises a control unit configured to control operation of the cooling unit according to a temperature of the heating device or a temperature of the auxiliary power supply.

4. The fixing device according to claim 2 wherein the fixing device comprises a control unit configured to control operation of the cooling unit according to an operating state of the heating device.

5. The fixing device according to claim 1 wherein the auxiliary heating element is constituted from a ceramic heater having a ceramic substrate and a resistive material printed on the ceramic substrate.

6. The fixing device according to claim 5 wherein the main heating element is constituted from a material which is the same as a material of the auxiliary heating element, and the main heating element and the auxiliary heating element are formed on a same substrate.

7. The fixing device according to claim 5 wherein the main heating element and the auxiliary heating element are formed on different substrates.

8. The fixing device according to claim 1 wherein the auxiliary heating element is constituted from a resistor having a thin-film metal.

9. An image forming apparatus in which the fixing device according to claim 1 is provided, wherein said image forming apparatus forms an image on the recording medium by using an electrophotographic method and the fixing device.

10. A fixing device comprising a main power supply;

an auxiliary power supply constituted by a capacitor having a sufficiently large capacitance to allow charging and discharging of the capacitor;

a charger provided to charge the auxiliary power supply with power supplied from the main power supply;

a switching unit provided to selectively allow one of supplying of power to at least one auxiliary heating element by the auxiliary power supply and charging of the capacitor by the charger;

a heater unit disposed to face a pressure unit and provided to heat and fuse a toner image onto a recording medium which is delivered to a nip portion between the heater unit and the pressure unit;

a main heating element configured to generate heat with power supplied from the main power supply; and the at least one auxiliary heating element configured to generate heat with power supplied from the capacitor, wherein the main heating element and the at least one auxiliary heating element have different resistances, and a current supplied from the auxiliary power supply to the auxiliary heating element is separate from a current supplied from the main power supply to the main heating element.

11. The fixing device according to claim 10 wherein the capacitor is accommodated in a detachably attached cartridge.

12. The fixing device according to claim 11 wherein the cartridge is made of a dielectric material.

13. The fixing device according to claim 12 wherein the cartridge has an external terminal which is changed in shape according to specifications of the auxiliary power supply.

14. The fixing device according to claim 13 wherein an insulating cover is provided in a circumferential portion of the external terminal of the cartridge.

15. The fixing device according to claim 13 wherein an insulating cover, having a shutter member that is opened when attaching the cartridge to the heating device or closed when detaching the cartridge from the heating device, is provided in a circumferential portion of the external terminal of the cartridge.

16. The fixing device according to claim 13 wherein a connection change unit is provided in the cartridge, the connection change unit serving to cut off electrical conduction between the external terminal and the auxiliary power supply when the cartridge is detached from the heating device, and serving to allow the conduction of the external terminal and the auxiliary power supply when the cartridge is attached to the heating device.

17. The fixing device according to claim 11 wherein a display unit, which is indicative of the number of times of reuse of the auxiliary power supply, is provided in the cartridge.

18. The fixing device according to claim 11 wherein a memory unit, which stores information concerning a specification of the auxiliary power supply and the number of times of reuse, is provided in the cartridge.

19. The fixing device according to claim 18 further comprising:

an information reading unit which reads the information from the memory unit in the cartridge when the cartridge is attached to the heating device; and a determination unit which detects the contents of the auxiliary power supply contained in the cartridge attached to the heating device, based on the information read by the information reading unit.

20. A fixing device comprising:

a main power supply;

an auxiliary power supply constituted by a capacitor having a sufficiently large capacitance to allow charging and discharging of the capacitor;

a pressure unit; and a heater unit dispose to face the pressure unit and configured to heat and fuse a toner image onto a recording medium which is delivered to a nip portion between the heater unit and the pressure unit, wherein each of the pressure unit and the heater unit comprises a main heating element generating heat with power supplied from the main power supply, and at least one auxiliary heating element generating heat with power supplied from the capacitor, the main heating element and the auxiliary heating element have different resistances, and a current supplied from the auxiliary power supply to the auxiliary heating element is separate from a current supplied from the main power supply to the main heating element.

21. The fixing device according to claim 20 wherein the resistance of the main heating element of the heater unit and the resistance of the main heating element of the pressure unit are different from each other.

22. A fixing device comprising:

a main power supply;

an auxiliary power supply;

a heater unit disposed to face a pressure unit and provided to heat and fuse a toner image onto a recording medium which is delivered to a nip portion between the heater unit and the pressure unit;

a main heating element configured to generate heat with power supplied from the main power supply, and a plurality of auxiliary heating elements each configured to generate heat with power supplied from one of the main power supply and the auxiliary power supply, wherein the main heating element and the plurality of auxiliary heating elements have different resistances, a current supplied from the auxiliary power supply to the plurality of auxiliary heating elements is separate from a current supplied from the main power supply to the main heating element, and the power from the auxiliary power supply is supplied to the plurality of auxiliary heating elements by connecting the plurality of auxiliary heating elements in parallel, and the power from the main power supply is supplied to the plurality of auxiliary heating elements by connecting the plurality of auxiliary heating elements in series.

23. The fixing device according to claim 22 wherein the heater unit is configured so that the main heating element acts to heat a predetermined range of a heated object and the plurality of auxiliary heating elements act to heat a remaining range of the heated object other than the predetermined range.

24. The fixing device according to claim 22 wherein the auxiliary power supply includes a capacitor with a sufficiently large capacitance to allow charging and discharging of the capacitor.

25. The fixing device according to claim 22 wherein the auxiliary power supply includes a fuel cell.

26. An auxiliary power supplying system including at least one electrical equipment module to which power is supplied from a main power supply, and an auxiliary power supplying device supplying power to said at least one electrical equipment module from an auxiliary power supply, wherein said at least one electrical equipment module comprises an output unit configured to output a status information of said at least one electrical equipment module, and the auxiliary power supplying device comprises:

an input unit configured to receive the status information from said at least one electrical equipment module;

a determination unit configured to determine control information of the auxiliary power supply based on the received status information of said at least one electrical equipment module; and a control unit configured to control the supply of the auxiliary power from the auxiliary power supply to said at least one electrical equipment module based on the control information determined by the determination unit.

27. The auxiliary power supplying system according to claim 26, wherein the status information includes an electric supply information which indicates a state of the power supplied to said at least one electrical equipment module from the auxiliary power supply.

28. The auxiliary power supplying system according to claim 26 wherein the status information includes a priority information which indicates a degree of power demand of said at least one electrical equipment.

29. The auxiliary power supplying system according to claim 26 wherein said at least one electrical equipment module comprises a heating device including a main heating element configured to supply the power from the main power supply, and an auxiliary heating element configured to supply the power from the auxiliary power supply.

30. The auxiliary power supplying system according to claim 29 wherein the status information includes a temperature information of the heating device.

31. The auxiliary power supplying system according to claim 29 wherein the heating device is provided in a fixing device which fixes an image, which is transferred to a recording medium, to the recording medium.

* * * * *